United States Patent
Hu et al.

(10) Patent No.: US 12,545,680 B2
(45) Date of Patent: Feb. 10, 2026

(54) SUBSTITUTED OXASPIRO[4.5]DECANES AS MOR RECEPTOR AGONISTS

(71) Applicants: SHANGHAI HAIYAN PHARMACEUTICAL TECHNOLOGY CO., LTD., Shanghai (CN); YANGTZE RIVER PHARMACEUTICAL GROUP CO., LTD., Jiangsu (CN)

(72) Inventors: Bin Hu, Shanghai (CN); Jing Xie, Shanghai (CN); Kai Zhang, Shanghai (CN); Wen Yang, Shanghai (CN); Xiaoyong Shi, Shanghai (CN); Huiping Guan, Shanghai (CN)

(73) Assignees: SHANGHAI HAIYAN PHARMACEUTICAL TECHNOLOGY CO., LTD., Shanghai (CN); YANGTZE RIVER PHARMACEUTICAL GROUP CO., LTD., Jiangsu (CN)

( * ) Notice: Subject to any disclaimer, the term of this patent is extended or adjusted under 35 U.S.C. 154(b) by 781 days.

(21) Appl. No.: 17/792,561

(22) PCT Filed: Jan. 15, 2021

(86) PCT No.: PCT/CN2021/072015
§ 371 (c)(1),
(2) Date: Jul. 13, 2022

(87) PCT Pub. No.: WO2021/143801
PCT Pub. Date: Jul. 22, 2021

(65) Prior Publication Data
US 2023/0128062 A1    Apr. 27, 2023

(30) Foreign Application Priority Data

Jan. 17, 2020   (CN) .......................... 202010052039.3

(51) Int. Cl.
A61K 31/352   (2006.01)
C07D 311/96   (2006.01)
C07D 487/04   (2006.01)
C07D 491/20   (2006.01)

(52) U.S. Cl.
CPC ......... C07D 487/04 (2013.01); C07D 491/20 (2013.01)

(58) Field of Classification Search
CPC .......................... A61K 31/352; C07D 311/96
USPC ......................................... 514/456; 549/396
See application file for complete search history.

(56) References Cited

U.S. PATENT DOCUMENTS

2019/0343819 A1   11/2019   Yamashita et al.

FOREIGN PATENT DOCUMENTS

| CA | 3164577 A1 * | 7/2021 | ............. A61P 25/04 |
|----|---|---|---|
| CN | 109516982 A | 3/2019 | |
| CN | 111662284 | 9/2020 | |
| EA | 025456 B1 | 12/2016 | |
| JP | 2018534257 A | 11/2018 | |
| RU | 2459806 C2 | 8/2012 | |
| WO | 2012129495 | 9/2012 | |
| WO | 2017063509 | 4/2017 | |
| WO | 2017106306 | 6/2017 | |
| WO | 2017106547 | 6/2017 | |
| WO | 2018188641 A1 | 10/2018 | |
| WO | 2019052557 A1 | 3/2019 | |
| WO | 2019205983 | 10/2019 | |

OTHER PUBLICATIONS

Jordan, V. C. Nature Reviews: Drug Discovery, 2, 2003, 205.*
Vippagunta, et al. Advanced Drug Delivery Reviews, 48, 2001, 18.*
Wolff, Manfred E., Ed. Burger's Medicinal Chemistry and Drug Discovery—Fifth Edition, vol. 1: Principles and Practice, New York: John Wiley & Sons, 1994, 975-977.*
FSIP, Office Action for RU Application No. 2022121884/04, Jul. 3, 2023.
JPO, Office Action for JP Application No. 2022-543582, Aug. 8, 2023.
IPA, Office Action for AU Application No. 2021208113, Jul. 12, 2023.

(Continued)

*Primary Examiner* — Douglas M Willis
(74) *Attorney, Agent, or Firm* — Hodgson Russ LLP

(57) ABSTRACT

Provided are an azabicyclic substituted oxaspiro derivative, a preparation method therefor and a medical use thereof. Specifically, provided are compounds represented by formula (I) and formula (II) or pharmaceutically acceptable salts, stereoisomers or solvates thereof, and a preparation method therefor and an application thereof.

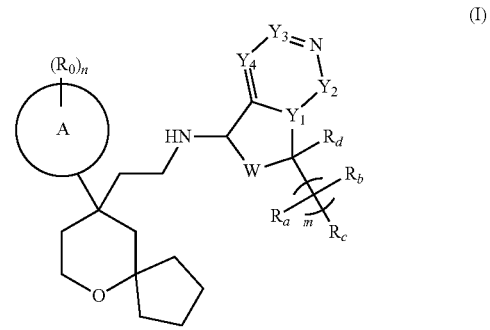

17 Claims, No Drawings

(56) References Cited

OTHER PUBLICATIONS

ISDEC, Office Action for CA Application No. 3164577, Aug. 23, 2023.
FSIP, Office Action for RU Application No. 2022121884/04(045608), Feb. 22, 2023.
CNIPA, First Office Action for CN Application No. 202180001692.X, Mar. 25, 2023.
Bohn et al., "Enhanced Morphine Analgesia in Mice Lacking beta-Arrestin 2," Science, 1999, vol. 286.
Zhang et al., "Role for G protein-coupled receptor kinase in agonist-specific regulation of µ-opioid receptor responsiveness," Proceedings of National Academy of Science: Neurobiology, Jun. 1998, vol. 95.
IPA, Office Action for AU Application No. 2021208113, Mar. 28, 2023.
"University Organic Chemistry Fundamentals II," Chemical Industry Publishing, 2006. vol. 2, No. 2.
Larsen, "Novel Parham-type Cycloacylations of 1H-Pyrazole-1-alkanoic Acids," Synlett, Aug. 1997, No. 8.
WIPO, International Search Report for PCT/CN2021/072015, Apr. 19, 2021.
CNIPA, Second Office Action for CN Application No. 202180001692.X, Feb. 24, 2024.
EPO, Extended European Search Report for EP Application No. 21740740.2, Jan. 23, 2024.
JPO, Decision to Grant a Patent for JP Application No. 2022-543582, Jan. 30, 2024.

\* cited by examiner

SUBSTITUTED OXASPIRO[4.5]DECANES AS MOR RECEPTOR AGONISTS

TECHNICAL FIELD

The present disclosure relates to a class of azabicyclic ring-substituted oxaspirocyclic derivatives and preparation methods therefor, pharmaceutical compositions containing the derivatives, and use thereof as therapeutic agents, particularly as MOR receptor agonists, and use thereof in the preparation of drugs for treating and preventing pain and pain-associated diseases.

BACKGROUND

Opioid receptors are an important class of G protein-coupled receptors (GPCRs), to which endogenous opioid peptides and opioid drugs bind. Endogenous opioid peptides are opioid-like active substances that are naturally produced in mammals, and the known endogenous opioid peptides are broadly classified into enkephalins, endorphins, dynorphins, and neoendorphins. Corresponding opioid receptors, namely μ (MOR) receptor, δ (DOR) receptor, κ (KOR) receptor, and the like, are present in the central nervous system. Studies have found that an analgesic effect of endogenous opioid peptides mainly depends on the expression level of opioid receptors, the targets on which analgesic effects of opioid drugs as well as endogenous opioid peptides act.

Current studies suggest that GPCRs mediate and regulate physiological functions mainly through two pathways: the G protein pathway and the β-arrestin pathway. After a conventional GPCR agonist binds to a receptor, the G protein signaling pathway, which includes second-messenger systems such as calcium ions, adenyl cyclase (AC), and mitogen-activated protein kinases (MAPK), is activated, while a β-arrestin-biased ligand mainly activates the β-arrestin pathway. When mediating GPCR responses, β-arrestin mainly functions as follows: 1) as a negative regulator, it acts with G protein-coupled receptor kinase (GRK) to desensitize GPCRs and stop G protein signal transduction; 2) as a scaffold protein, it recruits endocytic proteins and induces endocytosis of GPCRs; and 3) as an adapter protein, it forms a complex with downstream signaling molecules of GPCRs to activate signal transduction molecules, such as MAPK, Src protein tyrosine kinase, and Akt, in a G protein-independent manner. The differences in ligand-stimulated G protein signaling and/or β-arrestin signaling ultimately determine the ligand-specific cell biological effects of GPCRs.

MOR is an effect target of endogenous enkephalins and opioid analgesics such as morphine. Early studies have shown that endogenous enkephalins and opioid drugs such as etorphine can activate G proteins and trigger endocytosis of receptors, but morphine does not trigger endocytosis of receptors at all because morphine is too weak to agonize the phosphorylation of MOR and can only recruit a trace amount of β-arrestin to the cell membrane (Zhang et al., Proc Natl Acad Sci USA, 1998, 95(12): 7157-7162). Such ligands exert their physiological functions exclusively through the G protein signaling pathway rather than the β-arrestin pathway. Studies have found that an analgesic effect under the mediation of G-protein signaling is stronger and maintained for a longer time after injection of morphine into β-arrestin 2 knockout mice (Bohn et al., Science, 1999). It can be anticipated that if such ligands are much negatively β-arrestin-biased and can even escape from β-arrestin-mediated receptor desensitization, the ligands can lead to prolonged G-protein signaling and more potent analgesic effects.

Currently, MOR agonists have been disclosed in patent applications WO2017106547, WO2017063509, WO2012129495, WO2017106306, etc.

Long-term use of opioid drugs produces tolerance as well as side effects such as respiratory depression and constipation, which have been shown to be closely related to the functions of β-arrestin. To reduce the side effects of opioid drugs, drugs can be designed on the basis of the negatively β-arrestin-biased ligands of MOR so as to reduce $-arrestin-mediated side effects and enhance therapeutic effects.

SUMMARY

An objective of the present disclosure is to provide a compound, which has a novel structure and can be used as an MOR agonist.

In a first aspect, the present disclosure provides a compound as shown in Formula (I), or a pharmaceutically acceptable salt, enantiomer, diastereomer, racemate, mixture of diastereomers, solvate, or prodrug thereof:

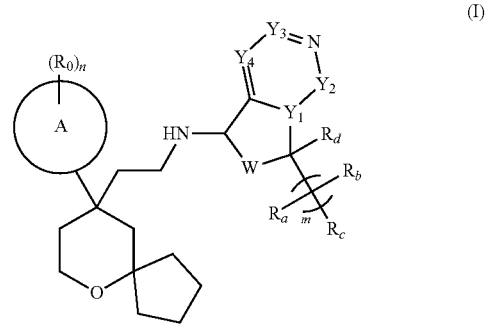

in which, the ring A is a $C_{6-10}$ aromatic ring or a five- or six-membered monocyclic heteroaryl ring;

$(R_0)_n$ indicates that hydrogen atoms on the ring A have been substituted by n $R_0$ groups, where n is 0, 1, 2, 3, or 4, and the n $R_0$ groups are the same or different, and are each independently hydrogen, cyano, acetyl, hydroxyl, hydroxymethyl, hydroxyethyl, carboxyl, halogenated $C_{1-8}$ alkyl (preferably halogenated $C_{1-4}$ alkyl), halogen (preferably F or Cl), nitro, $C_{6-10}$ aryl (preferably phenyl), a five- or six-membered monocyclic heteroaryl, $C_{1-8}$ alkyl (preferably $C_{1-4}$ alkyl), $C_{1-8}$ alkoxyl (preferably $C_{1-4}$ alkoxyl), $C_{3-6}$ cycloalkyl, $C_{3-6}$ cycloalkoxyl, $C_{2-4}$ alkenyl, $C_{2-4}$ alkynyl, $NR_{11}R_{12}$, —$CONR_{11}R_{12}$, —$C(O)O(C_{1-8}$ alkyl) (preferably —$C(O)O(C_{1-4}$ alkyl)), —$OC(O)(C_{1-8}$ alkyl) (preferably —$OC(O)(C_{1-4}$ alkyl)), —$SO_2(C_{1-8}$ alkyl) (preferably —$SO_2(C_{1-4}$ alkyl)), —$SO_2(C_{6-10}$ aryl) (preferably —$SO_2(C_6$ aryl), such as —$SO_2$-phenyl), —$CO(C_{6-10}$ aryl) (preferably —$CO(C_6$ aryl), such as —CO-phenyl), a four- to six-membered saturated monoheterocyclic ring, or a three- to six-membered saturated monocyclic ring, in which the $C_{6-10}$ aryl, the five- or six-membered monocyclic heteroaryl, the four- to six-membered saturated monoheterocyclic ring, and the three- to six-membered saturated monocyclic ring are each unsubstituted or substituted with one, two, or three substituent groups selected from the group consisting of acetyl, hydroxyl, cyano, halogen, $C_{1-3}$ alkyl, $C_{1-3}$ alkoxyl, $C_{3-6}$ cycloalkyl, and $NR_{11}R_{12}$;

$Y_1$ is $CR_1$ or N;

$Y_2$ is a bond, $NR_2$, C=O, or $SO_2$;

$Y_3$ is $CR_3$ or N;

$Y_4$ is $CR_4$ or N;

when $Y_2$ is a bond, $Y_1$ is directly linked to N;

$R_1$, $R_3$, and $R_4$ are each independently hydrogen, cyano, hydroxyl, hydroxymethyl, cyanomethyl, halogen, $C_{1-8}$ alkoxyl (preferably $C_{1-4}$ alkoxyl), $C_{1-8}$ alkyl (preferably $C_{1-4}$ alkyl), —$CO(C_{1-8}$ alkyl) (preferably —$CO(C_{1-4}$ alkyl)), —$CONR_{11}R_{12}$, $NR_{11}R_{12}$, —$NHCO(C_{1-8}$ alkyl) (preferably —$NHCO(C_{1-4}$ alkyl)), —$NHCONR_{11}R_{12}$, —$NHSO_2(C_{1-8}$ alkyl) (preferably —$NHSO_2(C_{1-4}$ alkyl)), —$NHSO_2NR_{11}R_{12}$, or —$NHSO_2(C_{3-6}$ cycloalkyl);

$R_2$ is hydrogen, $C_{1-8}$ alkyl (preferably $C_{1-4}$ alkyl), —CO($C_{1-8}$ alkyl) (preferably —$CO(C_{1-4}$ alkyl)), —$CONR_{11}R_{12}$, or —$SO_2(C_{1-8}$ alkyl) (preferably —$SO_2(C_{1-4}$ alkyl));

W is $CR_{w1}R_{w2}$, $NR_{w3}$, O, or C=O, $R_{w1}$ and $R_{w2}$ are each independently hydrogen, halogen (preferably F or Cl), $C_{1-8}$ alkyl (preferably $C_{1-4}$ alkyl), halogenated $C_{1-8}$ alkyl (preferably halogenated $C_{1-4}$ alkyl), or halogenated $C_{1-8}$ alkoxyl (preferably halogenated $C_{1-4}$ alkoxyl); or $R_{w1}$ and $R_{w2}$ together with the carbon atom linked thereto form a four- to six-membered saturated monoheterocyclic ring or a three- to six-membered saturated monocyclic ring, in which the four- to six-membered saturated monoheterocyclic ring and the three- to six-membered saturated monocyclic ring are each unsubstituted or substituted with one, two, or three substituent groups selected from the group consisting of cyano, hydroxyl, hydroxymethyl, cyanomethyl, halogen, $C_{1-8}$ alkoxyl (preferably $C_{1-4}$ alkoxyl), $C_{1-8}$ alkyl (preferably $C_{1-4}$ alkyl), —$CO(C_{1-8}$ alkyl) (preferably —$CO(C_{1-4}$ alkyl)), —$CONR_{11}R_{12}$, $NR_{11}R_{12}$, —$NHCO(C_{1-8}$ alkyl) (preferably —$NHCO(C_{1-4}$ alkyl)), —$NHCONR_{11}R_{12}$, —$NHSO_2(C_{1-8}$ alkyl) (preferably —$NHSO_2(C_{1-4}$ alkyl)), —$NHSO_2NR_{11}R_{12}$, and —$NHSO_2(C_{3-6}$ cycloalkyl);

$R_{w3}$ is hydrogen, $C_{1-8}$ alkyl (preferably $C_{1-4}$ alkyl), or —$CO(C_{1-8}$ alkyl) (preferably —$CO(C_{1-4}$ alkyl));

$R_a$, $R_b$, $R_c$, and $R_d$ are defined as follows:

(i) $R_a$ and $R_b$ are each independently hydrogen, halogen (preferably F or Cl), $C_{1-8}$ alkyl (preferably $C_{1-4}$ alkyl, and more preferably methyl, ethyl, n-propyl, or isopropyl), halogenated $C_{1-8}$ alkyl (preferably halogenated $C_{1-4}$ alkyl), or halogenated $C_{1-8}$ alkoxyl (preferably halogenated $C_{1-4}$ alkoxyl); or $R_a$ and $R_b$ together with the carbon atom linked thereto form a four- to six-membered saturated monoheterocyclic ring or a three- to six-membered saturated monocyclic ring (preferably a three- to five-membered saturated monocyclic ring, and more preferably a cyclopropyl ring, a cyclobutyl ring, or a cyclopentyl ring), in which the four- to six-membered saturated monoheterocyclic ring and the three- to six-membered saturated monocyclic ring are each unsubstituted or substituted with one, two, or three substituent groups selected from the group consisting of cyano, hydroxyl, hydroxymethyl, cyanomethyl, halogen, $C_{1-8}$ alkoxyl (preferably $C_{1-4}$ alkoxyl), $C_{1-8}$ alkyl (preferably $C_{1-4}$ alkyl), —$CO(C_{1-8}$ alkyl) (preferably —$CO(C_{1-4}$ alkyl)), —$CONR_{11}R_{12}$, $NR_{11}R_{12}$, —$NHCO(C_{1-8}$ alkyl) (preferably —$NHCO(C_{1-4}$ alkyl)), —$NHCONR_{11}R_{12}$, —$NHSO_2(C_{1-8}$ alkyl) (preferably —$NHSO_2(C_{1-4}$ alkyl)), —$NHSO_2NR_{11}R_{12}$, and —$NHSO_2(C_{3-6}$ cycloalkyl);

$R_c$ is hydrogen, halogen (preferably F or Cl), $C_{1-8}$ alkyl (preferably $C_{1-4}$ alkyl, and more preferably methyl), $C_{2-10}$ alkenyl (preferably $C_{2-6}$ alkenyl, and more preferably $C_{2-4}$ alkenyl), $C_{2-10}$ alkynyl (preferably $C_{2-6}$ alkynyl, and more preferably $C_{2-4}$ alkynyl), $C_{1-8}$ alkoxyl (preferably $C_{1-4}$ alkoxyl, and more preferably methoxy), halogenated $C_{1-8}$ alkyl (preferably halogenated $C_{1-4}$ alkyl, and more preferably trifluoromethyl), halogenated $C_{1-8}$ alkoxyl (preferably halogenated $C_{1-4}$ alkoxyl), —$CO(C_{1-8}$ alkyl) (preferably —$CO(C_{1-4}$ alkyl)), —$CONR_{11}R_{12}$, $NR_{11}R_{12}$, —$NHCO(C_{1-8}$ alkyl) (preferably —$NHCO(C_{1-4}$ alkyl)), —$NHCONR_{11}R_{12}$, —$NHSO_2(C_{1-8}$ alkyl) (preferably —$NHSO_2(C_{1-4}$ alkyl)), —$NHSO_2NR_{11}R_{12}$, —$NHSO_2(C_{3-6}$ cycloalkyl), —$SO_2(C_{1-8}$ alkyl) (preferably —$SO_2(C_{1-4}$ alkyl)), —$SO_2NR_{11}R_{12}$, a four- to six-membered saturated monoheterocyclic ring, $C_{6-10}$ aryl, or a five- or six-membered monocyclic heteroaryl, in which the four- to six-membered saturated monoheterocyclic ring, the $C_{6-10}$ aryl, and the five- or six-membered monocyclic heteroaryl are each unsubstituted or substituted with one, two, or three substituent groups selected from the group consisting of cyano, hydroxyl, hydroxymethyl, cyanomethyl, halogen, $C_{1-8}$ alkoxyl (preferably $C_{1-4}$ alkoxyl), $C_{1-8}$ alkyl (preferably $C_{1-4}$ alkyl), —$CO(C_{1-8}$ alkyl) (preferably —$CO(C_{1-4}$ alkyl)), —$CONR_{11}R_{12}$, $NR_{11}R_{12}$, —$NHCO(C_{1-8}$ alkyl) (preferably —$NHCO(C_{1-4}$ alkyl)), —$NHCONR_{11}R_{12}$, —$NHSO_2(C_{1-8}$ alkyl) (preferably —$NHSO_2(C_{1-4}$ alkyl)), —$NHSO_2NR_{11}R_{12}$, and —$NHSO_2(C_{3-6}$ cycloalkyl);

$R_d$ is hydrogen or $C_{1-8}$ alkyl (preferably $C_{1-4}$ alkyl); or (ii) $R_a$ and $R_b$ are each independently hydrogen, halogen (preferably F or Cl), $C_{1-8}$ alkyl (preferably $C_{1-4}$ alkyl), halogenated $C_{1-8}$ alkyl (preferably halogenated $C_{1-4}$ alkyl), or halogenated $C_{1-8}$ alkoxyl (preferably halogenated $C_{1-4}$ alkoxyl);

$R_c$ is linked to $R_d$ to form a three- to six-membered saturated monocyclic ring or a four- to six-membered saturated monoheterocyclic ring;

$R_{11}$ and $R_{12}$ are each independently hydrogen, $C_{1-8}$ alkyl (preferably $C_{1-4}$ alkyl), halogenated $C_{1-8}$ alkyl (preferably halogenated $C_{1-4}$ alkyl), $C_{3-6}$ cycloalkyl, or a four- to six-membered saturated monoheterocyclic ring; or $R_{11}$ and $R_{12}$ together with the nitrogen atom linked thereto form a four- to six-membered saturated monoheterocyclic ring, in which the four- to six-membered saturated monoheterocyclic ring is unsubstituted or substituted with one, two, or three $C_{1-4}$ alkyl groups;

m is 0 or 1.

In another preferred embodiment, the ring A is a five- or six-membered monocyclic heteroaryl ring that is selected from the group consisting of thiophene, furan, thiazole, imidazole, oxazole, pyrrole, pyrazole, triazole, 1,2,3-triazole, 1,2,4-triazole, 1,2,5-triazole, 1,3,4-triazole, tetrazole, isoxazole, oxadiazole, 1,2,3-oxadiazole, 1,2,4-oxadiazole, 1,2,5-oxadiazole, 1,3,4-oxadiazole, thiadiazole, pyridine, pyridazine, pyrimidine, and pyrazine.

In another preferred embodiment, the ring A is a benzene ring or a pyridine ring.

In another preferred embodiment, W is $CR_{w1}R_{w2}$.

In another preferred embodiment, W is $CH_2$.

In another preferred embodiment, W is $NR_{w3}$ or O.

In another preferred embodiment, W is C=O.

In another preferred embodiment, $R_{w1}$ and $R_{w2}$ together with the carbon atom linked thereto form a four- to six-membered saturated monoheterocyclic ring that is selected from the group consisting of azetidine, oxetane, tetrahydrofuran, tetrahydrothiophene, tetrahydropyrrole, piperidine, piperazine, morpholine, thiomorpholine, thiomorpholine-1,1-dioxide, and tetrahydropyran.

In another preferred embodiment, $R_{w1}$ and $R_{w2}$ together with the carbon atom linked thereto form a three- to six-membered saturated monocyclic ring that is selected from the group consisting of a cyclopropyl ring, a cyclobutyl ring, a cyclopentyl ring, and a cyclohexyl ring.

In another preferred embodiment,

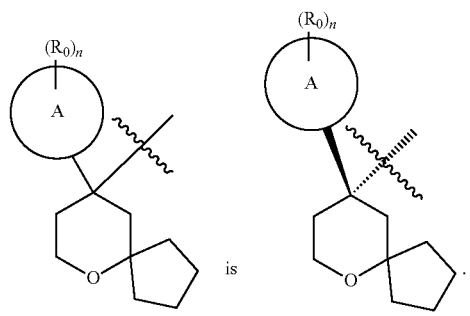

is

In another preferred embodiment, $R_c$ is linked to $R_d$ to form a three- to six-membered saturated monocyclic ring that is selected from the group consisting of a cyclopropyl ring, a cyclobutyl ring, a cyclopentyl ring, and a cyclohexyl ring.

In another preferred embodiment, $R_c$ is linked to $R_d$ to form a four- to six-membered saturated monoheterocyclic ring that is selected from the group consisting of azetidine, oxetane, tetrahydrofuran, tetrahydrothiophene, tetrahydropyrrole, piperidine, piperazine, morpholine, thiomorpholine, thiomorpholine-1,1-dioxide, and tetrahydropyran.

In a second aspect, the present disclosure provides a compound as shown in Formula (II), or a pharmaceutically acceptable salt, enantiomer, diastereomer, racemate, mixture of diastereomers, solvate, or prodrug thereof:

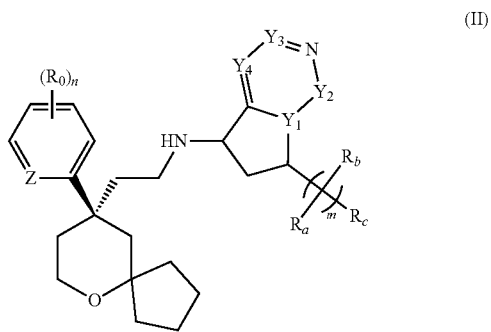

(II)

in which,

Z is $CR_{01}$ or N;

$R_{01}$ is hydrogen, cyano, acetyl, hydroxyl, hydroxymethyl, hydroxyethyl, carboxyl, halogenated $C_{1-8}$ alkyl (preferably halogenated $C_{1-4}$ alkyl), halogen (preferably F or Cl), $C_{1-8}$ alkyl (preferably $C_{1-4}$ alkyl), $C_{1-8}$ alkoxyl (preferably $C_{1-4}$ alkoxyl), $C_{3-6}$ cycloalkyl, or $NR_{11}R_{12}$;

$(R_0)_n$ indicates that hydrogen atoms on the six-membered ring have been substituted by n $R_0$ groups, where n is 0, 1, 2, 3, or 4, and the n $R_0$ groups are the same or different, and are each independently hydrogen, cyano, acetyl, hydroxyl, hydroxymethyl, hydroxyethyl, carboxyl, halogenated $C_{1-8}$ alkyl (preferably halogenated $C_{1-4}$ alkyl), halogen (preferably F or Cl), nitro, $C_{6-10}$-aryl (preferably phenyl), a five- or six-membered monocyclic heteroaryl, $C_{1-8}$ alkyl (preferably $C_{1-4}$ alkyl), $C_{1-8}$ alkoxyl (preferably $C_{1-4}$ alkoxyl), $C_{3-6}$ cycloalkyl, $C_{3-6}$ cycloalkoxyl, $C_{2-4}$ alkenyl, $C_{2-4}$ alkynyl, $NR_{11}R_{12}$, —$CONR_{11}R_{12}$, —$C(O)O(C_{1-8}$ alkyl) (preferably —$C(O)O(C_{1-4}$ alkyl)), —$OC(O)(C_{1-8}$ alkyl) (preferably —$OC(O)(C_{1-4}$ alkyl)), —$SO_2(C_{1-8}$ alkyl) (preferably —$SO_2(C_{1-4}$ alkyl)), —$SO_2(C_{6-10}$ aryl) (preferably —$SO_2C_6$ aryl, such as —$SO_2$-phenyl), —$CO(C_{6-10}$ aryl) (preferably —$COC_6$ aryl, such as —CO-phenyl), a four- to six-membered saturated monoheterocyclic ring, or a three- to six-membered saturated monocyclic ring, in which the $C_{6-10}$ aryl, the five- or six-membered monocyclic heteroaryl, the four- to six-membered saturated monoheterocyclic ring, and the three- to six-membered saturated monocyclic ring are each unsubstituted or substituted with one, two, or three substituent groups selected from the group consisting of acetyl, hydroxyl, cyano, halogen, $C_{1-3}$ alkyl, $C_{1-3}$ alkoxyl, $C_{3-6}$ cycloalkyl, and $NR_{11}R_{12}$;

$Y_1$ is $CR_1$ or N;

$Y_2$ is a bond, $NR_2$, C=O, or $SO_2$;

$Y_3$ is $CR_3$ or N;

$Y_4$ is $CR_4$ or N;

when $Y_2$ is a bond, $Y_1$ is directly linked to N;

$R_1$, $R_3$, and $R_4$ are each independently hydrogen, cyano, hydroxyl, hydroxymethyl, cyanomethyl, halogen, $C_{1-8}$ alkoxyl (preferably $C_{1-4}$ alkoxyl), $C_{1-8}$ alkyl (preferably $C_{1-4}$ alkyl), —$CO(C_{1-8}$ alkyl) (preferably —$CO(C_{1-4}$ alkyl)), —$CONR_{11}R_{12}$, $NR_{11}R_{12}$, —$NHCO(C_{1-8}$ alkyl) (preferably —$NHCO(C_{1-4}$ alkyl)), —$NHCONR_{11}R_{12}$, —$NHSO_2(C_{1-8}$ alkyl) (preferably —$NHSO_2(C_{1-4}$ alkyl)), —$NHSO_2NR_{11}R_{12}$, or —$NHSO_2(C_{3-6}$ cycloalkyl);

$R_2$ is hydrogen, $C_{1-8}$ alkyl (preferably $C_{1-4}$ alkyl), —CO($C_{1-8}$ alkyl) (preferably —$CO(C_{1-4}$ alkyl)), —$CONR_{11}R_{12}$, or —$SO_2(C_{1-8}$ alkyl) (preferably —$SO_2(C_{1-4}$ alkyl));

$R_a$ and $R_b$ are each independently hydrogen, halogen (preferably F or Cl), $C_{1-8}$ alkyl (preferably $C_{1-4}$ alkyl), halogenated $C_{1-8}$ alkyl (preferably halogenated $C_{1-4}$ alkyl), or halogenated $C_{1-8}$ alkoxyl (preferably halogenated $C_{1-4}$ alkoxyl); or $R_a$ and $R_b$ together with the carbon atom linked thereto form a four- to six-membered saturated monoheterocyclic ring or a three- to six-membered saturated monocyclic ring, in which the four- to six-membered saturated monoheterocyclic ring and the three- to six-membered saturated monocyclic ring are each unsubstituted or substituted with one, two, or three substituent groups selected from the group consisting of cyano, hydroxyl, hydroxymethyl, cyanomethyl, halogen, $C_{1-8}$ alkoxyl (preferably $C_{1-4}$ alkoxyl), $C_{1-8}$ alkyl (preferably $C_{1-4}$ alkyl), —$CO(C_{1-8}$ alkyl) (preferably —$CO(C_{1-4}$ alkyl)), —$CONR_{11}R_{12}$, $NR_{11}R_{12}$, —$NHCO(C_{1-8}$ alkyl) (preferably —$NHCO(C_{1-4}$ alkyl)), —$NHCONR_{11}R_{12}$, —$NHSO_2(C_{1-8}$ alkyl) (preferably —$NHSO_2(C_{1-4}$ alkyl)), —$NHSO_2NR_{11}R_{12}$, and —$NHSO_2(C_{3-6}$ cycloalkyl);

$R_c$ is hydrogen, halogen (preferably F or Cl), $C_{1-8}$ alkyl (preferably $C_{1-4}$ alkyl), $C_{2-10}$ alkenyl (preferably $C_{2-6}$ alkenyl, and more preferably $C_{2-4}$ alkenyl), $C_{2-10}$ alkynyl (preferably $C_{2-6}$ alkynyl, and more preferably $C_{2-4}$ alkynyl), $C_{1-8}$ alkoxyl (preferably $C_{1-4}$ alkoxyl), halogenated $C_{1-8}$ alkyl (preferably halogenated $C_{1-4}$ alkyl), halogenated $C_{1-8}$ alkoxyl (preferably halogenated $C_{1-4}$ alkoxyl), —CO($C_{1-8}$ alkyl) (preferably —CO($C_{1-4}$ alkyl)), —CONR$_{11}$R$_{12}$, NR$_{11}$R$_{12}$, —NHCO($C_{1-8}$ alkyl) (preferably —NHCO($C_{1-4}$ alkyl)), —NHCONR$_{11}$R$_{12}$, —NHSO$_2$($C_{1-8}$ alkyl) (preferably —NHSO$_2$($C_{1-4}$ alkyl)), —NHSO$_2$NR$_{11}$R$_{12}$, —NHSO$_2$($C_{3-6}$ cycloalkyl), —SO$_2$(C-8 alkyl) (preferably —SO$_2$(C-4 alkyl)), —SO$_2$NR$_{11}$R$_{12}$, a four- to six-membered saturated monoheterocyclic ring, $C_{6-10}$ aryl, or a five- or six-membered monocyclic heteroaryl, in which the four- to six-membered saturated monoheterocyclic ring, the $C_{6-10}$ aryl, and the five- or six-membered monocyclic heteroaryl are each unsubstituted or substituted with one, two, or three substituent groups selected from the group consisting of cyano, hydroxyl, hydroxymethyl, cyanomethyl, halogen, $C_{1-8}$ alkoxyl (preferably $C_{1-4}$ alkoxyl), $C_{1-8}$ alkyl (preferably $C_{1-4}$ alkyl), —CO($C_{1-8}$ alkyl) (preferably —CO($C_{1-4}$ alkyl)), —CONRuR12, NR$_{11}$R$_{12}$, —NHCO($C_{1-8}$ alkyl) (preferably —NHCO($C_{1-4}$ alkyl)), —NHCONR$_{11}$R$_{12}$, —NHSO$_2$($C_{1-8}$ alkyl) (preferably —NHSO$_2$($C_{1-4}$ alkyl)), —NHSO$_2$NR$_{11}$R$_{12}$, and —NHSO$_2$($C_{3-6}$ cycloalkyl), $R_{11}$ and $R_{12}$ are each independently hydrogen, $C_{1-8}$ alkyl (preferably $C_{1-4}$ alkyl), halogenated $C_{1-8}$ alkyl (preferably halogenated $C_{1-4}$ alkyl), $C_{3-6}$ cycloalkyl, or a four- to six-membered saturated monoheterocyclic ring; or $R_{11}$ and $R_{12}$ together with the nitrogen atom linked thereto form a four- to six-membered saturated monoheterocyclic ring, in which the four- to six-membered saturated monoheterocyclic ring is unsubstituted or substituted with one, two, or three $C_{1-4}$ alkyl groups; and m is 0 or 1.

In another preferred embodiment, $Y_1$ is N or CH.

In another preferred embodiment, $Y_2$ is a bond or C═O.

In another preferred embodiment, $Y_3$ is CR$_3$.

In another preferred embodiment, $Y_3$ is CH or N.

In another preferred embodiment, $Y_4$ is CR$_4$.

In another preferred embodiment, $Y_4$ is CH or N.

In another preferred embodiment, $Y_1$ is N; $Y_2$ is a bond; $Y_3$ is CR$_3$ or N; $Y_4$ is CR$_4$ or N; and $R_3$ and $R_4$ are as defined above.

In another preferred embodiment, $Y_1$ is N; $Y_2$ is a bond; $Y_3$ is CR$_3$; $Y_4$ is CR$_4$; and $R_3$ and $R_4$ are as defined above.

In another preferred embodiment, $Y_1$ is N; $Y_2$ is a bond; $Y_3$ is CH; and $Y_4$ is CH.

In another preferred embodiment, $Y_1$ is N; $Y_2$ is C═O; $Y_3$ is CR$_3$ or N; $Y_4$ is CR$_4$ or N; and $R_3$ and $R_4$ are as defined above.

In another preferred embodiment, $Y_1$ is CR$_1$; $Y_2$ is a bond; $Y_3$ is CR$_3$ or N; $Y_4$ is CR$_4$ or N; and $R_1$, $R_3$, and $R_4$ are as defined above.

In another preferred embodiment, m is 1.

In another preferred embodiment, Z is N.

In another preferred embodiment, Z is CR$_{01}$; and R$_{01}$ is hydrogen, cyano, acetyl, hydroxy, hydroxymethyl, hydroxyethyl, carboxyl, halogenated $C_{1-3}$ alkyl, F, $C_1$, $C_{1-3}$ alkyl, $C_{1-3}$ alkoxyl, or $C_{3-6}$ cycloalkyl.

In another preferred embodiment, Z is CH.

In another preferred embodiment, the compound as shown in Formula (II) has a structure represented by Formula (III):

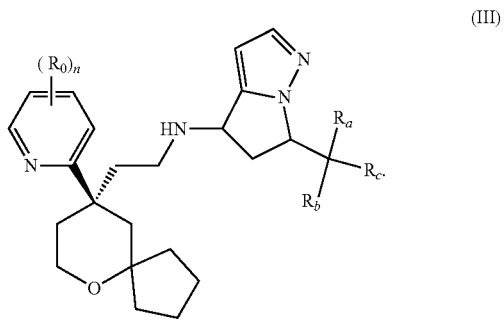

(III)

In another preferred embodiment, the five- or six-membered monocyclic heteroaryl related to $R_0$ is selected from thiophene, furan, thiazole, imidazole, oxazole, pyrrole, pyrazole, triazole, 1,2,3-triazole, 1,2,4-triazole, 1,2,5-triazole, 1,3,4-triazole, tetrazole, isoxazole, oxadiazole, 1,2,3-oxadiazole, 1,2,4-oxadiazole, 1,2,5-oxadiazole, 1,3,4-oxadiazole, thiadiazole, pyridine, pyridazine, pyrimidine, or pyrazine.

In another preferred embodiment, the four- to six-membered saturated monoheterocyclic ring related to $R_0$ is selected from the group consisting of azetidine, oxetane, tetrahydrofuran, tetrahydrothiophene, tetrahydropyrrole, piperidine, piperazine, morpholine, thiomorpholine, thiomorpholine-1,1-dioxide, and tetrahydropyran.

In another preferred embodiment, $R_a$ and $R_b$ together with the carbon atom linked thereto form a four- to six-membered saturated monoheterocyclic ring that is selected from the group consisting of azetidine, oxetane, tetrahydrofuran, tetrahydrothiophene, tetrahydropyrrole, piperidine, piperazine, morpholine, thiomorpholine, thiomorpholine-1,1-dioxide, and tetrahydropyran.

In another preferred embodiment, $R_a$ and $R_b$ together with the carbon atom linked thereto form a three- to six-membered saturated monocyclic ring that is selected from a cyclopropyl ring, a cyclobutyl ring, a cyclopentyl ring, and a cyclohexyl ring.

In another preferred embodiment, the five- or six-membered monocyclic heteroaryl related to $R_c$ is selected from thiophene, furan, thiazole, imidazole, oxazole, pyrrole, pyrazole, triazole, 1,2,3-triazole, 1,2,4-triazole, 1,2,5-triazole, 1,3,4-triazole, tetrazole, isoxazole, oxadiazole, 1,2,3-oxadiazole, 1,2,4-oxadiazole, 1,2,5-oxadiazole, 1,3,4-oxadiazole, thiadiazole, pyridine, pyridazine, pyrimidine, or pyrazine.

In another preferred embodiment, the four- to six-membered saturated monoheterocyclic ring related to $R_c$ is selected from the group consisting of azetidine, oxetane, tetrahydrofuran, tetrahydrothiophene, tetrahydropyrrole, piperidine, piperazine, morpholine, thiomorpholine, thiomorpholine-1,1-dioxide, and tetrahydropyran.

In another preferred embodiment, the four- to six-membered saturated monoheterocyclic ring related to $R_1$ and $R_{12}$ is selected from the group consisting of azetidine, oxetane, tetrahydrofuran, tetrahydrothiophene, tetrahydropyrrole, piperidine, piperazine, morpholine, thiomorpholine, thiomorpholine-1,1-dioxide, and tetrahydropyran.

In another preferred embodiment, $R_1$ and $R_{12}$ together with the nitrogen atom linked thereto form a four- to six-membered saturated monoheterocyclic ring that is selected from the group consisting of azetidine, tetrahydropyrrole, piperidine, piperazine, morpholine, thiomorpholine, and thiomorpholine-1,1-dioxide.

In another preferred embodiment, $R_a$ and $R_b$ are each independently hydrogen or $C_{1-3}$ alkyl (preferably methyl); or it and $R_b$ together with the carbon atom linked thereto form a three- to six-membered saturated monocyclic ring (preferably a cyclopropyl ring, a cyclobutyl ring, or a cyclopentyl ring).

In another preferred embodiment, $R_c$ is hydrogen, halogen (preferably F), $C_{1-3}$ alkyl (preferably methyl, ethyl, or n-propyl), $C_{1-3}$ alkoxyl (preferably methoxy) or halogenated $C_{1-3}$ alkyl (preferably trifluoromethyl).

In another preferred embodiment, n is 0.

In another preferred embodiment, the four- to six-membered saturated monoheterocyclic ring is selected from the following structures:

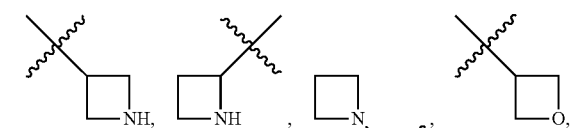

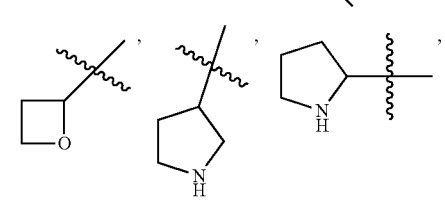

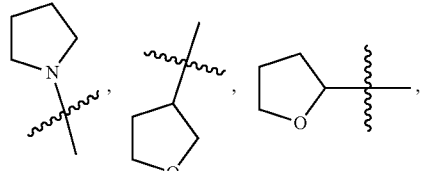

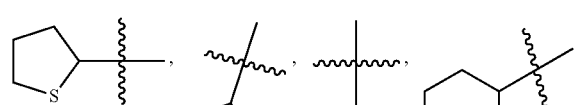

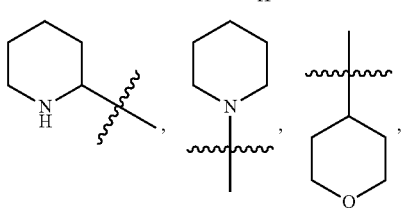

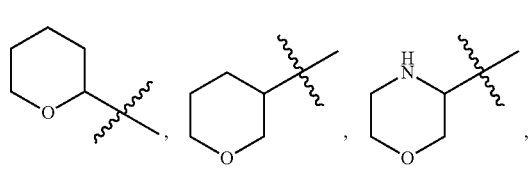

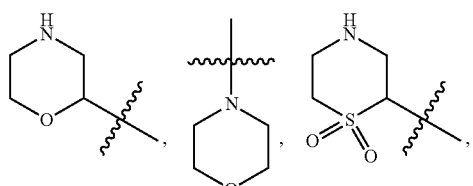

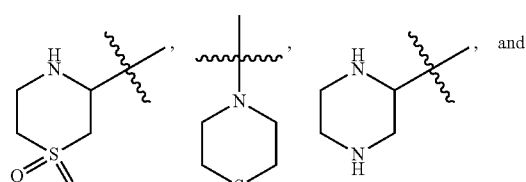

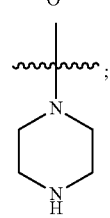

and hydrogen atoms on the four- to six-membered saturated monoheterocyclic ring are optionally substituted by one, two, or three substituent groups each independently selected from the group consisting of cyano, hydroxyl, hydroxymethyl, cyanomethyl, halogen, $C_{1-8}$ alkoxyl (preferably $C_{1-4}$ alkoxyl), $C_{1-8}$ alkyl (preferably $C_{1-4}$ alkyl), —CO($C_{1-8}$ alkyl) (preferably —CO($C_{1-4}$ alkyl)), —CONR$_{11}$R$_{12}$, NR$_{11}$R$_{12}$, —NHCO($C_{1-8}$ alkyl) (preferably —NHCO($C_{1-4}$ alkyl)), —NHCONR$_{11}$R$_{12}$, —NHSO$_2$($C_{1-8}$ alkyl) (preferably —NHSO$_2$($C_{1-4}$ alkyl)), —NHSO$_2$NR$_{11}$R$_{12}$, and —NHSO$_2$($C_{3-6}$ cycloalkyl).

In another preferred embodiment, the five- or six-membered monocyclic heteroaryl related to the ring A, the five- or six-membered monocyclic heteroaryl related to $R_0$, and the five- or six-membered monocyclic heteroaryl related to $R_c$ are each independently selected from the following structures:

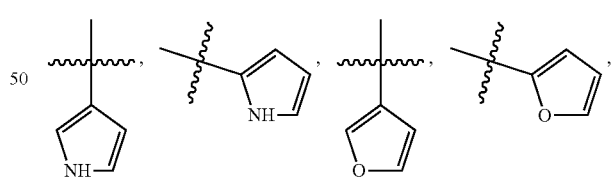

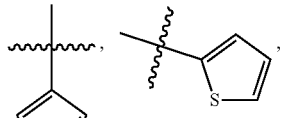

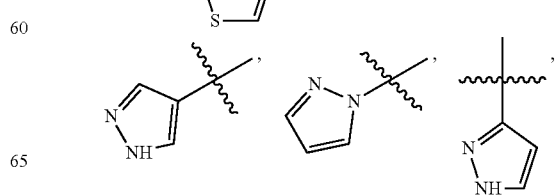

-continued

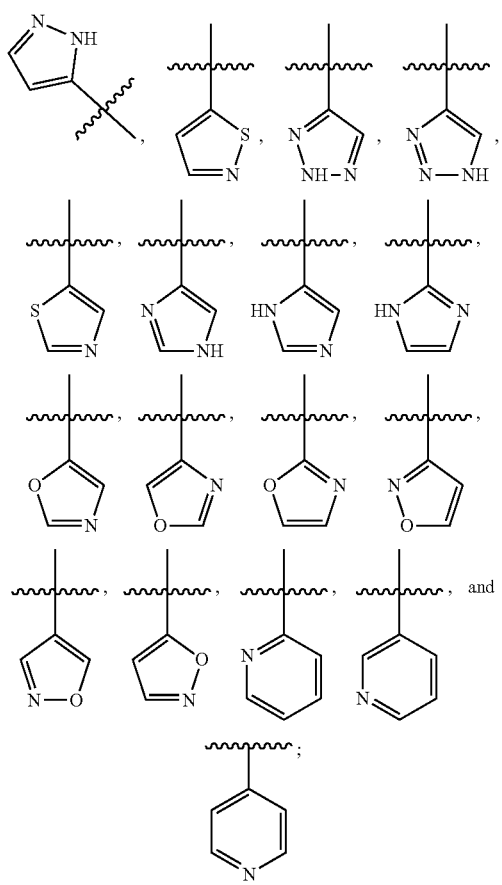

and the five- or six-membered monocyclic heteroaryl is optionally substituted with one, two, or three substituent groups each independently selected from the group consisting of cyano, hydroxyl, hydroxymethyl, cyanomethyl, halogen, $C_{1-8}$ alkoxyl (preferably $C_{1-4}$ alkoxyl), $C_{1-8}$ alkyl (preferably $C_{1-4}$ alkyl), —CO($C_{1-8}$ alkyl) (preferably —CO($C_{1-4}$ alkyl)), —CONR$_{11}$R$_{12}$, NR$_{11}$R$_{12}$, —NHCO($C_{1-8}$ alkyl) (preferably —NHCO($C_{1-4}$ alkyl)), —NHCONR$_{11}$R$_{12}$, —NHSO$_2$($C_{1-8}$ alkyl) (preferably —NHSO$_2$($C_{1-4}$ alkyl)), —NHSO$_2$NR$_{11}$R$_{12}$, and —NHSO$_2$($C_{3-6}$ cycloalkyl).

In another preferred embodiment, the compound is selected from the group consisting of

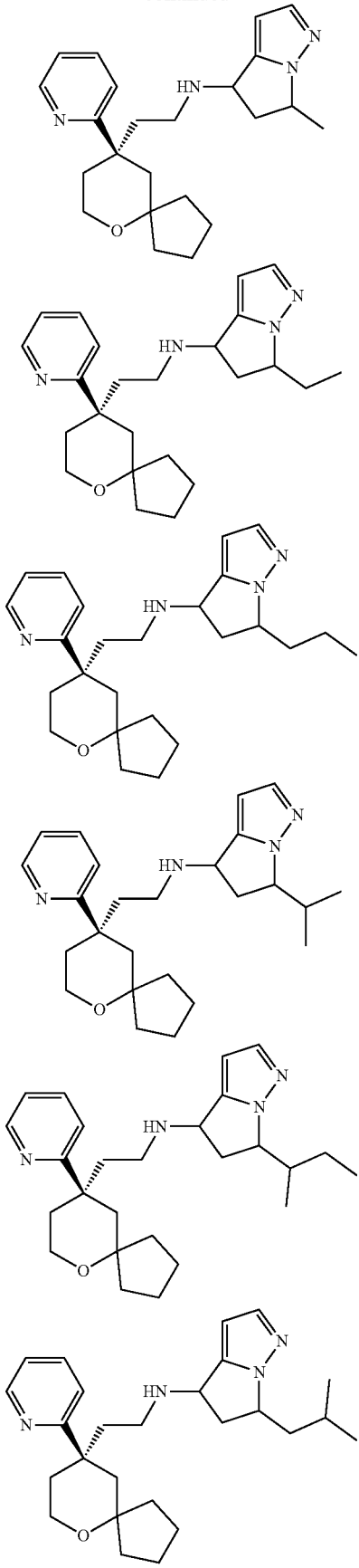

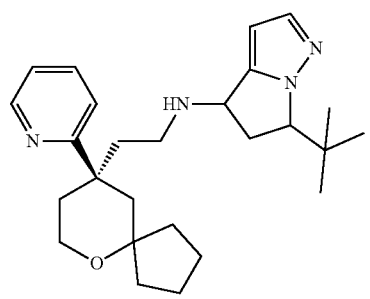
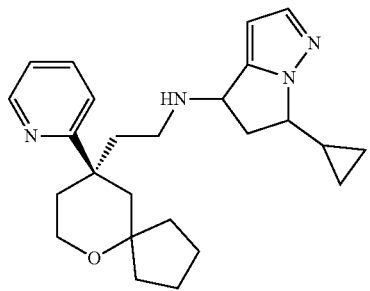
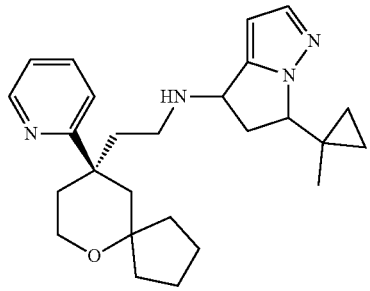
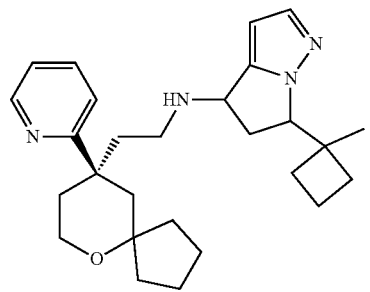
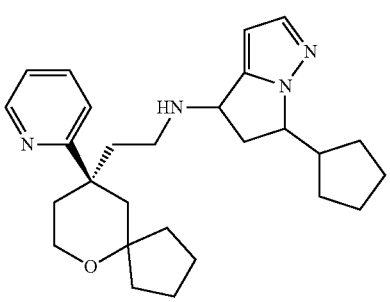
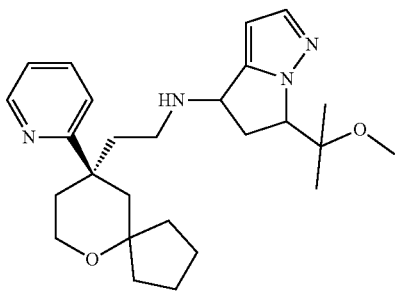
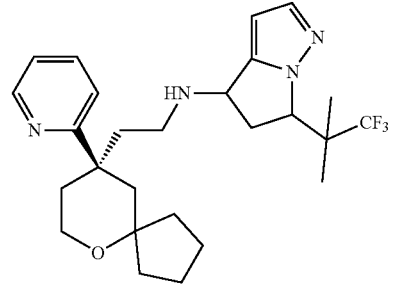
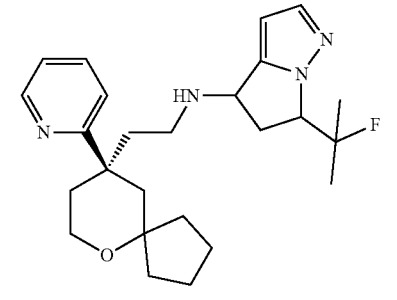
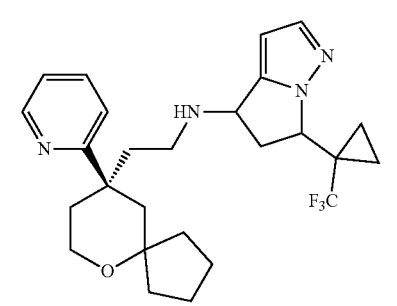
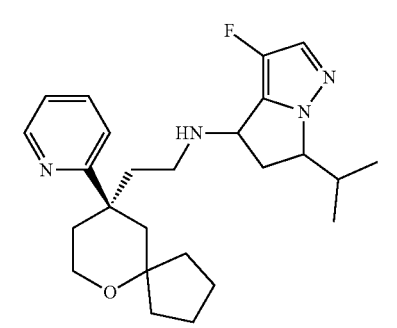

15
-continued

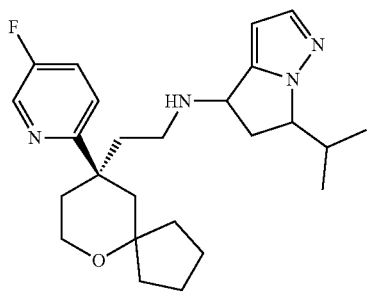

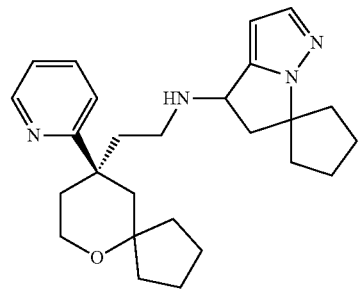

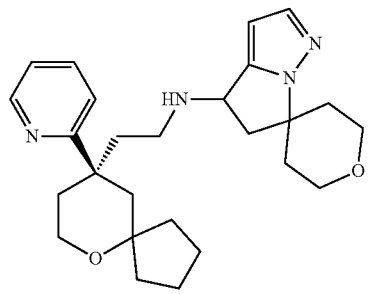

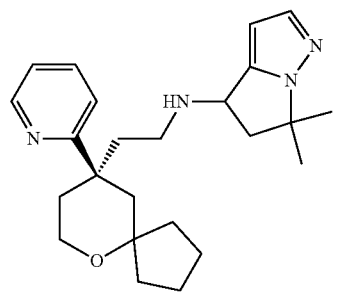

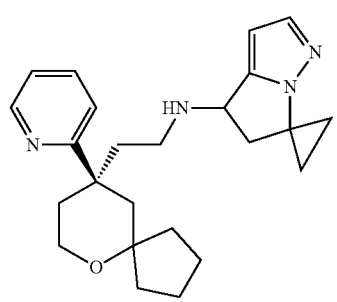

16
-continued

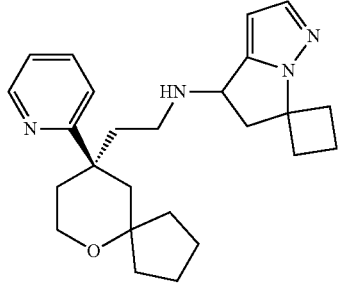

In a third aspect, the present disclosure provides a pharmaceutical composition, which includes the compound, or the pharmaceutically acceptable salt, enantiomer, diastereomer, racemate, mixture of diastereomers, solvate, or prodrug thereof according to the first or second aspect of the present disclosure; and a pharmaceutically acceptable carrier.

In a fourth aspect, the present disclosure provides use of the compound, or the pharmaceutically acceptable salt, enantiomer, diastereomer, racemate, mixture of diastereomers, solvate, or prodrug thereof according to the first or second aspect of the present disclosure, or the pharmaceutical composition according to the third aspect of the present disclosure in manufacture of a medicament for preventing and/or treating a MOR receptor agonist-mediated disease.

In a fifth aspect, the present disclosure provides use of the compound, or the pharmaceutically acceptable salt, enantiomer, diastereomer, racemate, mixture of diastereomers, solvate, or prodrug thereof according to the first or second aspect of the present disclosure, or the pharmaceutical composition according to the third aspect of the present disclosure in manufacture of a medicament for activating or antagonizing MOR receptors.

In a sixth aspect, the present disclosure provides use of the compound, or the pharmaceutically acceptable salt, enantiomer, diastereomer, racemate, mixture of diastereomers, solvate, or prodrug thereof according to the first or second aspect of the present disclosure, or the pharmaceutical composition according to the third aspect of the present disclosure in manufacture of a medicament for preventing and/or treating pain and a pain-associated disease.

In another preferred embodiment, the MOR receptor agonist-mediated disease is selected from the group consisting of pain, immune dysfunction, inflammation, esophageal reflux, neurological and psychiatric diseases, urological and reproductive diseases, cardiovascular diseases, and respiratory diseases, preferably pain.

In another preferred embodiment, the pain is selected from the group consisting of postoperative pain, pain caused by cancer, neuropathic pain, traumatic pain, and pain caused by inflammation.

In another preferred embodiment, the cancer is selected from the group consisting of breast cancer, endometrial cancer, cervical cancer, skin cancer, prostate cancer, ovarian cancer, fallopian tube tumor, ovarian tumor, hemophilia, and leukemia.

In a seventh aspect, the present disclosure provides a method for preventing and/or treating a MOR receptor agonist-mediated disease, which includes: administrating a therapeutically effective amount of the compound, or the pharmaceutically acceptable salt, enantiomer, diastereomer, racemate, mixture of diastereomers, solvate, or prodrug thereof according to the first or second aspect of the present disclosure, or the pharmaceutical composition according to the third aspect of the present disclosure to a patient in need thereof.

In an eighth aspect, the present disclosure provides a method for preventing and/or treating pain and a pain-associated disease, which includes: administrating a therapeutically effective amount of the compound, or the pharmaceutically acceptable salt, enantiomer, diastereomer, racemate, mixture of diastereomers, solvate, or prodrug thereof according to the first or second aspect of the present disclosure, or the pharmaceutical composition according to the third aspect of the present disclosure to a patient in need thereof.

In another preferred embodiment, the MOR receptor agonist-mediated disease is selected from the group consisting of pain, immune dysfunction, inflammation, esophageal reflux, neurological and psychiatric diseases, urological and reproductive diseases, cardiovascular diseases, and respiratory diseases, preferably pain.

In another preferred embodiment, the pain is selected from the group consisting of postoperative pain, pain caused by cancer, neuropathic pain, traumatic pain, and pain caused by inflammation.

In another preferred embodiment, the cancer is selected from the group consisting of breast cancer, endometrial cancer, cervical cancer, skin cancer, prostate cancer, ovarian cancer, fallopian tube tumor, ovarian tumor, hemophilia, and leukemia.

In a ninth aspect, the present disclosure provides a preparation method for the compound as shown in Formula (I), which includes the following steps:

performing reductive amination on a compound as shown in Formula (I-1) and a compound as shown in (I-2) to obtain the compound as shown in Formula (I),

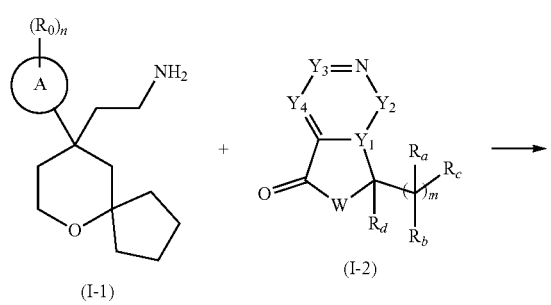

In another preferred embodiment, the compound as shown in Formula (I-1) is

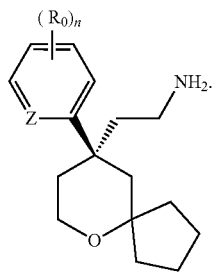

In another preferred embodiment, the compound as shown in Formula (I-2) is

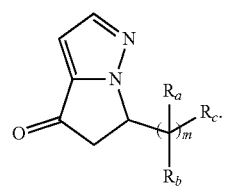

In another preferred embodiment, the reductive amination is performed in a reaction system containing an inert solvent, a Lewis acid, and a reducing agent.

In another preferred embodiment, the inert solvent is $C_{1-4}$ alkyl alcohol, toluene, xylene, methyl tert-butyl ether, tetrahydrofuran, 1,4-dioxane, diethyl ether, dichloromethane, chloroform, 1,2-dichloroethane, ethyl acetate, acetonitrile, dimethyl sulfoxide, N,N-dimethylformamide, or a combination thereof.

In another preferred embodiment, the Lewis acid is titanium isopropoxide.

In another preferred embodiment, the reducing agent is selected from the group consisting of tetrabutylammonium borohydride, sodium malonyloxyborohydride, sodium triacetoxyborohydride, sodium cyanoborohydride, sodium borohydride, lithium borohydride, potassium borohydride, and borane.

In a tenth aspect, the present disclosure provides a preparation method for the compound as shown in Formula (I), which includes the following steps:

performing reductive amination on a compound as shown in Formula (I-3) and a compound as shown in Formula (I-4) to obtain the compound as shown in Formula (I),

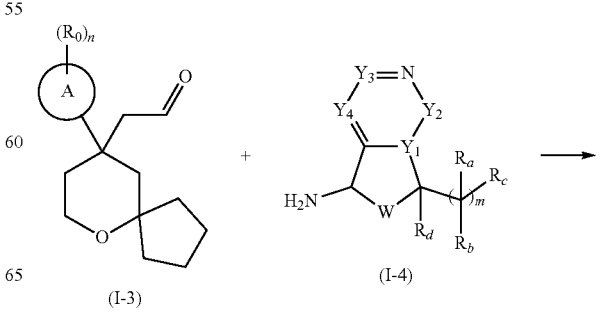

in which groups in each Formula are as defined above.

-continued

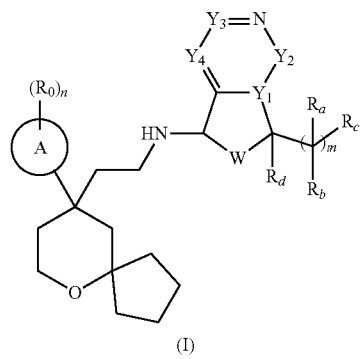

(I)

in which groups in each Formula are as defined above.

In another preferred embodiment, the compound as shown in Formula (I-3) is

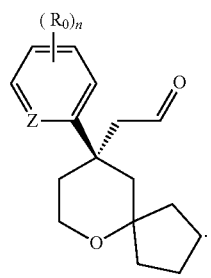

In another preferred embodiment, the compound as shown in Formula (I-4) is

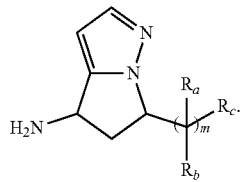

In another preferred embodiment, the reductive amination is performed in a reaction system containing an inert solvent and a reducing agent.

In another preferred embodiment, the inert solvent is $C_{1-4}$ alkyl alcohol, toluene, xylene, methyl tert-butyl ether, tetrahydrofuran, 1,4-dioxane, diethyl ether, dichloromethane, chloroform, 1,2-dichloroethane, ethyl acetate, acetonitrile, dimethyl sulfoxide, N,N-dimethylformamide, or a combination thereof.

In another preferred embodiment, the reducing agent is selected from the group consisting of tetrabutylammonium borohydride, sodium malonyloxyborohydride, sodium triacetoxyborohydride, sodium cyanoborohydride, sodium borohydride, lithium borohydride, potassium borohydride, and borane.

In an eleventh aspect, the present disclosure provides an intermediate of an oxaspirocyclic ring-substituted pyrrolopyrazole derivative, the intermediate having a structure represented by Formula (I-2):

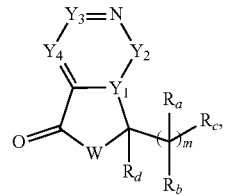

(I-2)

in which $Y_1$, $Y_2$, $Y_3$, $Y_4$, W, $R_a$, $R_b$, $R_c$, $R_d$, and m are as defined in the first aspect of the present disclosure.

In some embodiment, the compound as shown in Formula (I-2) has a structure represented by Formula (I-2a):

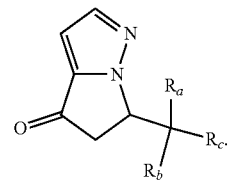

(I-2a)

In some embodiments, the compound as shown in Formula (I-2) has a structure represented by Formula (I-2b):

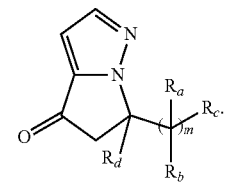

(I-2b)

In some embodiments, $R_a$ and $R_b$ are each independently hydrogen or $C_{1-3}$ alkyl (preferably methyl); or $R_a$ and $R_b$ together with the carbon atom linked thereto form a three- to six-membered saturated monocyclic ring (preferably a cyclopropyl ring, a cyclobutyl ring, or a cyclopentyl ring).

In some embodiments, $R_c$ is hydrogen, halogen (preferably F), $C_{1-3}$ alkyl (preferably methyl, ethyl, or n-propyl), $C_{1-3}$ alkoxyl (preferably methoxy), or halogenated $C_{1-3}$ alkyl (preferably trifluoromethyl).

In some embodiments, the compound as shown in Formula (I-2) is selected from the following structures:

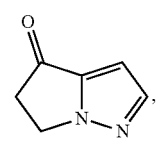

1-3

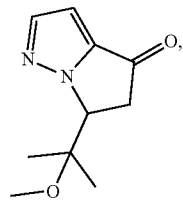

2-7

3-4
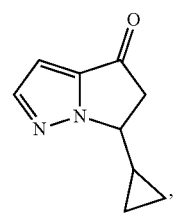
4-4
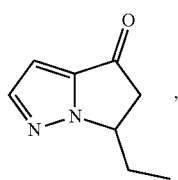
5-4
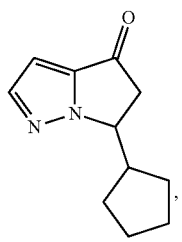
6-4
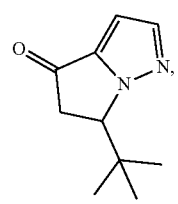
7-5
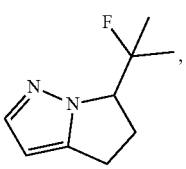
8-4
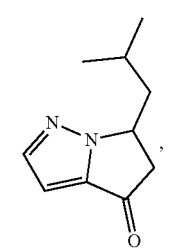
9-3
10-6
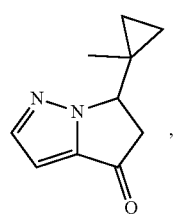
11-4
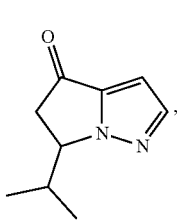
12-3
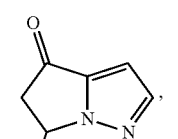
14-3
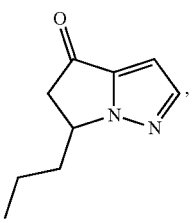
15-3
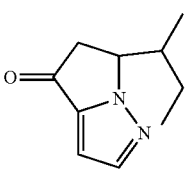
16-6
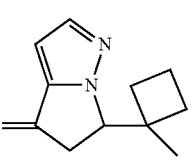
17-6
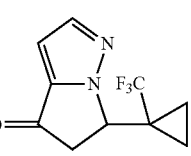
18-6

-continued

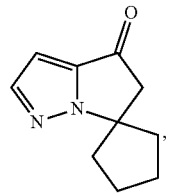
19-3

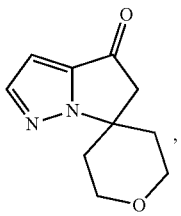
20-3

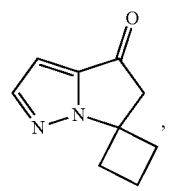
21-4

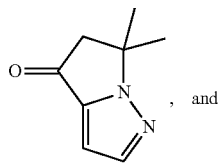
22-3

, and

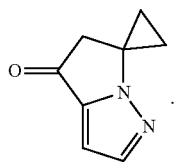
23-7

In a twelfth aspect, the present disclosure provides a preparation method for the compound as shown in Formula I-2b according to the eleventh aspect of the present disclosure, which includes the following step:

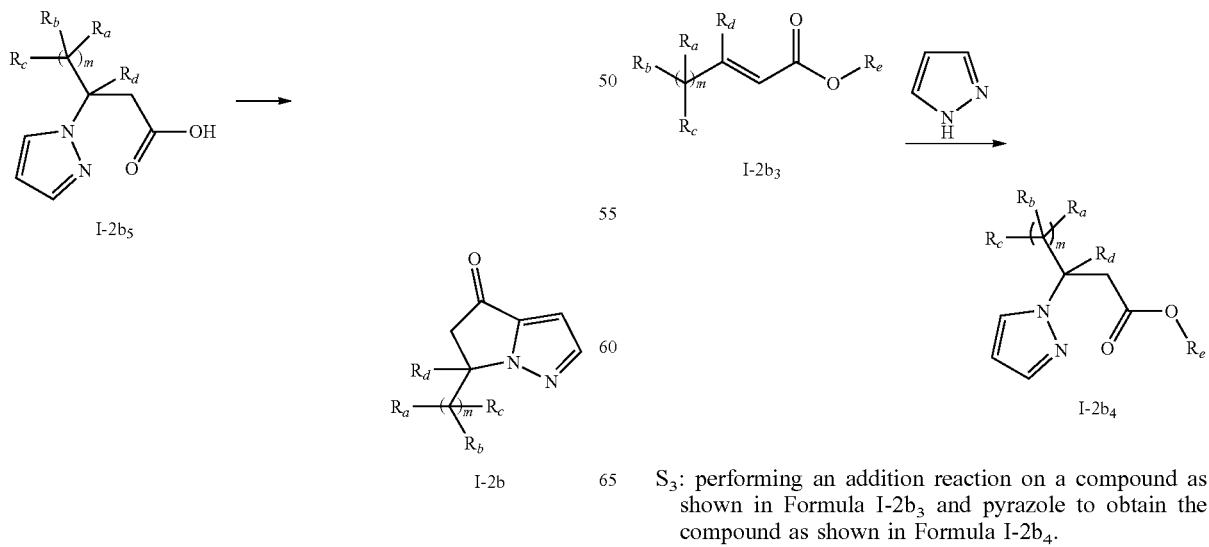

S₁: performing cyclization on a compound as shown in Formula I-2b₅ to obtain the compound as shown in Formula I-2b.

In some embodiments, at step S₁, the cyclization is performed in a THF solution of n-butyllithium.

In some embodiments, the compound I-2b₅ is a known substance (e.g., CAS NO. 1310249-96-7 or CAS NO. 2301048-78-0), or is prepared with reference to relevant published documents or by conventional reactions known to those skilled in the art.

In some other embodiments, the preparation of the compound as shown in Formula I-2b₅ includes the following step:

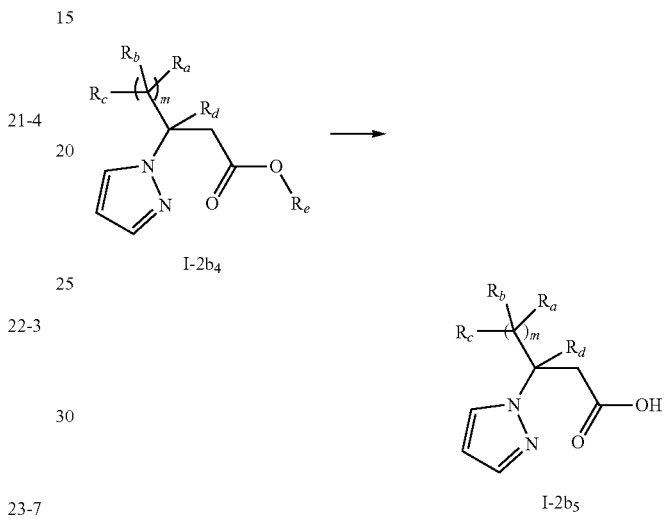

S₂: performing a hydrolysis reaction on a compound as shown in Formula I-2b₄ to obtain the compound as shown in Formula I-2b₅.

In some embodiments, at step S₂, the hydrolysis reaction is performed in a solvent (e.g., methanol/water, THF/methanol, THF/methanol/water) under the catalysis of an inorganic alkali (e.g., sodium hydroxide, lithium hydroxide, potassium hydroxide).

In some embodiments, the preparation of the compound as shown in Formula I-2b₄ includes the following step:

S₃: performing an addition reaction on a compound as shown in Formula I-2b₃ and pyrazole to obtain the compound as shown in Formula I-2b₄.

In some embodiments, at step $S_3$, the addition reaction is performed in an alkaline system (e.g., DBU, potassium carbonate, etc.) in an organic solvent (e.g., acetonitrile, DMF, etc.).

In some embodiments, the compound as shown in Formula I-2b$_3$ is a known substance (e.g., ethyl (E)-but-2-enoate, ethyl (E)-hex-2-enoate, etc.), or can be prepared with reference to relevant published documents or by conventional reactions known to those skilled in the art.

In some other embodiments, the compound as shown in Formula I-2b$_3$ is prepared by the following step:

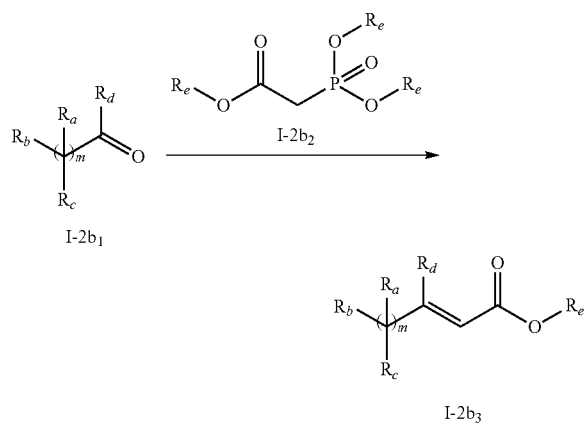

in which $R_e$ is $C_{1-6}$ alkyl, and preferably methyl, ethyl, propyl or isopropyl, $S_4$: reacting a compound as shown in Formula I-2b$_1$ with a compound as shown in Formula I-2b$_2$ to obtain the compound as shown in Formula I-2b$_3$.

In some embodiments, at step $S_4$, the reaction is performed in the presence of DBU/lithium chloride in an organic solvent (e.g., acetonitrile, THF).

In some embodiments, the compound as shown in Formula I-2b$_1$ is a known substance (e.g., cyclopropanecarboxaldehyde, cyclopentanecarboxaldehyde, propionaldehyde, isobutyraldehyde, pivalaldehyde, 3-methylbutyraldehyde, cyclobutanone, etc.), or can be prepared with reference to relevant published documents or by conventional reactions known to those skilled in the art.

In some embodiments, the compound as shown in Formula I-2b$_2$ is a known substance (e.g., triethyl phosphonoacetate), or can be prepared with reference to relevant published documents or by conventional reactions known to those skilled in the art.

It should be understood that within the scope of the present disclosure, the above technical features of the present disclosure and the technical features specifically described below (e.g., the embodiments) can be combined with each other to constitute new or preferred technical solutions. For space limitations, they will not be repeated herein.

DESCRIPTION OF EMBODIMENTS

By extensive and in-depth studies, the inventors have unexpectedly discovered that such azabicyclic ring-substituted oxaspirocyclic derivatives have not only excellent analgesic effects, but also good bias. In addition, the compounds of the present disclosure have excellent pharmacokinetic properties. Therefore, these compounds are expected to be developed into drugs for treating and preventing pain and pain-associated diseases. On this basis, the inventors have completed the present disclosure.

Term Definition

As used herein, "alkyl" refers to a linear and branched saturated aliphatic hydrocarbyl group. $C_{1-10}$ alkyl refers to an alkyl group having 1 to 10 carbon atoms, $C_{1-8}$ alkyl is preferred, $C_{1-6}$ alkyl is more preferred, $C_{1-4}$ alkyl is more preferred, and $C_{1-3}$ alkyl is further more preferred, which are similarly defined. Examples of the alkyl more preferably include, but are not limited to, methyl, ethyl, n-propyl, isopropyl, n-butyl, isobutyl, tert-butyl, sec-butyl, n-pentyl, 1,1-dimethylpropyl, 1,2-dimethylpropyl, 2,2-dimethylpropyl, 1-ethylpropyl, 2-methylbutyl, 3-methylbutyl, n-hexyl, 1-ethyl-2-methylpropyl, 1,1,2-trimethylpropyl, 1,1-dimethylbutyl, 1,2-dimethylbutyl, 2,2-dimethylbutyl, 1,3-dimethylbutyl, 2-ethylbutyl, 2-methylpentyl, 3-methylpentyl, 4-methylpentyl, 2,3-dimethylbutyl, n-heptyl, 2-methylhexyl, 3-methylhexyl, 4-methylhexyl, 5-methylhexyl, 2,3-dimethylpentyl, 2,4-dimethylpentyl, 2,2-dimethylpentyl, 3,3-dimethylpentyl, 2-ethylpentyl, 3-ethylpentyl, n-octyl, 2,3-dimethylhexyl, 2,4-dimethylhexyl, 2,5-dimethylhexyl, 2,2-dimethylhexyl, 3,3-dimethylhexyl, 4,4-dimethylhexyl, 2-ethylhexyl, 3-ethylhexyl, 4-ethylhexyl, 2-methyl-2-ethylpentyl, 2-methyl-3-ethylpentyl, n-nonyl, 2-methyl-2-ethylhexyl, 2-methyl-3-ethylhexyl, 2,2-diethylpentyl, n-decyl, 3,3-diethylhexyl, 2,2-diethylhexyl, various branched isomers thereof, etc.

As used herein, "alkenyl" refers to a linear or branched unsaturated aliphatic hydrocarbyl group having carbon-carbon double bonds (C=C), which preferably contains 2 to 10 carbon atoms ($C_{2-10}$), more preferably contains 2 to 6 carbon atoms ($C_{2-6}$), and further more preferably contains 2 to 4 carbon atoms ($C_{2-4}$). Examples of the alkenyl include, but are not limited to, vinyl, propenyl, isopropenyl, n-butenyl, isobutenyl, pentenyl, hexenyl, etc.

As used herein, "alkynyl" refers to a linear and branched unsaturated aliphatic hydrocarbyl group having carbon-carbon triple bonds, which preferably contains 2 to 10 carbon atoms ($C_{2-10}$), more preferably contains 2 to 6 carbon atoms ($C_{2-6}$), and further more preferably contains 2 to 4 carbon atoms ($C_{2-4}$). Examples of the alkynyl include, but are not limited to, ethynyl, propynyl, n-butynyl, isobutynyl, pentynyl, hexynyl, etc.

As used herein, "cycloalkyl" and "cycloalkyl ring" can be used interchangeably, and both refer to saturated or partially unsaturated monocyclic or polycyclic hydrocarbyl groups. "$C_{3-8}$ cycloalkyl" refers to a cyclic hydrocarbyl group having 3 to 8 carbon atoms, and $C_{3-6}$ cycloalkyl is preferred, which is similarly defined. Examples of the cycloalkyl include, but are not limited to, cyclopropyl, cyclobutyl, cyclopentyl, cyclopentenyl, cyclohexyl, cyclohexenyl, cyclohexadienyl, cycloheptyl, cycloheptatrienyl, cyclooctyl, etc., and cyclopropyl, cyclopentyl, cyclohexenyl are preferred.

As used herein, "spirocyclic ring" refers to a polycyclic group in which monocyclic rings have one common carbon atom (called a spiro atom), these monocyclic rings may contain one or more double bonds, but none of the rings have a fully conjugated R-electron system. According to the number of rings, the spiro rings are divided into spirobicyclic rings and spiropolycyclic rings, and the spirobicyclic rings are preferred. Four-membered/five-membered, five-membered/five-membered or five-membered/six-membered spirobicyclic ring is more preferred. Examples include:

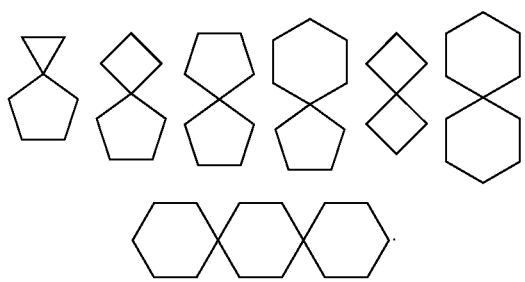

As used herein, "spiroheterocyclic ring" refers to polycyclic hydrocarbon in which monocyclic rings share one common atom (called a spiro atom), one or two ring atoms are heteroatoms selected from nitrogen, oxygen, or S(O). (where n is an integer from 0 to 2), and other ring atoms are carbon atoms. These rings may contain one or more double bonds, but none of the rings have a fully conjugated π-electron system. According to the number of rings, the spiroheterocyclic rings are divided into bicyclic spiroheterocyclic rings and polycyclic spiroheterocyclic rings, and the bicyclic spiroheterocyclic rings are preferred. Four-membered/five-membered, five-membered/five-membered, or five-membered/six-membered bicyclic spiroheterocyclic ring is more preferred. Examples include:

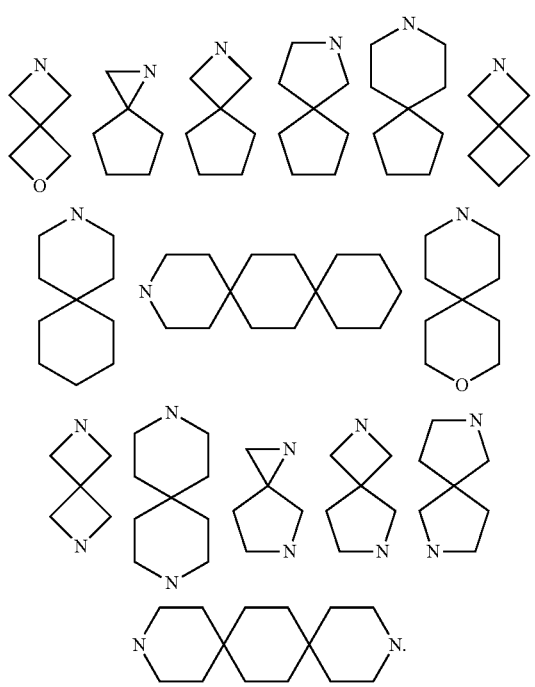

As used herein, "bridged ring" refers to a polycyclic group in which two or more common carbon atoms are shared, the common carbon atoms are called bridgehead carbon atoms, and two bridgehead carbon atoms may be linked by a carbon chain or a bond, which is called a bridge. The bridged ring may contain one or more double bonds, but none of the rings have a fully conjugated π-electron system. Bicyclic or tricyclic bridged rings are preferred. Examples include:

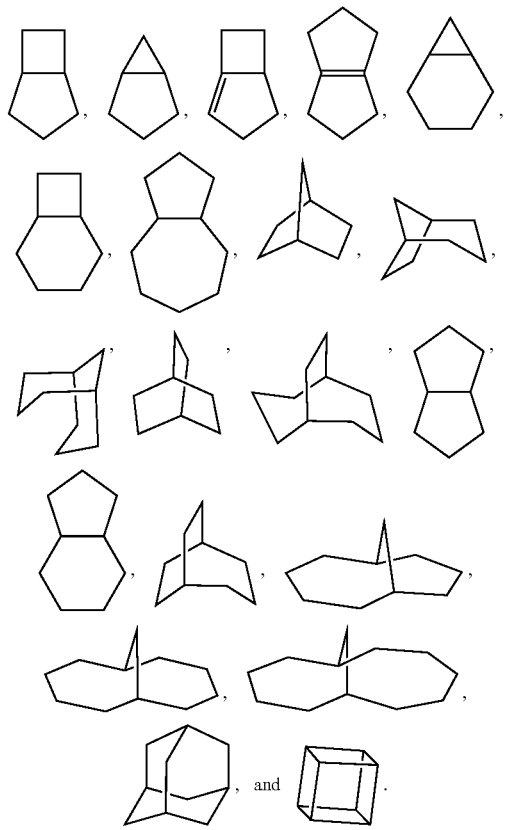

As used herein, "bridged heterocyclic ring" refers to a polycyclic group in which two or more common atoms are shared, one or more ring atoms are heteroatoms selected from nitrogen, oxygen, or S(O). (where n is an integer from 0 to 2), and other ring atoms are carbon atoms. Bridged heterocyclic ring may contain one or more double bonds, but none of the rings have a fully conjugated π-electron system. Bridged heterobicyclic or heterotricyclic rings are preferred. Examples include:

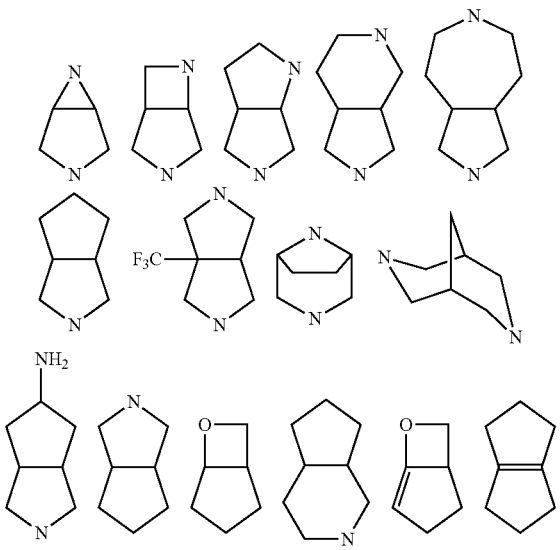

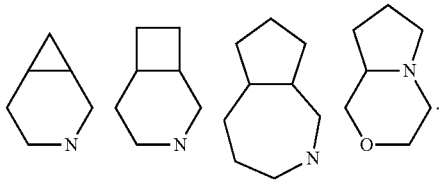

As used herein, "eight- to ten-membered bicyclic ring" refers to a bridged ring having two rings with 8 to 10 ring atoms, and the bicyclic ring may be a saturated all-carbon bicyclic ring or partially unsaturated all-carbon bicyclic ring. Examples of the eight- to ten-membered bicyclic ring include, but are not limited to,

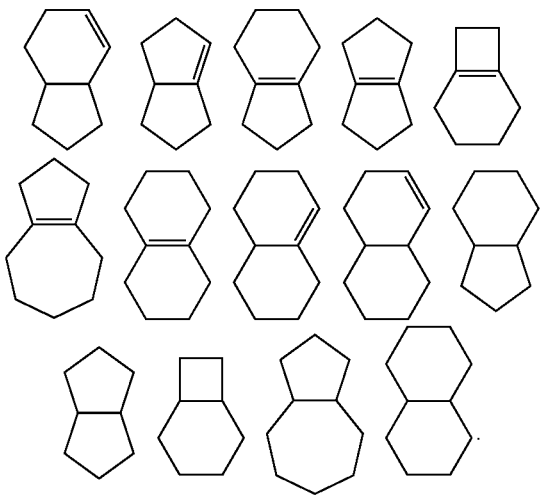

As used herein, "eight- to ten-membered heterobicyclic ring" refers to a bridged heterocyclic ring having two rings with 8 to 10 ring atoms, in which one, two, three, four or five ring carbon atoms are substituted by heteroatoms selected from nitrogen, oxygen, or sulfur. Examples of the eight- to ten-membered heterobicyclic ring include, but are not limited to, a tetrahydroquinoline ring, a tetrahydroisoquinoline ring, a decahydroquinoline ring, etc.

As used herein, "$C_{1-8}$ alkoxyl" refers to —O—($C_{1-8}$ alkyl), in which the alkyl is defined as above. $C_{1-6}$ alkoxyl is preferred, $C_{1-4}$ alkoxyl is preferred, and $C_{1-3}$ alkoxyl is more preferred. Examples of the alkoxyl include, but are not limited to, methoxy, ethoxy, propoxy, isopropoxy, butoxy, tert-butoxy, isobutoxy, pentyloxy, etc.

As used herein, "$C_{3-8}$ cycloalkoxyl" refers to —O—($C_{3-8}$ cycloalkyl), in which the cycloalkyl is defined as above. $C_{3-6}$ cycloalkoxyl is preferred. Examples of the cycloalkoxyl include, but are not limited to, cyclopropoxy, cyclobutoxy, cyclopentyloxy, cyclohexyloxy, etc.

As used herein, "$C_{6-10}$ aryl" and "$C_{6-10}$ aromatic ring" can be used interchangeably, both refer to an all-carbon monocyclic or fused polycyclic (that is, rings share adjacent carbon atom pairs) group having a conjugated π-electron system, and refer to an aryl group having 6 to carbon atoms. Phenyl and naphthyl are preferred, and phenyl is more preferred.

As used herein, "one bond" refers to a covalent bond by which two groups are linked.

As used herein, "halogen" refers to fluorine, chlorine, bromine, or iodine.

As used herein, "halogenated" refers to that one or more (e.g., one, two, three, four, or five) hydrogen atoms in a group are substituted by halogen.

For example, "halogenated $C_{1-10}$ alkyl" refers to that an alkyl group is substituted with one or more (e.g., one, two, three, four, or five) halogen atoms, in which the alkyl is defined as above. Halogenated $C_{1-8}$ alkyl is preferred, halogenated $C_{1-6}$ alkyl is more preferred, halogenated $C_{1-4}$ alkyl is more preferred, and halogenated $C_{1-3}$ alkyl is further more preferred. Examples of halogenated alkyl include, but are not limited to, monochloromethyl, dichloromethyl, trichloromethyl, monochloroethyl, 1,2-dichloroethyl, trichloroethyl, monobromoethyl, monofluoromethyl, difluoromethyl, trifluoromethyl, monofluoroethyl, difluoroethyl, trifluoroethyl, etc.

For another example, "halogenated $C_{1-10}$ alkoxyl" refers to that an alkoxyl group is substituted with one or more (e.g., one, two, three, four, or five) halogen atoms, in which the alkoxyl is defined as above. Halogenated $C_{1-8}$ alkoxyl is preferred, halogenated $C_{1-6}$ alkoxyl is more preferred, halogenated $C_{1-4}$ alkoxyl is more preferred, and halogenated $C_{1-3}$ alkoxyl is further more preferred. Halogenated alkoxyl groups include, but are not limited to, trifluoromethoxy, trifluoroethoxy, monofluoromethoxy, monofluoroethoxy, difluoromethoxy, difluoroethoxy, etc.

For another example, "halogenated $C_{3-8}$ cycloalkyl" refers to that a cycloalkyl group is substituted with one or more (e.g., one, two, three, four, or five) halogen atoms, in which the cycloalkyl is defined as above. Halogenated $C_{3-6}$ cycloalkyl is preferred. Examples of halogenated cycloalkyl include, but are not limited to, trifluorocyclopropyl, monofluorocyclopropyl, monofluorocyclohexyl, difluorocyclopropyl, difluorocyclohexyl, etc.

As used herein, "deuterated $C_{1-8}$ alkyl" refers to that an alkyl group is substituted with one or more (e.g., one, two, three, four, or five) deuterium atoms, in which the alkyl is defined as above. Deuterated $C_{1-6}$ alkyl is preferred, and deuterated $C_{1-3}$ alkyl is more preferred. Examples of the deuterated alkyl group include, but are not limited to, mono-deuteromethyl, mono-deuteroethyl, di-deuteromethyl, di-deuteroethyl, tri-deuteromethyl, tri-deuteroethyl, etc.

As used herein, "amino" refers to $NH_2$, "cyano" refers to CN, "nitro" refers to $NO_2$, "benzyl" refers to —$CH_2$-phenyl, "oxo group" refers to =O, "carboxyl" refers to —C(O)OH, "acetyl" refers to —C(O)$CH_3$, "hydroxymethyl" refers to —$CH_2$OH, "hydroxyethyl" refers to —$CH_2CH_2$OH or —CHOH$CH_3$, "hydroxyl" refers to —OH, "thiol" refers to SH, and "cyclopropylidene" has the following structure:

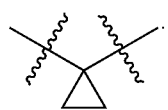 [SMILES: *C1(*)CC1]

As used herein, "heteroaryl ring" and "heteroaryl" can be used interchangeably, both refer to a group having 5 to 10 ring atoms, 6, 10 or 14 common π electrons in the ring array, and 1 to 5 heteroatoms in addition to carbon atoms. "Heteroatom" refers to nitrogen, oxygen, or sulfur. Five- or six-membered monocyclic heteroaryl or eight- to ten-membered bicyclic heteroaryl is preferred.

As used herein, "three- to seven-membered (four- to seven-membered) saturated monocyclic ring" refers to a saturated all-carbon monocyclic ring having 3 to 7 ring atoms, and three- to six-membered saturated monocyclic ring is preferred. Examples of the saturated monocyclic ring include, but are not limited to, a cyclopropyl ring, a cyclobutyl ring, a cyclopentyl ring, a cyclohexyl ring, a cycloheptyl ring, a cyclooctyl ring, etc.

As used herein, "three- to seven-membered (four- to seven-membered) saturated monoheterocyclic ring" refers to that one, two, or three carbon atoms in the three- to seven-membered saturated monocyclic ring are substituted by heteroatoms selected from nitrogen, oxygen, or $S(O)_t$ (where t is an integer from 0 to 2), an —O—O—, —O—S— or —S—S— ring moiety is not included, and other ring atoms are carbon atoms. Four- to six-membered saturated monoheterocyclic ring is preferred, and five- or six-membered saturated monoheterocyclic ring is more preferred. Example of the saturated monoheterocyclic ring include, but are not limited to, propylene oxide, azetidine, oxetane, tetrahydrofuran, tetrahydrothiophene, tetrahydropyrrole, piperidine, pyrroline, oxazolidine, piperazine, dioxolane, dioxane, morpholine, thiomorpholine, thiomorpholine-1,1-dioxide, tetrahydropyran, etc.

As used herein, "five- or six-membered monocyclic heteroaryl ring" and "five- or six-membered monocyclic heteroaryl" can be used interchangeably, and both refer to a monocyclic heteroaryl ring having 5 or 6 ring atoms, which include, but are not limited to, a thiophene ring, a furan ring, a thiazole ring, an imidazole ring, an oxazole ring, a pyrrole ring, a pyrazole ring, a triazole ring, a 1,2,3-triazole ring, a 1,2,4-triazole ring, a 1,2,5-triazole ring, a 1,3,4-triazole ring, a tetrazole ring, an isoxazole ring, an oxadiazole ring, a 1,2,3-oxadiazole ring, a 1,2,4-oxadiazole ring, a 1,2,5-oxadiazole ring, a 1,3,4-oxadiazole ring, a thiadiazole ring, a pyridine ring, a pyridazine ring, a pyrimidine ring, a pyrazine ring, etc.

As used herein, "eight- to ten-membered bicyclic heteroaryl ring" and "eight- to ten-membered bicyclic heteroaryl" can be used interchangeably, and both refer to a bicyclic heteroaryl ring having 8 to 10 ring atoms, which include, but are not limited to, benzofuran, benzothiophene, indole, isoindole, quinoline, isoquinoline, indazole, benzothiazole, benzimidazole, quinazoline, quinoxaline, cinnoline, phthalazine, pyrido[3,2-d]pyrimidine, pyrido[2,3-d]pyrimidine, pyrido[3,4-d]pyrimidine, pyrido[4,3-d]pyrimidine, 1,8-naphthyridine, 1,7-naphthyridine, 1,6-naphthyridine, 1,5-naphthyridine.

As used herein, "substituted" refers to that one or more hydrogen atoms, preferably one to five hydrogen atoms, and more preferably one to three hydrogen atoms, in a group are each independently replaced by the corresponding number of substituent groups. That is, the substituent groups are only in their possible chemical positions, and those skilled in the art can determine (either experimentally or theoretically) possible or impossible substitutions without involving any effort. For example, the binding of an amino or hydroxyl group having free hydrogen atoms to carbon atoms having unsaturated (e.g., olefinic) bonds may be unstable.

Unless otherwise defined, the "substituent groups are each independently selected from . . . " used herein refers to that when more than one hydrogen atoms in a group are substituted by substituent groups, the substituent groups may be of the same type or different types, and the selected substituent groups are independent in term of their types.

Unless otherwise defined, the " . . . are the same or different, and are each independently . . . " used herein refers to that when more than one same substituent groups exist in a general Formula, the groups may be the same or different, and are independent in their types. For example, provided that L is $(CR_{01}R_{02})_s$, when s is 2, that is, L is $(CR_{01}R_{02})$—$(CR_{01}R_{02})$, where the two $R_{01}$ or $R_{02}$ groups may be the same or different, and are independent in their types. For example, L may be $C(CH_3)(CN)$—$C(CH_2CH_3)(OH)$, $C(CH_3)(CN)$—$C(CH_3)(OH)$ or $C(CN)(CH_2CH_3)$—$C(OH)(CH_2CH_3)$.

Unless otherwise defined, any one group described herein may be substituted or unsubstituted. If the above group is substituted, substituent groups are preferably one to five groups each independently selected from CN, halogen, $C_{1-10}$ alkyl (preferably $C_{1-6}$ alkyl, and more preferably $C_{1-3}$ alkyl), $C_{1-10}$ alkoxyl (preferably $C_{1-6}$ alkoxyl, and more preferably $C_{1-3}$ alkoxyl), halogenated $C_{1-8}$ alkyl (preferably halogenated $C_{1-6}$ alkyl, and more preferably halogenated $C_{1-3}$ alkyl), $C_{3-8}$ cycloalkyl (preferably $C_{3-6}$ cycloalkyl), halogenated $C_{1-8}$ alkoxyl (preferably halogenated $C_{1-6}$ alkoxyl, and more preferably halogenated $C_{1-3}$ alkoxyl), $C_{1-8}$ alkyl-substituted amido, amido, halogenated $C_{1-8}$ alkyl-substituted amido, acetyl, hydroxyl, hydroxymethyl, hydroxyethyl, carboxyl, nitro, $C_{6-10}$ aryl (preferably phenyl), $C_{3-8}$ cycloalkoxyl (preferably $C_{3-6}$ cycloalkoxyl), $C_{2-10}$ alkenyl (preferably $C_{2-6}$ alkenyl, and more preferably $C_{2-4}$ alkenyl), $C_{2-10}$ alkynyl (preferably $C_{2-6}$ alkynyl, and more preferably $C_{2-4}$ alkynyl), —$CONR_{a0}R_{b0}$, —$C(O)O(C_{1-10}$ alkyl) (preferably —$C(O)O(C_{1-6}$ alkyl), and more preferably —$C(O)O(C_{1-3}$ alkyl)), —CHO, —$OC(O)(C_{1-10}$ alkyl) (preferably —$OC(O)(C_{1-6}$ alkyl), and more preferably —$OC(O)(C_{1-3}$ alkyl)), —$SO_2(C_{1-10}$ alkyl) (preferably —$SO_2(C_{1-6}$ alkyl), and more preferably —$SO_2(C_{1-3}$ alkyl)), —$SO_2(C_{6-10}$ aryl) (preferably —$SO_2(C_6$ aryl), such as —$SO_2$-phenyl), —$CO(C_{6-10}$ aryl) (preferably —$CO(C_6$ aryl), such as —CO-phenyl), a four- to six-membered saturated or unsaturated monoheterocyclic ring, a four- to six-membered saturated or unsaturated monocyclic ring, a five- or six-membered monocyclic heteroaryl ring, an eight- to ten-membered bicyclic heteroaryl ring, a spiro ring, a spiroheterocyclic ring, a bridged ring, and a bridged heterocyclic ring, where $R_{a0}$ and $R_{b0}$ are each independently hydrogen or $C_{1-3}$ alkyl.

Each substituent group described above itself can also be substituted with the groups described herein.

When the four- to six-membered (five- or six-membered) saturated monoheterocyclic ring described herein is substituted, substituent groups can be in their possible chemical positions. Representative substitutions of exemplary monoheterocyclic rings are shown below:

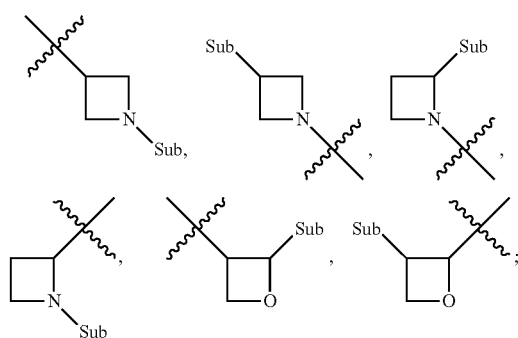

-continued

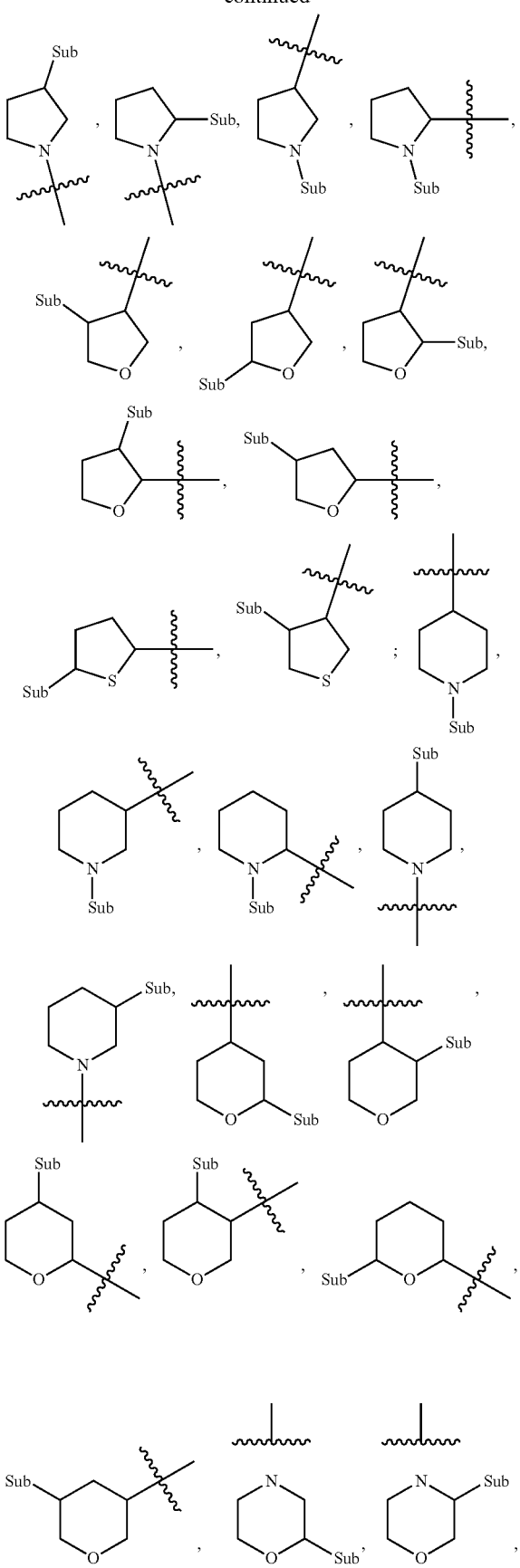

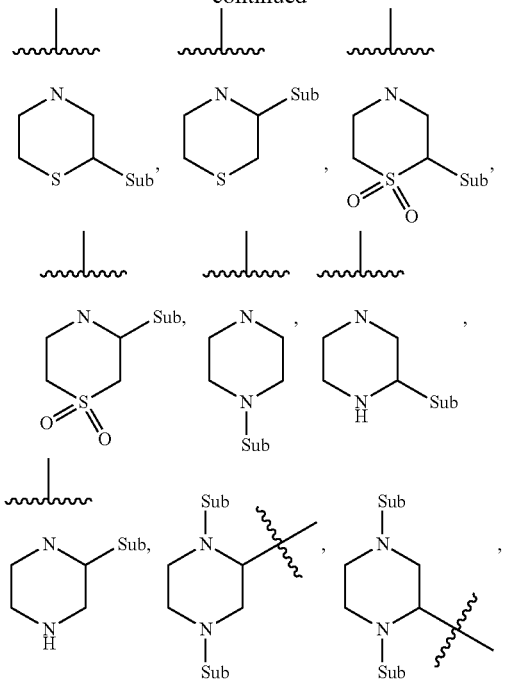

where "Sub" refers to various substituent groups described herein, and "-" refers to the linkage to other atoms.

Unless otherwise defined, when the four- to six-membered saturated monoheterocyclic ring described herein is a substituent group, it can also be substituted or substituted with one, two, or three substituent groups selected from the group consisting of halogen, hydroxyl, $C_{1-3}$ alkyl, O=, $NR_{a0}R_{b0}$, hydroxymethyl, hydroxyethyl, carboxyl, —C(O)O($C_{1-3}$ alkyl), acetyl, halogenated $C_{1-3}$ alkyl, $C_{1-3}$ alkoxyl, $C_{3-6}$ cycloalkyl, azetidine, oxetane, tetrahydrofuran, tetrahydrothiophene, tetrahydropyrrole, piperidine, oxazolidine, piperazine, dioxolane, dioxane, morpholine, thiomorpholine, thiomorpholine-1,1-dioxide, tetrahydropyran, athiophene ring, an N-alkylpyrrole ring, a furan ring, a thiazole ring, an imidazole ring, an oxazole ring, a pyrrole ring, a pyrazole ring, a triazole ring, a tetrazole ring, an isoxazole ring, an oxadiazole ring, a thiadiazole ring, a pyridine ring, a pyridazine ring, a pyrimidine ring, and a pyrazine ring, in which $R_{a0}$ and $R_{b0}$ are each independently hydrogen or $C_{1-3}$ alkyl.

"Pharmaceutically acceptable salt" includes pharmaceutically acceptable acid addition salts and pharmaceutically acceptable base addition salts.

"Pharmaceutically acceptable acid addition salts" refer to salts formed with inorganic or organic acids, which can retain the biological effectiveness of free alkali without producing other side effects.

"Pharmaceutically acceptable base addition salts" include, but are not limited to, salts, such as sodium salts, potassium salts, calcium salt, and magnesium salts, of inorganic alkalis, and salts, such as ammonium salts, triethylamine salts, lysine salts, and arginine salts, of organic alkalis.

"Solvate" described herein refers to a complex formed by the compound of the present disclosure and a solvent. The compounds either react in the solvents or are precipitated or crystallized from the solvents. For example, a complex formed by the compound and water is called a "hydrate".

The solvates of the compound as shown in Formula (I) fall within the scope of the present disclosure.

The compound as shown in Formula (I) or Formula (II) of the present disclosure may contain two or more chiral centers, which are present in different optically active forms. A stereoisomer of the compound as shown in Formula (I) or Formula (II) of the present disclosure may be an enantiomer or diastereomer. The compound as shown in Formula (I) or Formula (II) may be present in the form of a separated optically pure specific stereoisomer. For example, the compound may be present in the form of enantiomer or diastereomer, or in the form of a mixture of two stereoisomers. For example, the compound may be present in the form of a mixture of enantiomers, such as a racemic mixture, or in the form of a mixture of diastereomers, or in the form of a mixture of an enantiomer and a diastereomer. The enantiomer can be obtained by the existing separation methods in the art such as crystallization and chiral chromatography. The diastereomer can be obtained by the existing separation methods such as crystallization and preparative chromatography. The enantiomers or diastereomers of the compound as shown in Formula (I) or Formula (II) of the present disclosure, and the mixtures of these stereoisomers all fall within the scope of protection of the present disclosure.

The present disclosure further relates to prodrugs of the above compounds. The prodrugs include known amino-protecting groups and carboxyl-protecting groups, which are hydrolyzed under physiological conditions or released via enzymatic reactions to obtain mother compounds. For specific preparation methods of prodrugs, please refer to Saulnier, M. G.; Frennesson, D. B.; Deshpande, M. S.; Hansel, S. B and Vysa, D. M. Bioorg. Med. Chem Lett. 1994, 4, 1985-1990; and Greenwald. R. B.; Choe, Y. H.; Conover, C. D.; Shum, K.; Wu, D.; Royzen, M. J. Med. Chem. 2000, 43, 475.

Usually, the compound, or the pharmaceutically acceptable salt, enantiomer, diastereomer, racemate, mixture of diastereomers, solvate, or prodrug thereof of the present disclosure and one or more pharmaceutical carriers can be prepared into suitable formulations for administration. These formulations are suitable for oral administration, rectal administration, local administration, intraoral administration, and other parenteral (e.g., subcutaneous, intramuscular, intravenous, etc.) administration. For example, the formulations suitable for oral administration include capsules, tablets, granules, syrups, etc. The compound of the present disclosure contained in these formulations may be solid powder or particles, a solution or suspension in an aqueous or non-aqueous liquid, or a water-in-oil or oil-in-water emulsion, etc. The above formulations can be prepared from the active compound and one or more carriers or excipients by universal pharmacy methods. The above carriers are required to be compatible with the active compound or other excipients. For solid formulations, commonly used non-toxic carriers include, but are not limited to, mannitol, lactose, starch, magnesium stearate, cellulose, glucose, sucrose, etc. For liquid formulations, commonly used carriers include water, saline, aqueous glucose solution, ethylene glycol, polyethylene glycol, etc. The active compound can form a solution or suspension with the above carrier.

The compositions of the present disclosure are prepared, dosed, and administered in accordance with the medical practice guideline. A "therapeutically effective amount" of administered compound is determined by factors such as a specific disorder to be treated, an individual to be treated, causes of the disorder, a target of the drug, an administration method, etc.

As used herein, "therapeutically effective amount" refers to an amount of the compound of the present disclosure that will lead to a biological or medical response in an individual, such as reducing or inhibiting enzyme or protein activity or ameliorating symptoms, alleviating a disorder, slowing or delaying the disease progression, and preventing a disease.

The therapeutically effective amount of the compound, or the pharmaceutically acceptable salt, solvate, or stereoisomer thereof of the present disclosure that is contained in the pharmaceutical composition of the present disclosure is preferably 0.1 mg to 5 g/kg (body weight).

As used herein, "pharmaceutically acceptable carrier" refers to non-toxic, inert, and solid or semi-solid substances or liquid fillers, diluents, encapsulating materials or adjuvants or any type of excipients, which is compatible with patients, preferably mammals, and more preferably humans, and is suitable for delivering an active reagent to a target without terminating the activity of the reagent.

As used herein, "patient" refers to an animal, which is preferably a mammal, and more preferably a human being. The term "mammal" refers to warm-blooded vertebrate mammals, which include cats, dogs, rabbits, bears, foxes, wolves, monkeys, deer, mice or rats, pigs, and humans.

As used herein, "treatment" refers to alleviating, slowing down progression of, attenuating, preventing, or maintaining an existing disease or disorder (e.g., cancer). Treatment also includes curing one or more symptoms of a disease or disorder, preventing the development or alleviating to a certain degree.

Preparation Methods

The experimental method described in the following examples without introducing specific conditions generally follow conventional conditions, e.g., those described in Sambrook, et al., Molecular Cloning: Laboratory Manual (New York: Cold Spring Harbor Laboratory Press, 1989), or conditions recommended by manufacturers.

Unless otherwise defined, the terms used herein have the same meanings as those familiar to those skilled in the art. In addition, any methods and materials similar or equivalent to those described herein can be applicable to the present disclosure.

Preparation methods for the compounds of the present disclosure:

The compounds as shown in Formula (I) and Formula (II) can be prepared by the existing methods, such as the following methods, methods equivalent to the following methods, and methods described in the examples. In the following preparation methods, a raw material compound may be in the form of salt, and the salt may be any pharmaceutically acceptable salt as illustrated for the compounds as shown in Formula (I) and Formula (II) of the present disclosure.

Reaction scheme (a1)

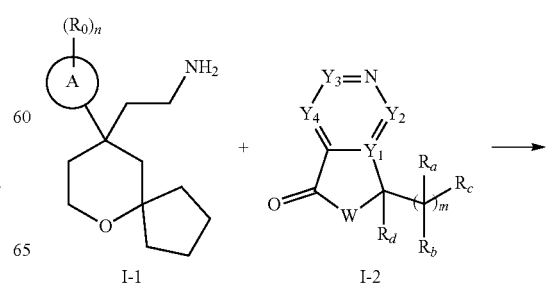

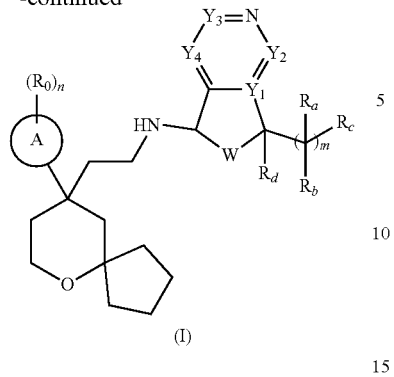

(I)

In each Formula of the above scheme, all groups are defined as above.

Specifically, the compound as shown in Formula (I) can be prepared by the following method: reductive amination is performed on a compound as shown in Formula (I-1) and a compound as shown in Formula (I-2) to obtain the compound as shown in Formula (I). The reductive amination is performed in an inert solvent, the compound as shown in Formula (I-1), the compound as shown in Formula (1-2), and a Lewis acid react at a certain temperature (e.g., −20° C. to 80° C., preferably 0° C. to 60° C., and more preferably 20° C. to 60° C.) for a period of time (e.g., 0.5 h to 48 h, preferably 5 h to 24 h), a reducing agent is then added to the reaction solution, and the reaction solution reacts at a certain temperature (e.g., −20° C. to 80° C., preferably 0° C. to 60° C., and more preferably 20° C. to 60° C.) for a period of time (e.g., 0.5 h to 48 h, preferably 0.5 h to 5 h), to obtain the compound as shown in Formula (I). The inert solvent and the reducing agent may be known in the art, and the reducing agent may be selected from tetrabutylammonium borohydride, sodium malonyloxyborohydride, sodium triacetoxyborohydride, sodium cyanoborohydride, sodium borohydride, lithium borohydride, potassium borohydride, borane, etc. The Lewis acid may be titanium isopropoxide, etc. The inert solvent may be selected from $C_{1-4}$ alkyl alcohol, toluene, xylene, methyl tert-butyl ether, tetrahydrofuran, 1,4-dioxane, diethyl ether, dichloromethane, chloroform, 1,2-dichloroethane, ethyl acetate, acetonitrile, dimethyl sulfoxide, N,N-dimethylformamide, or a combination thereof.

In each Formula of the above scheme, all groups are defined as above.

Specifically, the compound as shown in Formula (I) can also be prepared by the following method: reductive amination is performed on a compound as shown in Formula (I-3) and a compound as shown in Formula (I-4) to obtain the compound as shown in Formula (I). The reductive amination is performed in an inert solvent, and the compound as shown in Formula (I-3), the compound as shown in Formula (1-4), and a reducing agent react at a certain temperature (e.g., −20° C. to 80° C., preferably 0° C. to 60° C., and more preferably 20° C. to 60° C.) for a period of time (e.g., 0.5 h to 48 h, preferably 0.5 h to 5 h), to obtain the compound as shown in Formula (I). The inert solvent and the reducing agent may be known in the art, and the reducing agent may be selected from tetrabutylammonium borohydride, sodium malonyloxyborohydride, sodium triacetoxyborohydride, sodium cyanoborohydride, sodium borohydride, lithium borohydride, potassium borohydride, borane, etc. The inert solvent may be selected from $C_{1-4}$ alkyl alcohol, toluene, xylene, methyl tert-butyl ether, tetrahydrofuran, 1,4-dioxane, diethyl ether, dichloromethane, chloroform, 1,2-dichloroethane, ethyl acetate, acetonitrile, dimethyl sulfoxide, N,N-dimethylformamide, or a combination thereof.

Reaction scheme (b1)

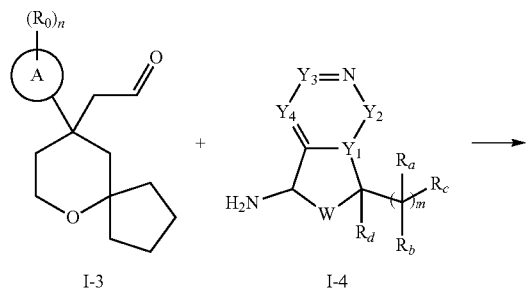

Reaction scheme (a2)

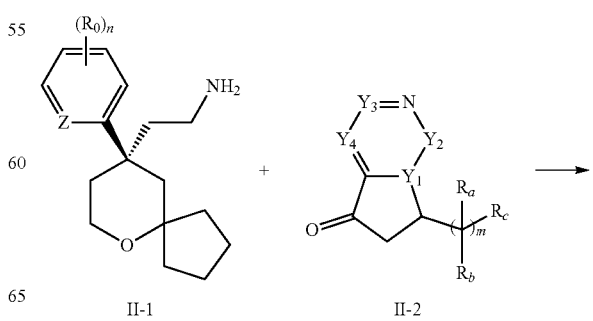

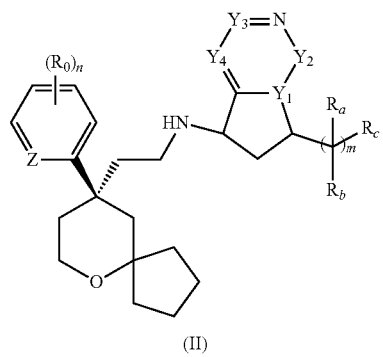

(II)

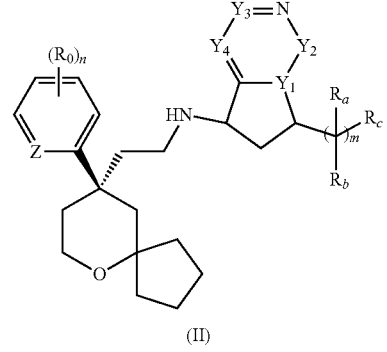

(II)

In each Formula of the above solution, all groups are defined as above.

Specifically, the compound as shown in Formula (II) can be prepared by the following method: reductive amination is performed on a compound as shown in Formula I-1 and a compound as shown in Formula II-2 to obtain the compound as shown in Formula (II). The reductive amination is performed in an inert solvent, and the compound as shown in Formula (II-1), the compound as shown in Formula (II-2), and a Lewis acid react at a certain temperature (e.g., −20° C. to 80° C., preferably 0° C. to 60° C., and more preferably 20° C. to 60° C.) for a period of time (e.g., 0.5 h to 48 h, preferably 5 h to 24 h), a reducing agent is then added to the reaction solution, and the reaction solution reacts at a certain temperature (e.g., −20° C. to 80° C., preferably 0° C. to 60° C., and more preferably 20° C. to 60° C.) for a period of time (e.g., 0.5 h to 48 h, preferably 0.5 h to 5 h), to obtain the compound as shown in Formula (II). The inert solvent and the reducing agent may be known in the art, and the reducing agent may be selected from tetrabutylammonium borohydride, sodium malonyloxyborohydride, sodium triacetoxyborohydride, sodium cyanoborohydride, sodium borohydride, lithium borohydride, potassium borohydride, borane, etc. The Lewis acid may be titanium isopropoxide, etc. The inert solvent may be selected from $C_{1-4}$ alkyl alcohol, toluene, xylene, methyl tert-butyl ether, tetrahydrofuran, 1,4-dioxane, diethyl ether, dichloromethane, chloroform, 1,2-dichloroethane, ethyl acetate, acetonitrile, dimethyl sulfoxide, N,N-dimethylformamide, or a combination thereof.

Reaction scheme (b2)

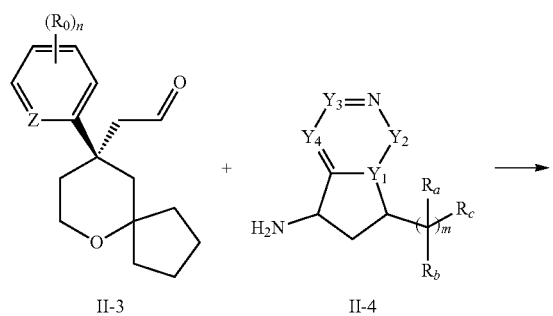

II-3     II-4

In each Formula of the above scheme, all groups are defined as above.

Specifically, the compound as shown in Formula (II) can also be prepared by the following method: reductive amination is performed on a compound as shown in Formula I-3 and a compound as shown in Formula II-4 to obtain the compound as shown in Formula (II). The reductive amination is performed in an inert solvent, and the compound as shown in Formula (II-3), the compound as shown in Formula (II-4), and a reducing agent react at a certain temperature (e.g., −20° C. to 80° C., preferably 0° C. to 60° C., and more preferably 20° C. to 60° C.) for a period of time (e.g., 0.5 h to 48 h, preferably 0.5 h to 5 h), to obtain the compound as shown in Formula (II). The inert solvent and the reducing agent may be known in the art, and the reducing agent may be selected from tetrabutylammonium borohydride, sodium malonyloxyborohydride, sodium triacetoxyborohydride, sodium cyanoborohydride, sodium borohydride, lithium borohydride, potassium borohydride, borane, etc. The inert solvent may be selected from $C_{1-4}$ alkyl alcohol, toluene, xylene, methyl tert-butyl ether, tetrahydrofuran, 1,4-dioxane, diethyl ether, dichloromethane, chloroform, 1,2-dichloroethane, ethyl acetate, acetonitrile, dimethyl sulfoxide, N,N-dimethylformamide, or a combination thereof.

The compounds having an amino group, carboxyl group, or hydroxyl group that are used in the present disclosure can be prepared from compounds protected by protecting groups commonly used for the groups as necessary, and subsequent to the reaction process of the above reaction scheme, known deprotection can be performed.

Compared with the prior art, the present disclosure mainly has the following advantages.

The present disclosure provides a series of azabicyclic ring-substituted oxaspirocyclic derivatives with novel structures, which have high inhibitory activity against cAMP ($EC_{50}$ is 1 nM to 100 nM, more preferably 1 nM to 50 nM, and most preferably 1 nM to 10 nM), have high Emax values (greater than 50%, preferably greater than 80%), and have excellent analgesic effects. In addition, the compounds of the present disclosure have small Emax values against $-arrestin (less than 50%, more preferably less than 30%, and most preferably less than 10%), and have good bias. Therefore, the compounds of the present disclosure can be developed into drugs for treating and preventing pain and pain-associated diseases.

The present disclosure will be further described below with reference to specific examples. It should be understood that these examples are only for the purpose of description of the present disclosure rather than limitation to the scope of the present disclosure. The experimental method described in the following examples without introducing specific conditions generally follows conventional conditions or conditions recommended by manufacturers. Unless otherwise defined, the percentage and parts are calculated based on the weight. Unless otherwise defined, the terms used herein have the same meanings as those familiar to those skilled in the art. In addition, any methods and materials similar or equivalent to those described herein can be applicable to the present disclosure.

Reagents and Instruments

¹HNMR: Bruker AVANCE-400 NMR spectrometer, the internal standard: tetramethylsilane (TMS);

LC-MS: Agilent 1290 HPLC System/6130/6150 MS LC/MS spectrometer (manufacturer: Agilent), column: Waters BEH/CHS, 50×2.1 mm, 1.7 μm.

Preparative high-performance liquid chromatography (pre-HPLC): GX-281 (manufacturer: Gilson).

Supercritical fluid chromatograph (SFC): 1260 Infinity (manufacturer: Agilent).

As used herein, DCE refers to 1,2-dichloroethane, THF refers to tetrahydrofuran, EA refers to ethyl acetate, PE refers to petroleum ether, DCM refers to dichloromethane, n-BuLi refers to n-butyllithium, HATU refers to 2-(7-azabenzotriazole)-N,N,N',N'-tetramethyl uronium hexafluorophosphate, DMF refers to dimethylformamide, DMSO refers to dimethyl sulfoxide, DIEA or DIPEA refers to N,N-diisopropylethylamine, DBU refers to 1,8-diazabicyclo[5.4.0]undec-7-ene, DIBAL-H refers to diisobutylaluminium hydride, and LiHMDs refers to lithium bis(trimethylsilyl)amide.

As used herein, the room temperature refers to about 20° C. to 25° C.

Intermediate 1a

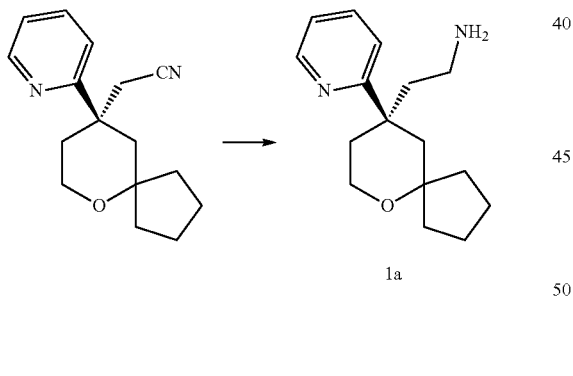

1a (R)-2-(9-(pyridin-2-yl)-6-oxaspiro[4.5]decan-9-yl)acetonitrile (10 g, 39 mmol, purchased from Shanghai Yucheng Pharmaceutical Technology Co., Ltd., CAS No. 1401031-38-6) and raney nickel (1 g) were added to ethanol (200 mL) and an ammonia water (30 mL), and the reaction solution was stirred at the room temperature for 12 h under the protection of hydrogen gas, followed by filtration, and concentration under reduced pressure, to obtain (R)-2-(9-(pyridin-2-yl)-6-oxaspiro[4.5]decan-9-yl)athamine (intermediate 1a, 10 g, colorless oily liquid) with a yield of 99%. MS m/z (ESI): 261.2 [M+1].

Example 1

N-(2-((R)-9-(pyridin-2-yl)-6-oxaspiro[4.5]decan-9-yl)ethyl)-5,6-dihydro-4H-pyrrolo[1,2-b]pyrazol-4-amine (H-1)

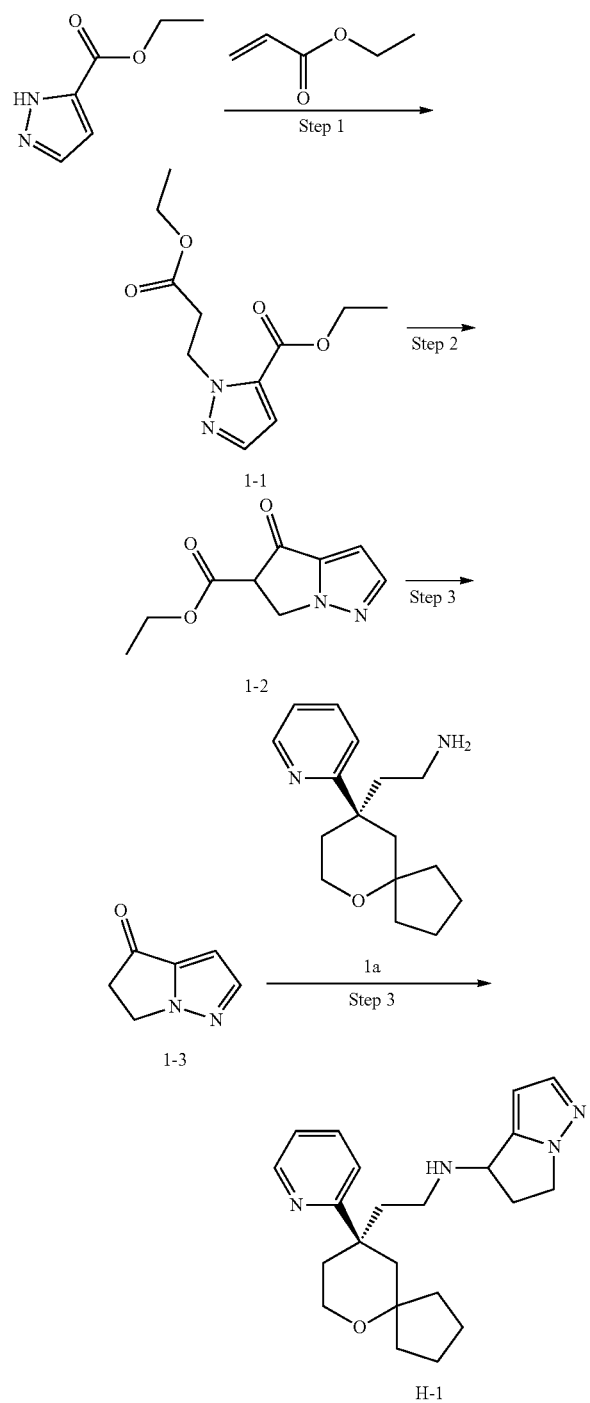

At step 1: ethyl 1H-pyrazole-5-carboxylate (10 g, 7.14 mmol) was dissolved in DMF (100 mL), ethyl acrylate (10.7 g, 10.7 mmol) was added, and the reaction solution was stirred at 100° C. overnight. EA (400 mL) was added, followed by washing with a saturated sodium bicarbonate solution, drying with anhydrous sodium sulfate, and concentration under reduced pressure, and an obtained residue was purified by thin layer chromatography using eluents (PE:EA=1:1) to obtain a compound 1-1 (1.2 g) with a yield of 7%. MS m/z (ESI): 241.1 [M+1].

At step 2: the compound 1-1 (300 mg, 1.25 mmol) was dissolved in a toluene solution (8 mL), potassium t-butoxide (280 mg, 2.5 mmol) was added, and the reaction solution was stirred at 110° C. for 1 h. The reaction solution was filtered, an obtained filtrate was concentrated under reduced pressure, EA (30 mL) was added, and a 2 N hydrochloric acid solution was added, followed by washing with a saturated sodium bicarbonate solution and drying with anhydrous sodium sulfate. The obtained organic phase was concentrated under reduced pressure to obtain a compound 1-2 (130 mg). MS m/z (ESI): 195.1 [M+1].

At step 3: the compound 1-2 (130 mg) was dissolved in a methanol solution (8 mL), a methanol solution of 4 M hydrogen chloride (1 mL) was added, and the reaction solution was stirred at 50° C. overnight. An obtained organic phase was concentrated under reduced pressure to obtain a compound 1-3 (100 mg, a crude product). MS m/z (ESI): 123.1 [M+1].

At step 4: the compound 1-3 (100 mg, 0.82 mmol) was dissolved in a DCE solution (8 mL), the compound 1a (210 mg, 0.82 mmol) and titanium isopropoxide (1 mL) were added, and the reaction solution was heated to 60° C. to react overnight. After the reaction solution was cooled to the room temperature, sodium borohydride (94 mg, 2.46 mmol) was added, and the reaction solution was stirred at the room temperature for 1 h. Water was added, the mixture was filtered, an obtained filtrate was concentrated under reduced pressure, and an obtained residue was purified by preparative liquid chromatography (preparative column: 21.2×250 mm C18 column; system: 10 mM $NH_4HCO_3H_2O$; wavelengths: 254/214 nm; gradients: 30%-60% changes in acetonitrile) to obtain a compound H-1 (2.15 mg) with a yield of 0.7%. MS m/z (ESI): 367.1 [M+1]; $^1H$ NMR (400 MHz, $CDCl_3$): δ 8.56 (m, 1H), 8.12 (s, 1H), 7.68-7.64 (m, 1H), 7.46-7.45 (m, 1H), 7.32-7.29 (m, 1H), 7.17-7.13 (m, 1H), 5.92-5.89 (d, J=12 Hz, 1H), 4.26-4.20 (m, 2H), 4.06-4.01 (m, 1H), 3.72-3.69 (m, 2H), 2.87-2.74 (m, 2H), 2.64-2.43 (m, 6H), 2.35-2.29 (m, 3H), 2.10-2.03 (m, 1H), 1.91-1.84 (m, 2H), 1.78-1.63 (m, 3H), 1.24-1.21 (m, 1H).

Example 2

6-(2-methoxypropan-2-yl)-N-(2-((R)-9-(pyridin-2-yl)-6-oxaspiro[4.5]decan-9-yl)ethyl)-5,6-dihydro-4H-pyrrolo[1,2-b]pyrazol-4-amine (H-2)

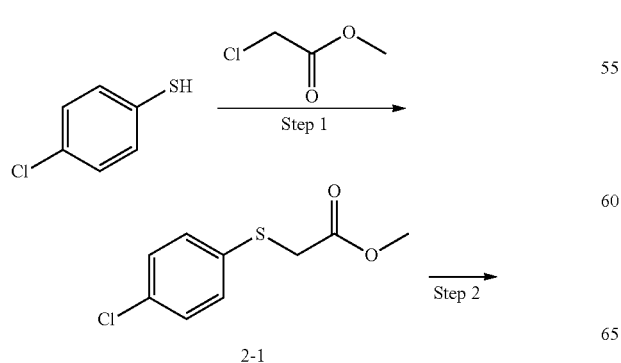

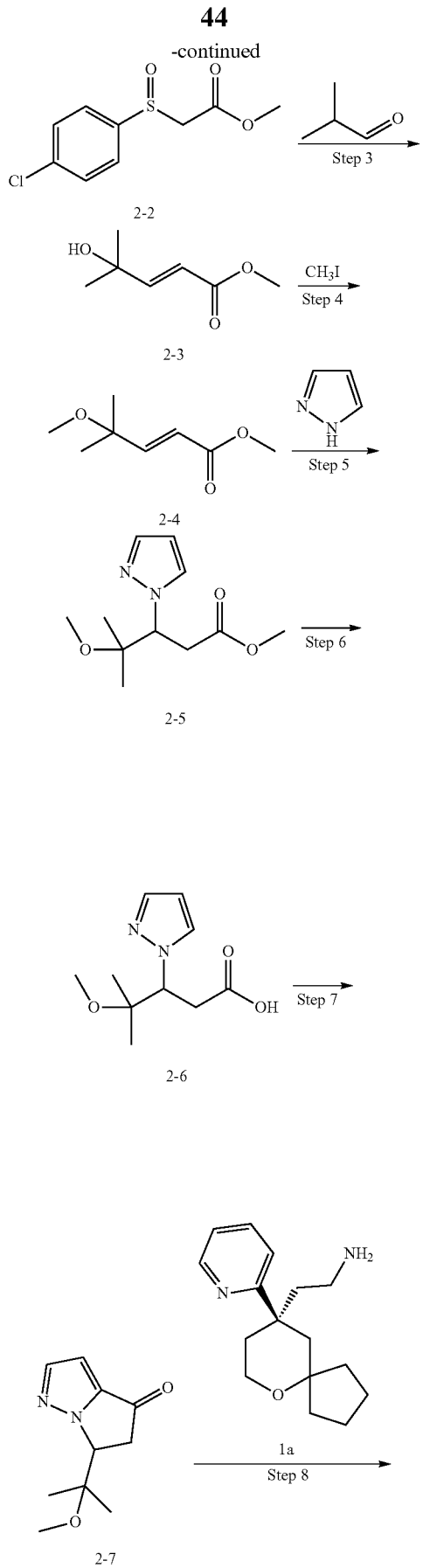

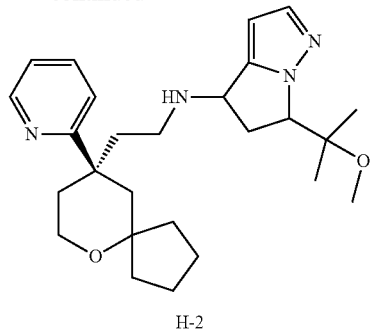

H-2

At step 1: 4-chlorothiophenol (4.32 g, 30 mmol) was dissolved in methanol (100 mL), methyl chloroacetate (3.84 g, 31.5 mmol) and a methanol solution of 5.4 M sodium methoxide (5.4 mL, 31.5 mmol) were added, and the reaction solution was heated to 80° C. and stirred for 1 h. The reaction solution was concentrated, and an obtained residue was diluted with EA (150 mL), followed by washing with water (80 mL×1), washing with a saturated saline solution (40 mL×1), drying with anhydrous sodium sulfate, and filtration. An obtained filtrate was concentrated under reduced pressure, and an obtained residue was purified by silica gel column chromatography (PE/EA=5/1) to obtain a compound 2-1 (5.0 g, a yellow oily liquid) with a yield of 77%. MS m/z (ESI): 217.3 [M+1].

At step 2: the compound 2-1 (5 g, 23 mmol) was dissolved in acetic acid (60 mL), 30% hydrogen peroxide (2.45 g, 23 mmol) was slowly added while stirring, and the reaction solution was stirred at the room temperature overnight. The reaction solution was concentrated, and an obtained residue was diluted with EA (150 mL), followed by washing with water (70 mL×1), washing with a saturated saline solution (40 mL×1), drying with anhydrous sodium sulfate, and filtration. An obtained filtrate was concentrated under reduced pressure, and an obtained residue was purified by silica gel column chromatography (PE/EA=3/1) to obtain a compound 2-2 (4.2 g, a yellow oily liquid) with a yield of 79%. MS m/z (ESI): 233.3 [M+1].

At step 3: the compound 2-2 (4.2 g, 18 mmol) and piperidine (1.85 g, 21.8 mmol) were dissolved in acetonitrile (60 mL), and an acetonitrile solution of isobutyraldehyde (1.57 g, 21.8 mmol) was slowly added dropwise while stirring. The reaction solution was heated to 60° C. and stirred for 5 h. The reaction solution was concentrated, and an obtained residue was diluted with EA (150 mL), followed by washing with water (70 mL×1), washing with a saturated saline solution (40 mL×1), drying with anhydrous sodium sulfate, and filtration. An obtained filtrate was concentrated under reduced pressure, and an obtained residue was purified by silica gel column chromatography (PE/EA=3/1) to obtain a compound 2-3 (1.68 g, a yellow oily liquid) with a yield of 65%. MS m/z (ESI): 145.2 [M+1].

At step 4: the compound 2-3 (1.68 g, 11.7 mmol) and iodomethane (2.49 g, 17.5 mmol) were dissolved in DMF (50 mL), and sodium hydride (0.7 g, 17.5 mmol) was slowly added dropwise while stirring. The reaction solution was stirred at the room temperature for 3 h. The reaction solution was diluted with EA (150 mL), followed by washing with water (70 mL×1), washing with a saturated saline solution (40 mL×1), drying with anhydrous sodium sulfate, and filtration. An obtained filtrate was concentrated under reduced pressure, and an obtained residue was purified by silica gel column chromatography (PE/EA=4/1) to obtain a compound 2-4_(1.5 g, a yellow oily liquid) with a yield of 81%. MS m/z (ESI): 159.2 [M+1].

At step 5: an acetonitrile solution (40 mL) and DBU (2.89 g, 19 mmol) were added to a sealed tube in which the compound 2-4 (1.5 g, 9.5 mol) and pyrazole (1.29 g, 19 mmol) were placed, the reaction solution was stirred at 100° C. for 18 h, cooled to the room temperature, and concentrated, and an obtained residue was diluted with EA (100 mL), followed by washing with water (50 mL×1), washing with a saturated saline solution (30 mL×1), drying with anhydrous sodium sulfate, and filtration. An obtained filtrate was concentrated under reduced pressure, and an obtained residue was purified by silica gel column chromatography (PE/EA=6/1) to obtain a compound 2-5 (1.29 g, a yellow oily liquid) with a yield of 60%. MS m/z (ESI): 227.3 [M+1].

At step 6: the compound 2-5 (1.29 g, 5.7 mmol) was dissolved in a mixture of methanol (40 mL) and water (10 mL), sodium hydroxide (0.456 g, 11.4 mmol) was added, and the reaction was stirred at the room temperature for 1 h until the reaction was completed. The reaction solution was concentrated, an obtained residue was dissolved in water (30 mL), 2 M hydrochloric acid was added to adjust a pH of the mixture to 3-4, the mixture was extracted with DCM (40 mL×3), a combined organic phase was dried with anhydrous sodium sulfate and filtered, and an obtained filtrate was concentrated under reduced pressure to obtain a compound 2-6 (0.97 g, a yellow oily liquid) with a yield of 80%. MS m/z (ESI): 213.2 [M+1].

At step 7: the compound 2-6 (0.97 g, 4.56 mmol) was dissolved in dry THF (60 mL), the solution was cooled to −70° C. under the protection of nitrogen gas, and a THF solution of 2.5 M butyllithium (4.5 mL, 11.4 mmol) was slowly added dropwise. After the dropwise addition was completed, the reaction solution was slowly heated to −40° C. and stirred for 45 min. Water (5 mL) was added to quench the reaction, followed by filtration, concentration, and purification by silica gel column chromatography (PE/EA=6/1), to obtain a compound 2-7 (177 mg, a yellow oily liquid) with a yield of 20%. MS m/z (ESI): 195.3 [M+1].

At step 8: the compound 2-7 (60 mg, 0.31 mmol) and the compound 1a (80 mg, 0.31 mmol) were dissolved in DCE (10 mL), titanium isopropoxide (1 mL) was added, and the reaction solution was stirred at 45° C. for 18 h. After the reaction solution was cooled to the room temperature, sodium borohydride (34 mg, 0.9 mmol) was added, the reaction solution was stirred for 3 h, water (5 mL) was added, the mixture was stirred for 0.5 h and filtered, an obtained filtrate was concentrated under reduced pressure, and an obtained residue was purified by preparative chromatography (preparative column: 21.2×250 mm C18 column; system: 10 mM $NH_4HCO_3H_2O$; wavelengths: 254/214 nm; gradients: 30%-60% changes in acetonitrile) to obtain a product H-2 (35 mg, a colorless oily substance) with a yield of 25.7%. MS m/z (ESI): 439.3 [M+1]; $^1$H NMR (400 MHz, DMSO-d6) δ 8.51-8.49 (m, 1H), 7.71-7.69 (m, 1H), 7.45-7.42 (m, 1H), 7.31-7.28 (m, 1H), 7.18-7.16 (m, 1H), 5.68 (dd, J=12.3, 1.8 Hz, 1H), 4.10-4.07 (m, 1H), 3.78 (td, J=7.9, 4.8 Hz, 1H), 3.57 (dd, J=9.1, 2.8 Hz, 2H), 3.00 (s, 3H), 2.64 (m, 1H), 2.45-2.27 (m, 3H), 2.06-1.70 (m, 5H), 1.66-1.28 (m, 8H), 1.25 (d, J=7.6 Hz, 3H), 1.07 (d, J=7.1 Hz, 3H), 0.97-0.93 (m, 1H), 0.61-0.57 (m, 1H).

Example 3

6-cyclopropyl-N-(2-((R)-9-(pyridin-2-yl)-6-oxaspiro[4.5]decan-9-yl)ethyl)-5,6-dihydro-4H-pyrrolo[1,2-b]pyrazol-4-amine (H-3)

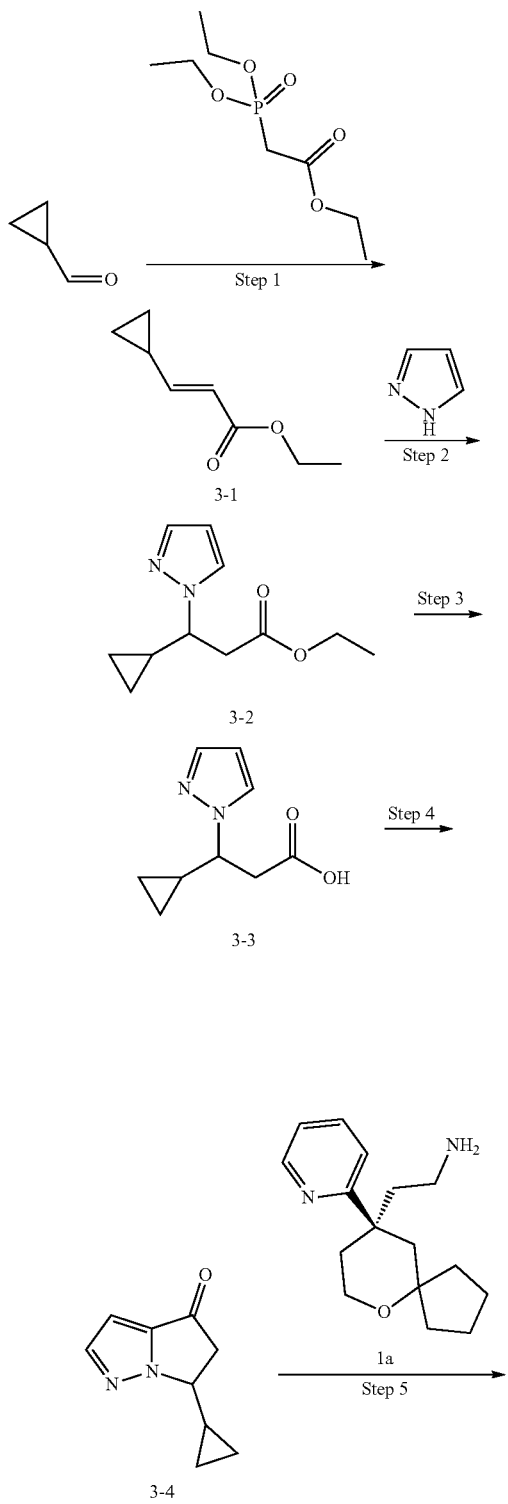

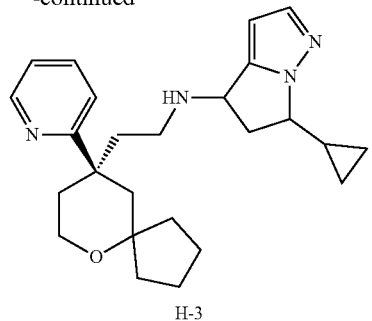

At step 1: cyclopropanecarboxaldehyde (3.5 g, 50 mmol) was dissolved in acetonitrile (100 mL), triethyl phosphonoacetate (11.8 g, 52.5 mmol) and lithium chloride (2.2 g, 52.5 mmol) were added, the reaction solution was cooled to 2 to 5° C., DBU (7.5 g, 52.5 mmol) was slowly added, and the reaction solution was placed at the room temperature for 18 h. The reaction solution was concentrated, and an obtained residue was diluted with EA (120 mL), followed by washing with water (80 mL×1), washing with a saturated saline solution (40 mL×1), drying with anhydrous sodium sulfate, and filtration. An obtained filtrate was concentrated under reduced pressure. An obtained residue was purified by silica gel column chromatography (PE/EA=10/1) to obtain a compound 3-1 (4.9 g, a yellow oily liquid) with a yield of 70%. MS m/z (ESI): 141.2 [M+1].

At step 2: an acetonitrile solution (90 mL) and DBU (7.46 g, 52.5 mmol) were added to a sealed tube in which the compound 3-1 (4.9 g, 35 mmol) and pyrazole (3.57 g, 52.5 mmol) were placed. The mixture was stirred at 120° C. for 18 h, cooled to the room temperature, and concentrated, and an obtained residue was diluted with EA (100 mL), followed by washing with water (60 mL×1), washing with a saturated saline solution (30 mL×1), drying with anhydrous sodium sulfate, and filtration. An obtained filtrate was concentrated under reduced pressure, and an obtained residue was purified by silica gel column chromatography (PE/EA=6/1) to obtain a compound 3-2 (3.78 g, a yellow oily liquid) with a yield of 52%. MS m/z (ESI): 209.3 [M+1].

At step 3: the compound 3-2 (3.78 g, 18.2 mmol) was dissolved in a mixture of methanol (50 mL) and water (10 mL), sodium hydroxide (1.46 g, 36.4 mmol) was added, and the reaction solution was stirred at the room temperature for 1 h until the reaction was completed. The reaction solution was concentrated, an obtained residue was dissolved in water (60 mL), 2 M hydrochloric acid was added to adjust a pH value of the mixture to 3-4, the mixture was extracted with DCM (50 mL×3), a combined organic phase was dried with anhydrous sodium sulfate and filtered, and an obtained filtrate was concentrated under reduced pressure to obtain a compound 3-3 (2.29 g, a yellow oily liquid) with a yield of 70%. MS m/z (ESI): 181.2 [M+1].

At step 4: the compound 3-3 (2.29 g, 12.7 mmol) was dissolved in dry THF (80 mL), the reaction solution was cooled to −70° C. under the protection of nitrogen gas, and a THF solution of 2.5 M butyllithium (12.7 mL, 31.8 mmol) was slowly added dropwise. After the dropwise addition was completed, the reaction solution was slowly heated to −40° C. and stirred for 45 min. Water (10 mL) was added to quench the reaction, followed by filtration, concentration, and purification by silica gel column chromatography (PE/EA=6/1), to obtain a compound 3-4 (220 mg, a yellow oily liquid) with a yield of 10.7%. MS m/z (ESI): 163.2 [M+1].

At step 5: the compound 3-4 (50 mg, 0.31 mmol) and the compound 1a (80 mg, 0.31 mmol) were dissolved in DCE (10 mL), titanium isopropoxide (1 mL) was added, and the reaction solution was stirred at 45° C. for 18 h. After the reaction solution was cooled to the room temperature, sodium borohydride (34 mg, 0.9 mmol) was added, the reaction solution was stirred for 3 h, water (5 mL) was added, the mixture was stirred for 0.5 h and filtered, an obtained filtrate was concentrated under reduced pressure, and an obtained residue was purified by preparative chromatography (preparative column: 21.2×250 mm C18 column; system: 10 mM NH$_4$HCO$_3$H$_2$O; wavelengths: 254/214 nm; gradients: 30%-60% changes in acetonitrile) to obtain a product H-3 (41.3 mg, a white solid) with a yield of 32.6%. MS m/z (ESI): 407.3 [M+1]; $^1$H NMR (400 MHz, DMSO-d6) δ 8.51 (m, 1H), 7.70 (m, 1H), 7.44 (dd, J=8.1, 1.6 Hz, 1H), 7.28 (dd, J=5.5, 1.9 Hz, 1H), 7.17 (dd, J=7.4, 4.8 Hz, 1H), 5.75-5.59 (m, 1H), 3.95-3.67 (m, 2H), 3.66-3.41 (m, 3H), 2.77 (m, 1H), 2.44-2.37 (m, 1H), 2.35-2.27 (m, 1H), 2.02-1.70 (m, 5H), 1.66-1.25 (m, 8H), 0.97 (m, 2H), 0.65-0.34 (m, 4H), 0.27 (m, 1H).

Example 4

6-ethyl-N-(2-((R)-9-(pyridin-2-yl)-6-oxaspiro[4.5]decan-9-yl)ethyl)-5,6-dihydro-4H-pyrrolo[1,2-b]pyrazol-4-amine (a mixture of diastereomers H-4-1 and a mixture of diastereomers H-4-2)

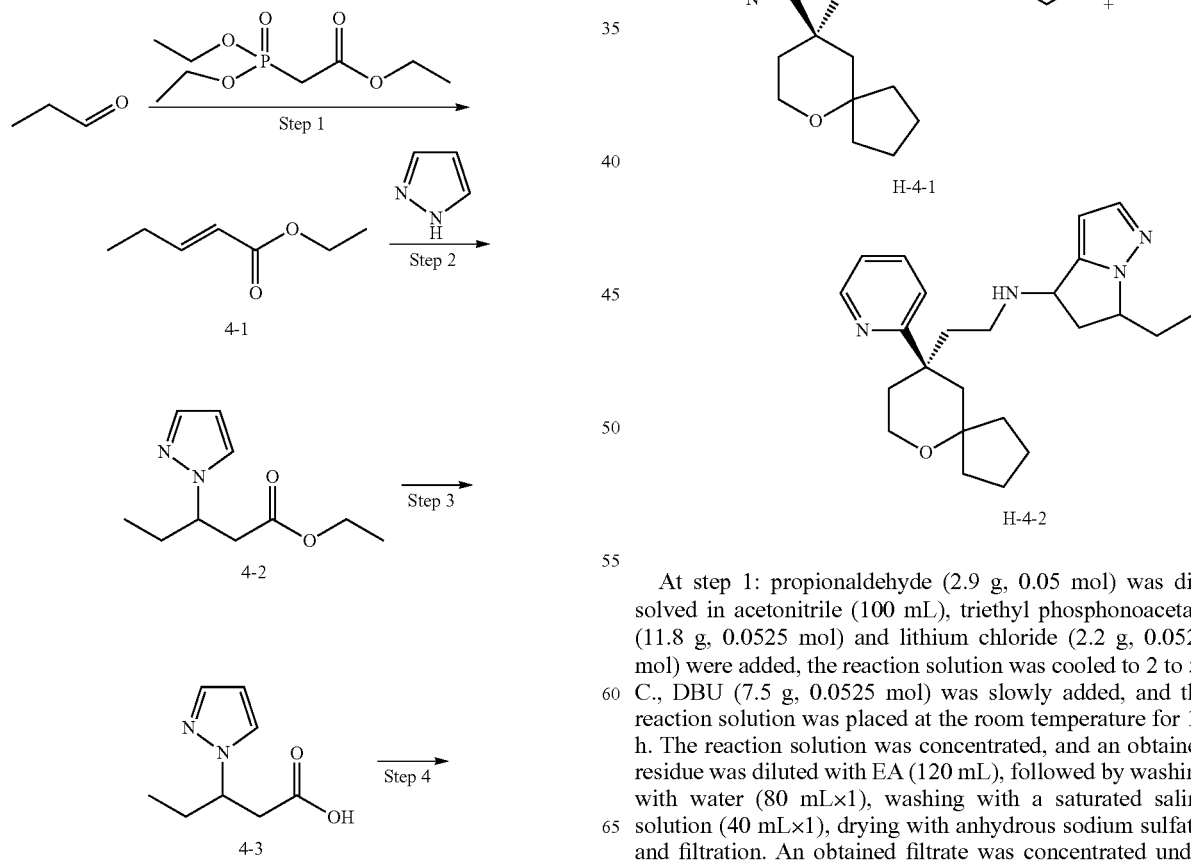

At step 1: propionaldehyde (2.9 g, 0.05 mol) was dissolved in acetonitrile (100 mL), triethyl phosphonoacetate (11.8 g, 0.0525 mol) and lithium chloride (2.2 g, 0.0525 mol) were added, the reaction solution was cooled to 2 to 5° C., DBU (7.5 g, 0.0525 mol) was slowly added, and the reaction solution was placed at the room temperature for 18 h. The reaction solution was concentrated, and an obtained residue was diluted with EA (120 mL), followed by washing with water (80 mL×1), washing with a saturated saline solution (40 mL×1), drying with anhydrous sodium sulfate, and filtration. An obtained filtrate was concentrated under reduced pressure. An obtained residue was purified by silica gel column chromatography (PE/EA=10/1) to obtain a compound 4-1 (5.12 g, a yellow oily liquid) with a yield of 80%. MS m/z (ESI): 129.2 [M+1].

At step 2: an acetonitrile solution (90 mL) and DBU (8.52 g, 60 mmol) were added to a sealed tube in which the compound 4-1 (5.12 g, 40 mmol) and pyrazole (4 g, 60 mmol) were placed, the reaction solution was stirred at 120° C. for 18 h, cooled to the room temperature, and concentrated, and an obtained residue was diluted with EA (100 mL), followed by washing with water (60 mL×1), washing with a saturated saline solution (30 mL×1), drying with anhydrous sodium sulfate, and filtration. An obtained filtrate was concentrated under reduced pressure. An obtained residue was purified by silica gel column chromatography (PE/EA=6/1) to obtain a compound 4-2 (4.7 g, a yellow oily liquid) with a yield of 60%. MS m/z (ESI): 197.3 [M+1].

At step 3: the compound 4-2 (4.7 g, 24 mmol) was dissolved in a mixture of methanol (50 mL) and water (10 mL), sodium hydroxide (1.92 g, 48 mmol) was added, and the reaction solution was stirred at the room temperature for 1 h until the reaction was completed. The reaction solution was concentrated, an obtained residue was dissolved in water (60 mL), 2 M hydrochloric acid was added to adjust a pH value of the mixture to 3-4, the mixture was extracted with DCM (50 mL×3), a combined organic phase was dried with anhydrous sodium sulfate and filtered, and an obtained filtrate was concentrated under reduced pressure to obtain a compound 4-3 (2.62 g, a yellow oily liquid) with a yield of 65%. MS m/z (ESI): 169.2 [M+1].

At step 4: the compound 4-3 (2.62 g, 15.6 mmol) was dissolved in dry THF (80 mL), the reaction solution was cooled to −70° C. under the protection of nitrogen gas, and a THF solution of 2.5 M butyllithium (15.6 mL, 39 mmol) was slowly added dropwise. After the dropwise addition was completed, the reaction solution was slowly heated to −40° C. and stirred for 45 min. Water (10 mL) was added to quench the reaction, followed by filtration, concentration, and purification by silica gel column chromatography (PE/EA=6/1) to obtain a compound 4-4 (350 mg, a yellow oily liquid) with a yield of 15%. MS m/z (ESI): 151.2 [M+1].

At step 5: the compound 4-4 (50 mg, 0.33 mmol) and the compound 1a (87 mg, 0.33 mmol) were dissolved in DCE (10 mL), titanium isopropoxide (1 mL) was added, and the reaction solution was stirred at 45° C. for 18 h. After the reaction solution was cooled to the room temperature, sodium borohydride (34 mg, 0.9 mmol) was added, the reaction solution was stirred for 3 h, water (5 mL) was added, the mixture was stirred for 0.5 h and filtered, and an obtained filtrate was concentrated under reduced pressure to obtain a compound H-4.

At step 6: the compound H-4 was purified by preparative chromatography (preparative column: 21.2×250 mm C18 column; system: 10 mM NH$_4$HCO$_3$H$_2$O; wavelengths: 254/214 nm; gradients: 30%-60% changes in acetonitrile) to obtain a mixture of diastereomers H-4-1 (15.12 mg, a white solid) with a yield of 11.6%: MS m/z (ESI): 395.2 [M+1]; $^1$H NMR (400 MHz, DMSO-d6) δ 8.54-8.47 (m, 1H), 7.71-7.68 (m, 1H), 7.44 (d, J=8.1 Hz, 1H), 7.29-7.27 (m, 1H), 7.21-7.13 (m, 1H), 6.03 (s, 1H), 5.71-5.63 (m, 1H), 3.96-3.93 (m, 1H), 3.87-3.84 (m, 1H), 3.63-3.50 (m, 2H), 2.75-2.72 (m, 1H), 2.43-2.27 (m, 3H), 2.00-1.71 (m, 4H), 1.70-1.21 (m, 10H), 0.99-0.82 (m, 4H), 0.60-0.58 (m, 1H), and a mixture of diastereomers H-4-2 (1.0 mg, a white solid) with a yield of 0.8%: MS m/z (ESI): 395.2 [M+1].

Example 5

6-cyclopentyl-N-(2-((R)-9-(pyridin-2-yl)-6-oxaspiro[4.5]decan-9-yl)ethyl)-5,6-dihydro-4H-pyrrolo[1,2-b]pyrazol-4-amine (H-5)

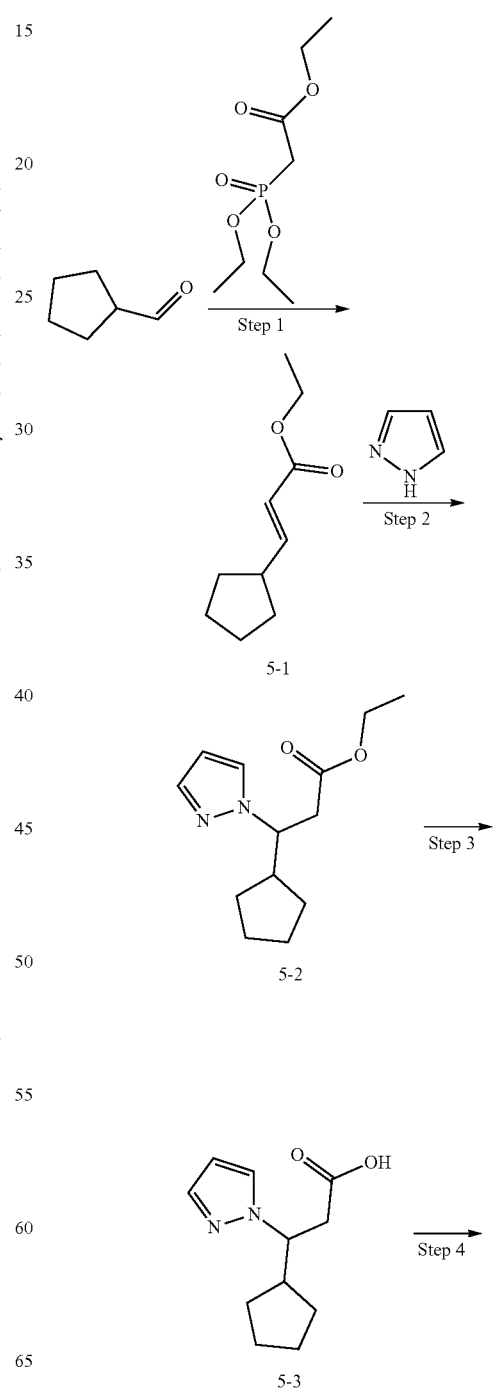

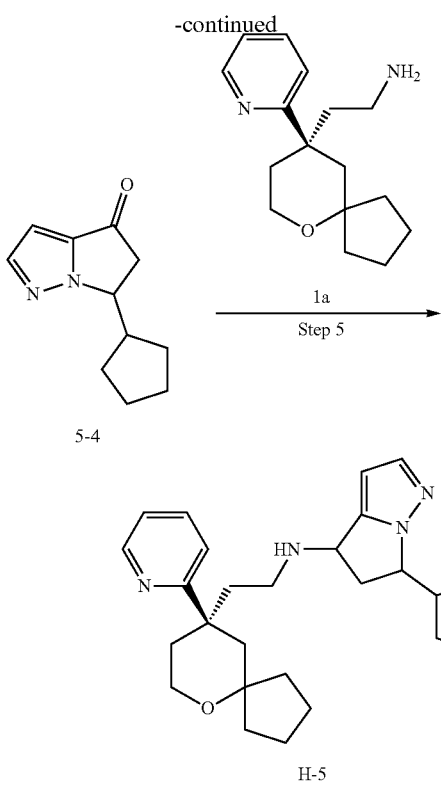

At step 1: cyclopentanecarboxaldehyde (4.9 g, 50 mmol) was dissolved in acetonitrile (100 mL), triethyl phosphonoacetate (11.8 g, 52.5 mmol) and lithium chloride (2.2 g, 52.5 mmol) were added, the reaction solution was cooled to 2 to 5° C., DBU (7.5 g, 52.5 mmol) was slowly added, and the reaction solution was placed at the room temperature for 18 h. The reaction solution was concentrated, and an obtained residue was diluted with EA (120 mL), followed by washing with water (70 mL×1), washing with a saturated saline solution (40 mL×1), drying with anhydrous sodium sulfate, and filtration. An obtained filtrate was concentrated under reduced pressure. An obtained residue was purified by silica gel column chromatography (PE/EA=10/1) to obtain a compound 5-1 (6.3 g, a yellow oily liquid) with a yield of 75%. MS m/z (ESI): 169.2 [M+1].

At step 2: an acetonitrile solution (90 mL) and DBU (8.59 g, 56.5 mmol) were added to a sealed tube in which the compound 5-1 (6.3 g, 37.5 mmol) and pyrazole (3.8 g, 56.2 mmol) were placed, the reaction solution was stirred at 100° C. for 18 h, cooled to the room temperature, and concentrated, and an obtained residue was diluted with EA (100 mL), followed by washing with water (60 mL×1), washing with a saturated saline solution (30 mL×1), drying with anhydrous sodium sulfate, and filtration. An obtained filtrate was concentrated under reduced pressure. An obtained residue was purified by silica gel column chromatography (PE/EA=6/1) to obtain a compound 5-2 (4.86 g, a yellow oily liquid) with a yield of 55%. MS m/z (ESI): 237.3 [M+1].

At step 3: the compound 5-2 (4.86 g, 20.6 mmol) was dissolved in a mixture of methanol (60 mL) and water (15 mL), sodium hydroxide (1.65 g, 41.25 mmol) was added, and the reaction solution was stirred at the room temperature for 1 h until the reaction was completed. The reaction solution was concentrated, an obtained residue was dissolved in water (40 mL), 2 M hydrochloric acid was added to adjust a pH value of the mixture to 3 to 4, the mixture was extracted with DCM (60 mL×3), a combined organic phase was dried with anhydrous sodium sulfate and filtered, and an obtained filtrate was concentrated under reduced pressure to obtain a compound 5-3 (3.2 g, a yellow oily liquid) with a yield of 75%. MS m/z (ESI): 209.2 [M+1].

At step 4: the compound 5-3 (3.2 g, 15.45 mmol) was dissolved in dry THF (80 mL), the reaction solution was cooled to −70° C. under the protection of nitrogen gas, and a THF solution of 2.5 M butyllithium (15.45 mL, 38.62 mmol) was slowly added dropwise. After the dropwise addition was completed, the reaction solution was slowly heated to −40° C. and stirred for 45 min. Water (10 mL) was added to quench the reaction, followed by filtration, concentration, and purification by silica gel column chromatography (PE/EA=6/1) to obtain a compound 5-4 (293 mg, a yellow oily liquid) with a yield of 10%. MS m/z (ESI): 191.3 [M+1].

At step 5: the compound 5-4 (57 mg, 0.30 mmol) and the compound 1a (78 mg, 0.30 mmol) were dissolved in DCE (10 mL), titanium isopropoxide (1 mL) was added, and the reaction solution was stirred at 45° C. for 18 h. After the reaction solution was cooled to the room temperature, sodium borohydride (34 mg, 0.9 mmol) was added, the reaction solution was stirred for 3 h, water (5 mL) was added, the mixture was stirred for 0.5 h and filtered, an obtained filtrate was concentrated under reduced pressure, and an obtained residue was purified by preparative chromatography (preparative column: 21.2×250 mm C18 column; system: 10 mM NH$_4$HCO$_3$H$_2$O; wavelengths: 254/214 nm; gradients: 30%-60% changes in acetonitrile) to obtain a compound H-5 (33 mg, a colorless oily substance) with a yield of 25.4%. MS m/z (ESI): 435.1 [M+1]; $^1$H NMR (400 MHz, DMSO-d6) δ 8.50 (dd, J=4.6, 2.1 Hz, 1H), 7.70-7.67 (m, 1H), 7.43 (d, J=8.1 Hz, 1H), 7.27 (dd, J=4.0, 1.8 Hz, 1H), 7.17 (dd, J=7.4, 4.8 Hz, 1H), 5.67 (dd, J=24.4, 1.8 Hz, 1H), 3.96-3.93 (m, 1H), 3.85-3.81 (m, 1H), 3.58-3.55 (m, 2H), 2.76-2.63 (m, 1H), 2.44-2.26 (m, 3H), 2.13-2.09 (m, 1H), 1.99-1.18 (m, 21H), 0.94 (s, 1H), 0.60-0.56 (m, 1H).

Example 6

6-tert-butyl-N-(2-((R)-9-(pyridin-2-yl)-6-oxaspiro[4.5]decan-9-yl)ethyl)-5,6-dihydro-4H-pyrrolo[1,2-b]pyrazol-4-amine (H-6)

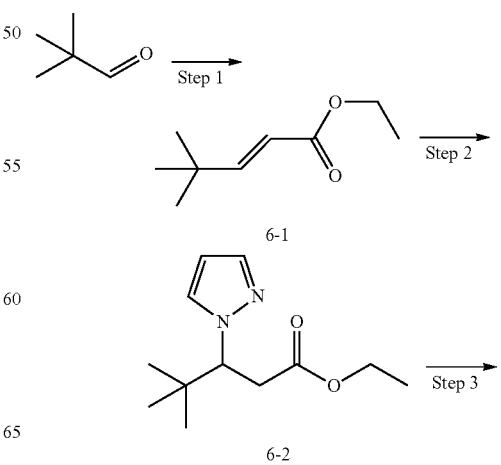

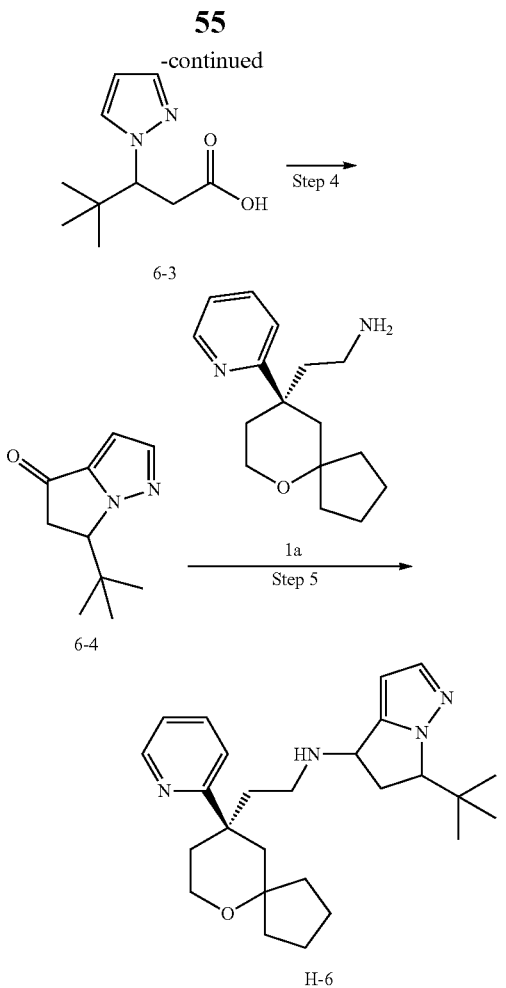

At step 1: pivalaldehyde (17.2 g, 0.2 mol) was dissolved in acetonitrile (400 mL), triethyl phosphonoacetate (48 g, 0.21 mol) and lithium chloride (8.8 g, 0.21 mol) were added, the reaction solution was cooled to 2 to 5° C., DBU (30.4 g, 0.2 mol) was slowly added, and the reaction solution was placed at the room temperature for 18 h. The reaction solution was concentrated, and an obtained residue was diluted with EA (300 mL), followed by washing with water (100 mL×2), washing with a saturated saline solution (80 mL×1), drying with anhydrous sodium sulfate, and filtration. An obtained filtrate was concentrated under reduced pressure. An obtained residue was purified by silica gel column chromatography (PE/EA=10/1) to obtain a compound 6-1 (25.6 g, a yellow oily liquid) with a yield of 82%. MS m/z (ESI): 157.2 [M+1].

At step 2: an acetonitrile solution (80 mL) and DBU (11.4 g, 75 mmol) were added to a sealed tube in which the compound 6-1 (7.8 g, 50 mmol) and pyrazole (5.1 g, 75 mmol) were placed, the reaction solution was stirred at 100° C. for 48 h, cooled to the room temperature, and concentrated, an obtained residue was diluted with EA (150 mL), followed by washing with water (60 mL×1), washing with a saturated saline solution (30 mL×1), drying with anhydrous sodium sulfate, and filtration. An obtained filtrate was concentrated under reduced pressure. An obtained residue was purified by silica gel column chromatography (PE/EA=6/1) to obtain a compound 6-2 (8.96 g, a yellow oily liquid) with a yield of 80%. MS m/z (ESI): 225.1 [M+1].

At step 3: the compound 6-2 (8.96 g, 40 mmol) was dissolved in a mixture of methanol (100 mL) and water (20 mL), sodium hydroxide (3.2 g, 80 mmol) was added, and the reaction solution was stirred at the room temperature for 1 h until the reaction was completed. The reaction solution was concentrated, an obtained residue was dissolved in water (70 mL), 2 M hydrochloric acid was added to adjust a pH value of the mixture to 3 to 4, the mixture was extracted with DCM (90 mL×3), a combined organic phase was dried with anhydrous sodium sulfate and filtered, and an obtained filtrate was concentrated under reduced pressure to obtain a compound 6-3 (7 g, a yellow oily liquid) with a yield of 90%. MS m/z (ESI): 197.2 [M+1].

At step 4: the compound 6-3 (7 g, 35.7 mmol) was dissolved in dry THF (120 mL), the reaction solution was cooled to −70° C. under the protection of nitrogen gas, and a THF solution of 2.5 M butyllithium (35.7 mL, 89.2 mmol) was slowly added dropwise. After the dropwise addition was completed, the reaction solution was slowly heated to −40° C. and stirred for 45 min. Water (3 mL) was added to quench the reaction, followed by filtration, concentration, and purification by silica gel column chromatography (PE/EA=6/1) to obtain a compound 6-4 (4.76 g, a yellow oily liquid) with a yield of 15%. MS m/z (ESI): 179.2 [M+1].

At step 5: the compound 6-4 (25 mg, 0.14 mmol) was dissolved in DCE (5 mL), the compound 1a (36 mg, 0.14 mmol) and titanium isopropoxide (0.5 mL) were added, and the reaction solution was stirred at 60° C. for 12 h. Sodium borohydride (26.5 mg, 0.7 mmol) was added, and the reaction solution was stirred at 65° C. for 3 h. Water (20 mL) was added, the mixture was filtered, and an obtained filtrate was extracted with DCM (40 mL×2), followed by drying with anhydrous sodium sulfate and concentration under reduced pressure. An obtained concentrate was purified by preparative chromatography (preparative column: 21.2×250 mm C18 column; system: 10 mM NH$_4$HCO$_3$H$_2$O; wavelengths: 254/214 nm; gradients: 30%-60% changes in acetonitrile) to obtain a compound H-6 (15.21 mg, a white liquid) with a yield of 25.74%. MS m/z (ESI): 423.2 [M+1]; $^1$H NMR (400 MHz, CD$_3$OD) δ 8.55-8.46 (m, 1H), 7.81-7.69 (m, 1H), 7.50 (d, J=8.0 Hz, 1H), 7.37 (dd, J=3.9, 1.9 Hz, 1H), 7.29-7.18 (m, 1H), 5.83 (dd, J=20.9, 1.2 Hz, 1H), 3.94 (ddd, J=16.0, 12.3, 4.8 Hz, 2H), 3.82-3.68 (m, 2H), 2.72-2.58 (m, 2H), 2.52 (d, J=14.5 Hz, 1H), 2.41 (dd, J=13.8, 2.0 Hz, 1H), 2.14-1.99 (m, 2H), 1.95-1.85 (m, 2H), 1.80-1.36 (m, 8H), 1.09 (s, 1H), 1.00 (d, J=1.8 Hz, 9H), 0.77-0.67 (m, 1H).

Example 7

6-(2-fluoropropan-2-yl)-N-(2-((R)-9-(pyridin-2-yl)-6-oxaspiro[4.5]decan-9-yl)ethyl)-5,6-dihydro-4H-pyrrolo[1,2-b]pyrazol-4-amine (H-7)

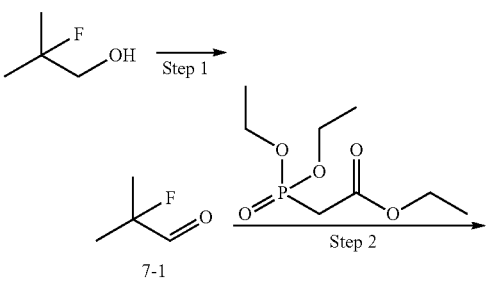

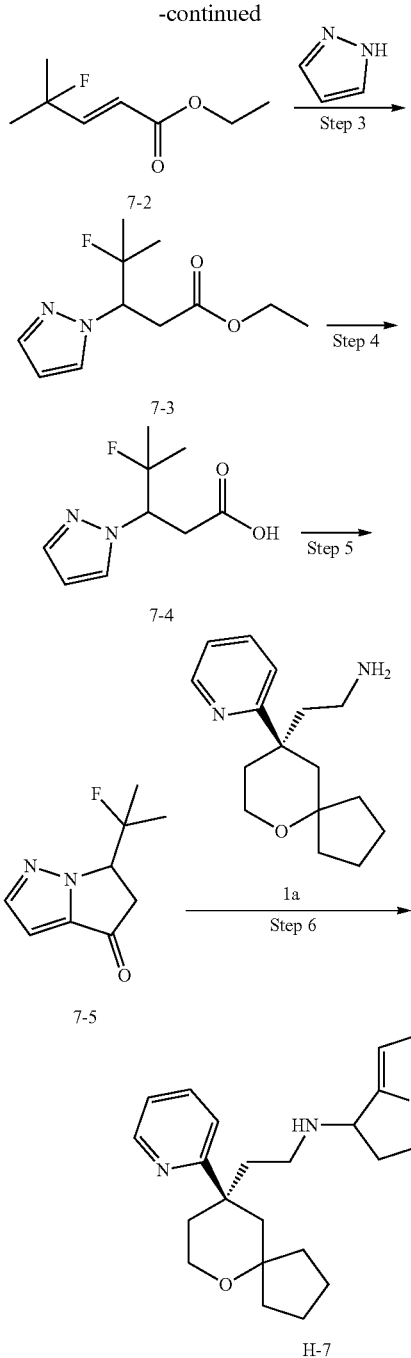

At step 1: 2-fluoro-2-methylpropan-1-ol (1 g, 10.86 mmol) was dissolved in a mixture of acetonitrile (15 mL) and DCM (3 mL), (diacetoxyiodo)benzene (3.67 g, 11.39 mmol) and 2,2,6,6-tetramethylpiperidinooxy (85 mg, 0.54 mmol) were added, and the mixture reacted at the room temperature overnight to obtain a compound 7-1 (978 mg).

At step 2: lithium chloride (690 mg, 16.28 mmol) was added to acetonitrile (30 mL), triethyl phosphonoacetate (2.92 g, 13.02 mmol) and DBU (5.3 g, 34.81 mmol) were added in sequence, after the reaction solution was cooled to 0° C., the compound 7-1 (978 mg) was added dropwise, and the reaction solution reacted at the room temperature overnight. Water (50 mL) was added, the mixture was extracted with EA (50 mL×3), obtained organic phases were combined, a combined organic phase was dried with anhydrous sodium sulfate and filtered, an obtained filtrate was concentrated under reduced pressure, and an obtained residue was purified by silica gel column chromatography using eluents (PE/EA=1/0 to 10/1) to obtain a compound 7-2 (734 mg, a colorless oily liquid) with a yield of 42%. MS m/z (ESI): 161.1 [M+1].

At step 3: the compound 7-2 (734 mg, 4.58 mmol), pyrazole (468 mg, 6.87 mmol), and potassium carbonate (1.27 g, 9.19 mmol) were added to DMF (20 mL), and the reaction solution reacted at 65° C. for 18 h. After the reaction solution was cooled to the room temperature, and EA (300 mL) was added, followed by washing with water (30 mL) and a saturated sodium chloride solution (30 mL×2). The obtained organic phase was dried with anhydrous sodium sulfate, and filtered, an obtained filtrate was concentrated under reduced pressure, and an obtained residue was purified by silica gel column chromatography using eluents (PE/EA=1/0 to 10/1) to obtain a compound 7-3 (1 g, a colorless oily liquid) with a yield of 96%. MS m/z (ESI): 229.1 [M+1].

At step 4: the compound 7-3 (1 g, 4.38 mmol) was dissolved in a mixture of THF (20 mL) and methanol (5 mL), lithium hydroxide monohydrate (368 mg, 8.77 mmol) and water (5 mL) were added, and the reaction solution was stirred at the room temperature for 1 h. A 1 M hydrochloric acid solution was added to adjust a pH value of the reaction solution to 3, the organic solvent was removed by spinning under reduced pressure, an obtained aqueous phase was extracted with DCM (30 mL×4), obtained organic phases were combined, a combined organic phase was dried with anhydrous sodium sulfate and filtered, an obtained filtrate was concentrated under reduced pressure, and an obtained residue was purified by preparative liquid chromatography to obtain a compound 7-4 (588 mg, a white solid) with a yield of 67%. MS m/z (ESI): 201.0 [M+1].

At step 5: the compound 7-4 (588 mg, 2.94 mmol) was dissolved in THF (15 mL), the mixture was cooled to −78° C., 2.5 M n-butyllithium (2.9 mL, 7.25 mmol) was slowly added dropwise, the reaction solution reacted at −60° C. for 1 h and then reacted at −20° C. for 1 h. Water (15 mL) was added to quench the reaction, the mixture was extracted with EA (30 mL×3), obtained organic phases were combined, a combined organic phase was dried with anhydrous sodium sulfate and filtered, an obtained filtrate was concentrated under reduced pressure, and an obtained residue was purified by thin layer chromatography using a developing solvent system (PE/EA=3/1) to obtain a compound 7-5 (39 mg, a pale yellow solid) with a yield of 7.3%. MS m/z (ESI): 183.0 [M+1].

At step 6: the compound 7-5 (39 mg, 0.214 mmol), the compound 1a (67 mg, 0.257 mmol), and titanium isopropoxide (1 mL) were dissolved in DCE (10 mL), and the reaction solution reacted at 50° C. overnight. Water (1 mL) was added to quench the reaction, the mixture was stirred at the room temperature for 20 min and filtered, and an obtained filtrate was concentrated under reduced pressure. An obtained residue was dissolved in methanol (10 mL), sodium borohydride (30 mg, 0.793 mmol) was added, and the reaction solution reacted at the room temperature for 1 h. The reaction solution was concentrated under reduced pressure, and an obtained residue was purified by preparative liquid chromatography (preparative column: 21.2×250 mm C18 column; system: 10 mM NH$_4$HCO$_3$H$_2$O; wavelengths: 254/214 nm; gradients: 30%-60% changes in acetonitrile) to obtain a compound H-7 (35.28 mg, a colorless oily liquid) with a yield of 39%. MS m/z (ESI): 427.1

[M+1]; tH NMR (400 MHz, CD$_3$OD) δ 8.55-8.47 (m, 1H), 7.78-7.73 (m, 1H), 7.50 (d, J=8.0 Hz, 1H), 7.42 (dd, J=5.6, 1.7 Hz, 1H), 7.23 (dd, J=6.6, 5.1 Hz, 1H), 5.86 (dd, J=18.4, 1.3 Hz, 1H), 4.36-4.22 (m, 1H), 4.05-3.94 (m, 1H), 3.82-3.66 (m, 2H), 2.95-2.82 (m, 1H), 2.65-2.37 (m, 3H), 2.18-1.85 (m, 4H), 1.82-1.18 (m, 14H), 1.12-1.06 (m, 1H), 0.75-0.67 (m, 1H).

Example 8

6-isobutyl-N-(2-((R)-9-(pyridin-2-yl)-6-oxaspiro[4.5]decan-9-yl)ethyl)-5,6-dihydro-4H-pyrrolo[1,2-b]pyrazol-4-amine (H-8)

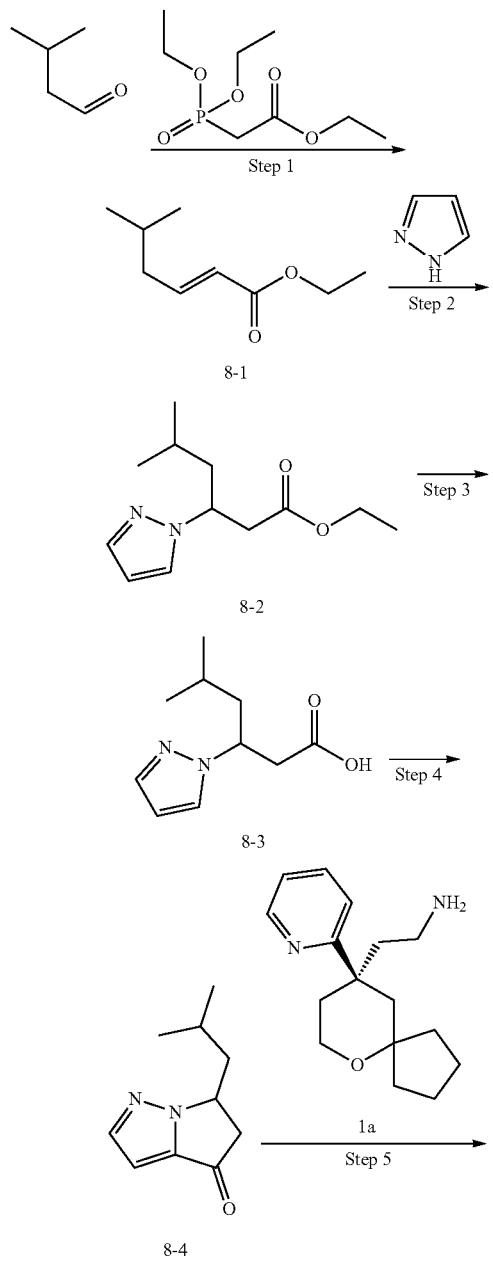

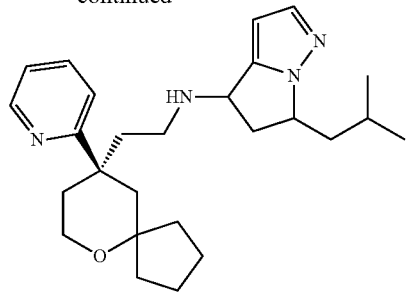

H-8

At step 1: lithium chloride (3.69 g, 87.05 mmol) was added to acetonitrile (40 mL), triethyl phosphonoacetate (19.5 g, 86.98 mmol) and DBU (10.6 g, 69.63 mmol) were then added in sequence, after the reaction solution was cooled to 0° C., 3-methylbutyraldehyde (5 g, 58.08 mmol) was added dropwise, and the reaction solution reacted at the room temperature overnight. A saturated sodium chloride solution (150 mL) was added, the mixture was extracted with EA (50 mL×3), obtained organic phases were combined, a combined organic phase was dried with anhydrous sodium sulfate and filtered, an obtained filtrate was concentrated under reduced pressure, and an obtained residue was purified by silica gel column chromatography using eluents (PE/EA=1/0-10/1) to obtain a compound 8-1 (6.3 g, a colorless oily liquid) with a yield of 70%. MS m/z (ESI): 157.0 [M+1].

At step 2: the compound 8-1 (1 g, 6.40 mmol), pyrazole (870 mg, 12.78 mmol), potassium carbonate (1.8 g, 13.02 mmol) were added to DMF (20 mL), and the reaction solution reacted at 65° C. for 18 h. After the reaction solution was cooled to the room temperature, EA (200 mL) was added, the mixture was washed with a saturated sodium chloride solution (50 mL×3), a combined organic phase was dried with anhydrous sodium sulfate and filtered, an obtained filtrate was concentrated under reduced pressure, and an obtained residue was purified by silica gel column chromatography using eluents (PE/EA=1/0 to 4/1) to obtain a compound 8-2 (1.2 g, a colorless oily liquid) with a yield of 84%. MS m/z (ESI): 225.1 [M+1].

At step 3: the compound 8-2 (1.2 g, 5.35 mmol) was dissolved in a mixture of THF (20 mL) and methanol (5 mL), sodium hydroxide (428 mg, 10.7 mmol) and water (5 mL) were added, and the reaction solution was stirred at the room temperature for 2 h. A 6 M hydrochloric acid solution was added to adjust a pH value of the reaction solution to 4, the organic solvent was removed by spinning under reduced pressure, an obtained aqueous phase was extracted with DCM (50 mL×3), obtained organic phases were combined, a combined organic phase was dried with anhydrous sodium sulfate and filtered, and an obtained filtrate was concentrated under reduced pressure to obtain a compound 8-3 (1 g, a colorless oily liquid) with a yield of 96%. MS m/z (ESI): 197.1 [M+1].

At step 4: the compound 8-3 (1 g, 5.09 mmol) was dissolved in THF (40 mL), the mixture was cooled to −78° C., 2.5 M n-butyllithium (4.7 mL, 11.75 mmol) was slowly added dropwise, and the reaction solution reacted at −78° C. for 1 h. A saturated ammonium chloride solution (1 mL) was added to quench the reaction, the mixture was filtered, an obtained filtrate was concentrated under reduced pressure, and an obtained residue was purified by thin layer chromatography using a developing solvent system (PE/EA=3/1) to obtain a compound 8-4 (57 mg, a colorless oily liquid) with a yield of 6.3%. MS m/z (ESI): 179.1 [M+1].

At step 5: the compound 8-4 (57 mg, 0.32 mmol), the compound 1a (100 mg, 0.38 mmol), and titanium isopropoxide (1 mL) were dissolved in DCE (15 mL), and the reaction solution reacted at 50° C. overnight. Water (1.5 mL) was added to quench the reaction, the mixture was stirred at the room temperature for 20 min and filtered, and an obtained filtrate was concentrated under reduced pressure. An obtained residue was dissolved in methanol (10 mL), sodium borohydride (30 mg, 0.793 mmol) was added, and the reaction solution reacted at the room temperature for 10 min. The reaction solution was concentrated under reduced pressure, and an obtained residue was purified by preparative liquid chromatography (preparative column: 21.2×250 mm C18 column; system: 10 mM $NH_4HCO_3H_2O$; wavelengths: 254/214 nm; gradients: 30%-60% changes in acetonitrile) to obtain a product H-8 (25.26 mg, a pale yellow oily liquid) with a yield of 19%. MS m/z (ESI): 423.3 [M+1]; $^1$H NMR (400 MHz, $CD_3OD$) δ 8.52-8.51 (m, 1H), 7.78-7.74 (m, 1H), 7.50 (d, J=8.1 Hz, 1H), 7.38 (dd, J=6.1, 1.7 Hz, 1H), 7.25-7.21 (m, 1H), 5.84 (dd, J=26.2, 1.3 Hz, 1H), 4.17-4.04 (m, 2H), 3.81-3.66 (m, 2H), 2.98-2.90 (m, 1H), 2.65-2.47 (m, 2H), 2.41 (d, J=13.9 Hz, 1H), 2.15-1.88 (m, 4H), 1.83-1.35 (m, 11H), 1.12-1.06 (m, 1H), 0.94 (dd, J=14.5, 6.7 Hz, 6H), 0.76-0.67 (m, 1H).

Example 9

3-fluoro-6-isopropyl-N-(2-((R)-9-(pyridin-2-yl)-6-oxaspiro[4.5]decan-9-yl)ethyl)-5,6-dihydro-4H-pyrrolo[1,2-b]pyrazol-4-amine (H-9)

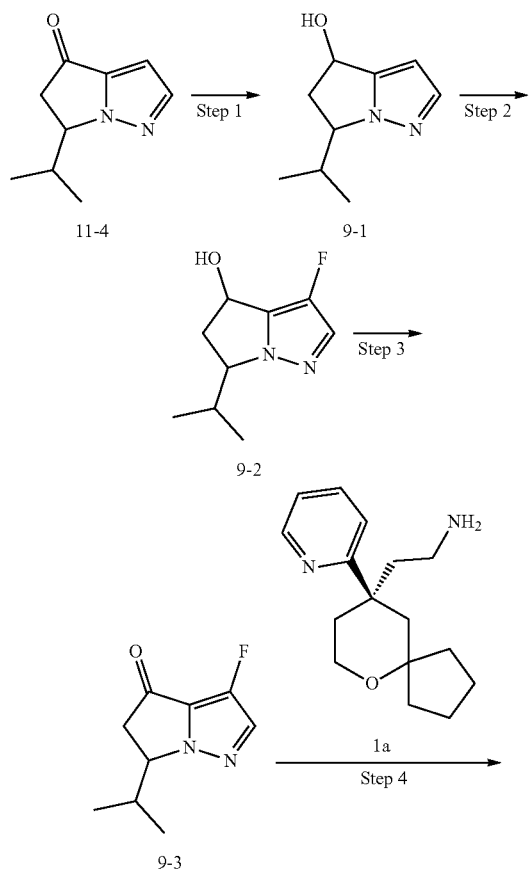

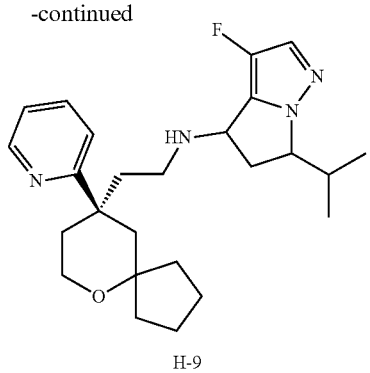

At step 1: 6-isopropyl-5,6-dihydro-4H-pyrrolo[1,2-b]pyrazol-4-one (a compound 11-4, 250 mg, 1.52 mmol) was dissolved in methanol (15 mL), sodium borohydride (115 mg, 3.04 mmol) was added in batches, and the reaction solution reacted at the room temperature for 1 h. A saturated ammonium chloride solution (1 mL) was added to quench the reaction, the mixture was concentrated under reduced pressure, and an obtained residue was purified by silica gel column chromatography using an eluent system (DCM/methanol=1/0 to 10/1) to obtain a compound 9-1 (249 mg, a yellow oily substance) with a yield of 98%. MS m/z (ESI): 167.1 [M+1].

At step 2: the compound 9-1 (249 mg, 1.50 mmol) was dissolved in acetonitrile (10 mL), 1-chloromethyl-4-fluoro-1,4-diazoniabicyclo[2.2.2]octane bis(tetrafluoroborate) (1.1 g, 3.19 mmol) was added, and the reaction solution was stirred at the room temperature overnight. Water (40 mL) was added, the mixture was extracted with EA (40 mL×3), obtained organic phases were combined, a combined organic phase was washed with a saturated sodium chloride solution (50 mL), dried with anhydrous sodium sulfate, and filtered, and an obtained filtrate was concentrated under reduced pressure to obtain a compound 9-2 (275 mg, a yellow oily substance) with a yield of 99%. MS m/z (ESI):185.1 [M+1].

At step 3: the compound 9-2 (275 mg) was dissolved in DCM (20 mL), Dess-Martin periodinane (1.27 g, 2.99 mmol) was added, and the reaction solution reacted at the room temperature for 2 h. A saturated sodium bicarbonate solution (2 mL) was added to quench the reaction, the mixture was filtered, an obtained filtrate was concentrated under reduced pressure, and an obtained residue was purified by preparative thin layer chromatography using a chromatography system (PE/EA=3/1) to obtain a compound 9-3 (110 mg, a colorless oily substance) with a yield of 40%. MS m/z (ESI):183.1 [M+1].

At step 4: the compound 9-3 (56 mg, 0.31 mmol), the compound 1a (88 mg, 0.34 mmol), and titanium isopropoxide (1 mL) were dissolved in DCE (12 mL). The reaction solution reacted at 50° C. overnight, sodium borohydride (80 mg, 2.11 mmol) was added, and the reaction solution reacted at 60° C. for 2 h. After the reaction solution was cooled to the room temperature, water (2 mL) was added, the mixture was filtered, an obtained filtrate was concentrated under reduced pressure, and an obtained residue was purified by preparative liquid chromatography (preparative column: 21.2×250 mm C18 column; system: 10 mM $NH_4HCO_3H_2O$; wavelengths: 254/214 nm; gradients: 30%-60% changes in acetonitrile) to obtain a compound H-9_(14.92 mg, a white oily substance) with a yield of 25%. MS m/z (ESI): 427.1 [M+1]; $^1$H NMR (400 MHz, $CD_3OD$) δ 8.54-8.45 (m, 1H), 7.76-7.71 (m, 1H), 7.48 (d, J=8.1 Hz, 1H), 7.33-7.14 (m, 2H), 4.17-3.98 (m, 2H), 3.83-3.65 (m, 2H), 2.74-2.47 (m, 3H), 2.44-2.29 (m, 2H), 2.26-1.84 (m, 4H), 1.81-1.29 (m, 8H), 1.12-1.06 (m, 1H), 1.02-0.86 (m, 3H), 0.81-0.54 (m, 4H).

Example 10

6-(1-methylcyclopropyl)-N-(2-((R)-9-(pyridin-2-yl)-6-oxaspiro[4.5]decan-9-yl)ethyl)-5,6-dihydro-4H-pyrrolo[1,2-b]pyrazol-4-amine (H-10)

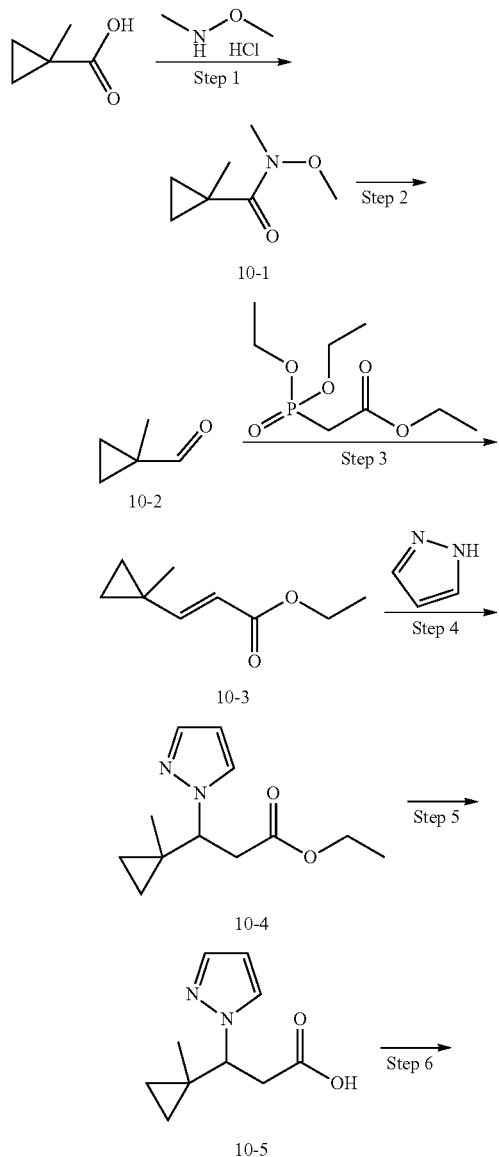

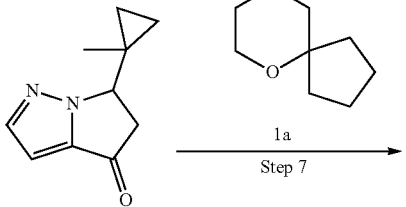

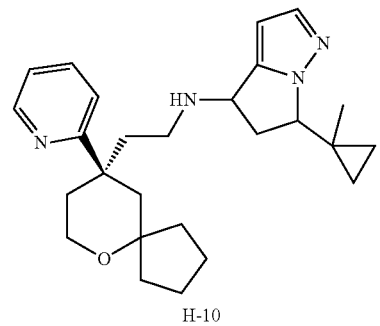

At step 1: 1-methylcyclopropanecarboxylic acid (10 mg, 0.10 mol) and N,O-dimethylhydroxylamine hydrochloride (14.6 g, 0.15 mol) were added to DMF (80 mL), HATU (45.6 g, 0.12 mol) and DIEA (50 mL, 0.30 mol) were added in sequence, and the reaction solution reacted at the room temperature overnight. EA (500 mL) was added. An obtained organic phase was washed with 1 N hydrochloric acid (100 mL×2) and a saturated sodium chloride solution (50 mL×2), dried with anhydrous sodium sulfate, and filtered, an obtained filtrate was concentrated under reduced pressure, and an obtained residue was purified by silica gel column chromatography using an eluent system (PE/EA=1/0-1/1) to obtain a compound 10-1 (11.3 g, a pale yellow oily substance) with a yield of 79%. MS m/z (ESI):144.1 [M+1].

At step 2: the compound 10-1 (14.5 g, 101 mmol) was dissolved in diethyl ether (90 mL), and after the mixture was cooled to −78° C., 1 M diisobutylaluminium hydride (152 mL, 152 mmol) was slowly added dropwise. The reaction solution reacted at −78° C. for 2 h, 1 M HCl (16 mL) was added to quench the reaction, and after the mixture was heated to 0° C., 1 M HCl (16 mL) was added. The mixture was dried with anhydrous sodium sulfate (70 g) and filtered to obtain a compound 10-2.

At step 3: lithium chloride (6.5 g, 153 mmol) was added to acetonitrile (60 mL), triethyl phosphonoacetate (24.5 mL, 122 mmol) and DBU (18.1 mL, 121 mmol) were added in sequence, after the reaction solution was cooled to 0° C., the compound 10-2 (8.5 g, 101 mmol) was added dropwise, and the reaction solution reacted at the room temperature overnight. Water (150 mL) was added, the mixture was extracted with EA (150 mL×3), obtained organic phases were combined, a combined organic phase was dried with anhydrous sodium sulfate and filtered, an obtained filtrate was concentrated under reduced pressure, and an obtained residue was purified by silica gel column chromatography using eluents (PE/EA=1/0 to 10/1) to obtain a compound 10-3 (10.5 g, a colorless oily liquid) with a yield of 68%. MS m/z (ESI): 155.0 [M+1].

At step 4: the compound 10-3 (10.5 g, 0.068 mol), pyrazole (9.3 g, 0.137 mol), and potassium carbonate (18.8 g, 0.136 mol) were added to DMF (50 mL), and the reaction solution reacted at 65° C. for 45 h. After the reaction solution was cooled to the room temperature, EA (300 mL) was added, followed by washing with water (100 mL) and a saturated sodium chloride solution (100 mL×2). An obtained organic phase was dried with anhydrous sodium sulfate and filtered, an obtained filtrate was concentrated under reduced pressure, and an obtained residue was purified by silica gel column chromatography using eluents (PE/EA=1/0 to 5/1) to obtain a compound 10-4 (12.3 g, a colorless oily liquid) with a yield of 82%. MS m/z (ESI): 223.1 [M+1].

At step 5: the compound 10-4 (12.3 g, 55.3 mmol) was dissolved in a mixture of THF (50 mL) and methanol (20 mL), lithium hydroxide monohydrate (3.6 g, 85.7 mmol) and water (30 mL) were added, and the reaction solution was stirred at the room temperature for 2 h. A 6 M hydrochloric acid solution was added to adjust a pH value of the reaction solution to 3, the organic solvent was removed by spinning under reduced pressure, an obtained aqueous phase was extracted with DCM (100 mL×3), obtained organic phases were combined, a combined phase was dried with anhydrous sodium sulfate and filtered, an obtained filtrate was concentrated under reduced pressure, and an obtained residue was purified by preparative liquid chromatography to obtain a compound 10-5 (9.2 g, a colorless oily liquid) with a yield of 86%. MS m/z (ESI): 195.0 [M+1].

At step 6: the compound 10-5 (3.05 g, 15.7 mmol) was dissolved in THF (80 mL), after the mixture was cooled to −78° C., 2.5 M n-butyllithium (15.7 mL, 39.3 mmol) was slowly added dropwise, and the reaction solution reacted at −78° C. for 0.5 h and reacted at −45° C. for 1 h. A saturated ammonium chloride solution (30 mL) was added to quench the reaction, the mixture was extracted with EA (50 mL×4), obtained organic phases were combined, a combined organic phase was dried with anhydrous sodium sulfate and filtered, an obtained filtrate was concentrated under reduced pressure, and an obtained residue was purified by silica gel column chromatography using eluents (PE/EA=1/0 to 3/1) to obtain a compound 10-6 (460 mg, a colorless oily liquid) with a yield of 16.7%. MS m/z (ESI): 177.0 [M+1].

At step 7: the compound 10-6 (58 mg, 0.33 mmol), the compound 1a (86 mg, 0.33 mmol), and titanium isopropoxide (1 mL) were dissolved in DCE (10 mL), and the reaction solution reacted at 50° C. overnight. Sodium borohydride (80 mg, 2.1 mmol) was added, and the reaction solution reacted at 60° C. for 2 h. Water (1 mL) was added to quench the reaction, the mixture was stirred at the room temperature for 30 min and filtered, and an obtained filtrate was concentrated under reduced pressure. An obtained residue was purified by preparative liquid chromatography (preparative column: 21.2×250 mm C18 column; system: 10 mM $NH_4HCO_3H_2O$; wavelengths: 254/214 nm; gradients: 30%-60% changes in acetonitrile) to obtain a compound H-10 (51.14 mg, a colorless oily liquid) with a yield of 37%. MS m/z (ESI): 421.1 [M+1]; $^1$H NMR (400 MHz, $CD_3OD$) δ 8.55-8.47 (m, 1H), 7.80-7.71 (m, 1H), 7.51 (d, J=8.1 Hz, 1H), 7.45-7.38 (m, 1H), 7.27-7.19 (m, 1H), 5.86 (dd, J=21.6, 1.9 Hz, 1H), 4.02 (t, J=7.7 Hz, 1H), 3.80-3.73 (m, 2H), 3.49 (t, J=7.1 Hz, 1H), 2.81-2.72 (m, 1H), 2.68-2.49 (m, 2H), 2.41 (dd, J=13.9, 2.0 Hz, 1H), 2.17-1.96 (m, 3H), 1.91 (d, J=13.9 Hz, 1H), 1.78-1.36 (m, 8H), 1.12-1.07 (m, 1H), 0.83 (d, J=5.3 Hz, 3H), 0.77-0.66 (m, 2H), 0.60-0.54 (m, 1H), 0.50-0.43 (m, 1H), 0.37-0.29 (m, 1H).

Example 11

6-(isopropyl)-N-(2-((R)-9-(pyridin-2-yl)-6-oxaspiro [4.5]decan-9-yl)ethyl)-5,6-dihydro-4H-pyrrolo[1,2-b]pyrazol-4-amine (H-11)

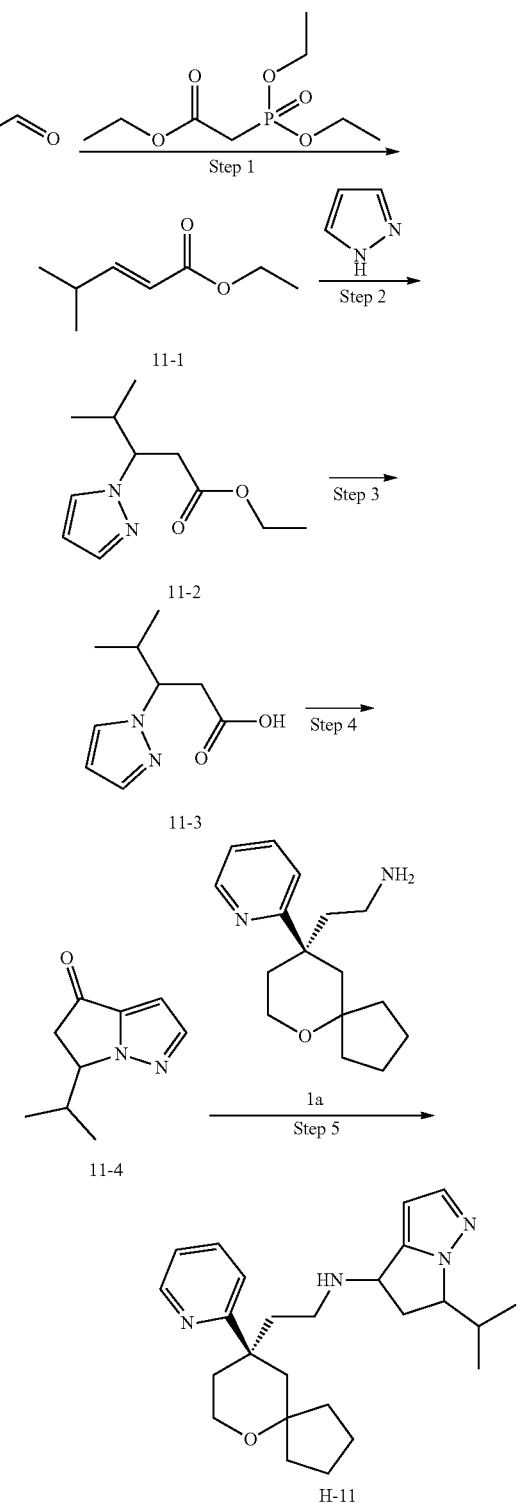

At step 1: triethyl phosphonoacetate (476 mL, 2.4 mol), DBU (365 g, 2.4 mol), lithium chloride (127 g, 3 mol), and acetonitrile (1.2 L) were added into a single-neck flask (3 L), and the mixture was stirred at the room temperature for 20 min under the protection of argon gas. After the reaction solution was cooled to 0° C. (inner temperature), isobutyraldehyde (144 g, 2 mol) was slowly added dropwise. The reaction solution was stirred at the room temperature for 12 h. After the reaction process monitored by LCMS was completed, the reaction solution was filtered, and an obtained filter cake was washed with EA (100 mL×2). Water (1 L) was added, the mixture was extracted with EA (1.5 L×2), and a combined organic phase was washed with saturated sodium chloride, dried with anhydrous sodium sulfate, and dried by spinning to obtain a compound 11-1 (175 g, a colorless liquid).

At step 2: DMF (1 L) was added to a single-neck flask (3 L) in which the compound 11-1 (300 g, 2.1 mol) was placed, potassium carbonate (579 g, 4.2 mol) and pyrazole (287 g, 4.2 mol) were added while stirring, the reaction solution was stirred at 65° C. for 18 h, after the reaction process monitored by LCMS was completed, the reaction solution was directly dried by spinning, and an obtained solid residue was dissolved in acetonitrile (150 mL) to obtain a slurry, and the slurry was filtered to obtain a white solid. The white solid was filtered, and an obtained filter cake was washed with EA (500 mL×2), followed by washing with a saturated saline solution (300 mL×3), drying with anhydrous sodium sulfate, drying by spinning, and purification by column chromatography (the mobile phase was PE containing 5% EA) to obtain a compound 11-2 (258 g, a colorless liquid) with a yield of 58%. MS m/z (ESI):211.1 [M+1].

At step 3: potassium hydroxide (133 g, 3.32 mol) was dissolved in water (200 mL), and an obtained aqueous solution of potassium hydroxide was pre-cooled to 5° C. The compound 11-2 (465 g, 2.21 mol), methanol (0.5 L), and THF (0.5 L) were placed into a flask (3 L), the pre-cooled aqueous solution of potassium hydroxide was added, the reaction solution was stirred for 2 h, concentrated hydrochloric acid was added to adjust a pH value of the reaction solution to about 3, the mixture was extracted with DCM (800 mL×2), all obtained organic phases were combined, and a combined organic phase was washed with a saturated saline solution, dried, and concentrated to obtain a compound 11-3 (410.5 g, a white solid) with a yield of 100%. MS m/z (ESI):183.1 [M+1].

At step 4: the compound 11-3 (10.2 g, 0.055 mol) and THF (200 mL) were placed into a three-neck flask (500 mL) under the protection of nitrogen gas, and the mixture was cooled to −75° C. A THF solution of 2.5 M n-butyllithium (55 mL, 0.137 mol) was slowly added dropwise, and the dropwise addition was completed, the reaction solution was slowly heated to −10° C. and stirred for 3 h. Saturated ammonium chloride was added to quench the reaction, water (100 mL) was added, the mixture was extracted with EA (400 mL×2), obtained organic phases were combined, and a combined organic phase was washed with a saturated saline solution, dried, and concentrated to obtain a brown liquid. The brown liquid was purified by column chromatography (the mobile phase was PE containing 30% EA) to obtain a compound 11-4 (4 g, a white solid) with a yield of 22.2%. MS m/z (ESI):165.1 [M+1].

At step 5: the compound 11-4 (50 mg, 0.3 mmol) was dissolved in DCE (5 mL), the compound 1a (79 mg, 0.3 mmol) and titanium isopropoxide (0.5 mL) were added, and reaction solution was stirred at 45° C. for 16 h. Sodium borohydride (39 mg, 1 mmol) was added. The reaction solution was stirred at 45° C. for 3 h. Water (20 mL) was added, the mixture was filtered, and an obtained filtrate was extracted with DCM (20 mL×2), followed by drying with anhydrous sodium sulfate and concentration under reduced pressure. An obtained concentrate was purified by preparative chromatography (preparative column: 21.2×250 mm C18 column; system: 10 mM NH$_4$HCO$_3$H$_2$O; wavelengths: 254/214 nm; gradients: 30%-60% changes in acetonitrile) to obtain a compound H-11 (2.9 mg, a white solid) with a yield of 2.37%. MS m/z (ESI): 409.2 [M+1]; $^1$H NMR (400 MHz, DMSO-d6) δ 8.54 (d, 1H), 7.73 (t, 1H), 7.47 (d, 1H), 7.34-7.32 (m, 1H), 7.22-7.18 (m, 1H), 5.71 (d, 1H), 4.00-3.88 (m, 2H), 3.61-3.55 (m, 2H), 2.62-2.53 (m, 1H), 2.48-2.43 (m, 3H), 2.39-2.30 (m, 2H), 2.05-1.64 (m, 7H), 1.63-1.32 (m, 6H), 0.95 (d, 3H), 0.73 (d, 3H), 0.64-0.51 (m, 1H).

Example 12

6-methyl-N-(2-((R)-9-(pyridin-2-yl)-6-oxaspiro[4.5]decan-9-yl)ethyl)-5,6-dihydro-4H-pyrrolo[1,2-b]pyrazol-4-amine (a mixture of diastereomers H-12-1 and a mixture of diastereomers H-12-2)

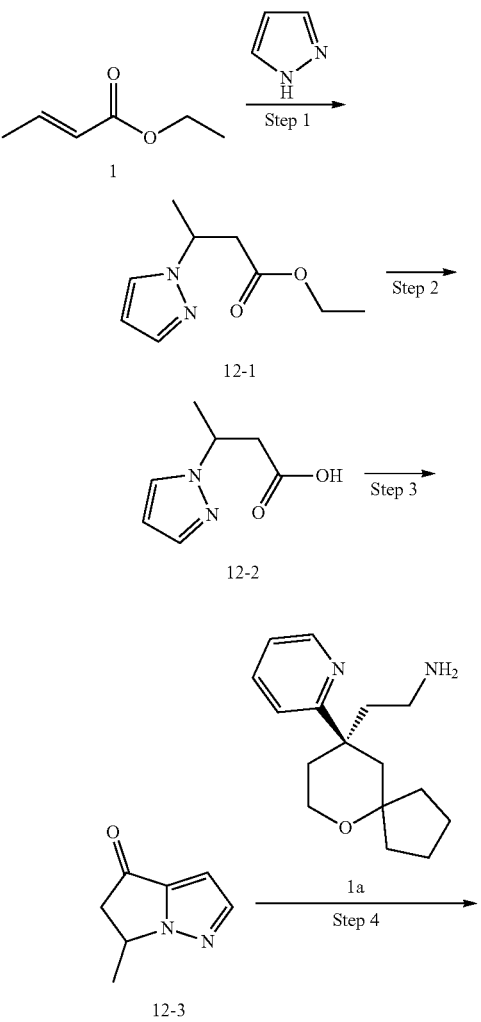

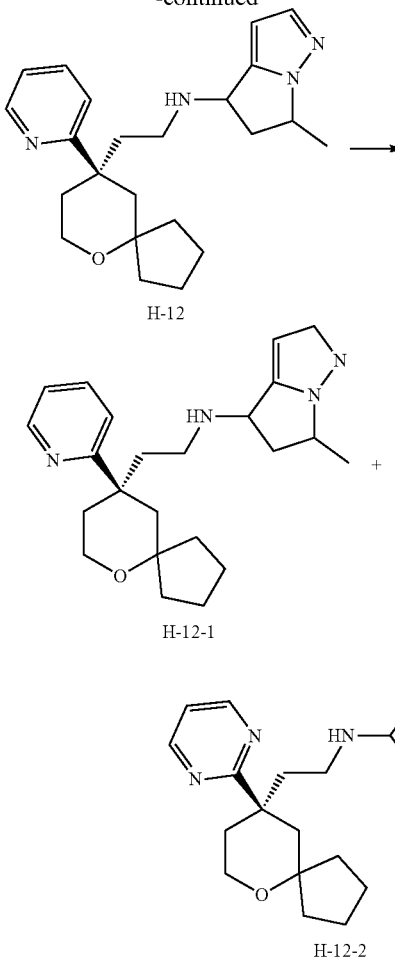

H-12

H-12-1

H-12-2

At step 1: DMF (30 mL) was placed into a single-neck flask (100 mL) in which ethyl (E)-but-2-enoate (3.5 g, 30 mmol) was placed, potassium carbonate (4.14 g, 32 mmol) and pyrazole (2.73 g, 32 mmol) were added while stirring, and the reaction solution was stirred at 50° C. for 20 h until the reaction process monitored by LCMS was completed. The reaction solution was filtered, and an obtained filter cake was washed with EA (50 mL×2), followed by washing with a saturated saline solution (30 mL×3), drying with anhydrous sodium sulfate, drying by spinning. and purification by column chromatography (the mobile phase was PE containing 5% EA), to obtain a compound 12-1 (3.5 g, a yellow liquid) with a yield of 64%. MS m/z (ESI):183.1 [M+1].

At step 2: sodium hydroxide (0.8 g, 20 mmol) was dissolved in water (5 mL), and an obtained aqueous solution of sodium hydroxide was pre-cooled to 5° C. The compound 12-1 (1.82 g, 10 mol), methanol (10 mL), and THF (10 mL) were placed into a flask (100 mL), the pre-cooled aqueous solution of sodium hydroxide was added, the reaction solution was stirred for 2 h, concentrated hydrochloric acid was added to adjust a pH value of the reaction solution to about 4, the mixture was extracted with DCM (100 mL×2), all obtained organic phases were combined, and a combined organic phase was washed with a saturated saline solution, dried, and concentrated to obtain a compound 12-2 (1.2 g, a yellow solid) with a yield of 78%. MS m/z (ESI):155.1 [M+1].

At step 3: the compound 12-2 (0.8 g, 5.19 mmol) and THF (10 mL) were placed into a three-neck flask (100 mL) under the protection of nitrogen gas, and the mixture was cooled to −75° C. A THF solution of 2.5 M n-butyllithium (5.2 mL, 12.9 mmol, 2.5 mol/L) was slowly added dropwise, and after the dropwise addition was completed, the reaction solution was stirred at −75° C. for 3 h. Saturated ammonium chloride was added to quench the reaction, water (40 mL) was added, the mixture was extracted with EA (100 mL×2), obtained organic phases were combined, and a combined organic phase was washed with a saturated saline solution, dried, and concentrated, to obtain a brown liquid. The brown liquid was purified by column chromatography (the mobile phase was PE containing 30% EA) to obtain a compound 12-3 (45 mg, a colorless liquid) with a yield of 6.4%. MS m/z (ESI):137.1 [M+1].

At step 4: the compound 12-3 (26 mg, 0.2 mmol) was dissolved in DCE (5 mL), the compound 1a (52 mg, 0.2 mmol) and titanium isopropoxide (0.5 mL) were added, and the reaction solution was stirred at 45° C. for 6 h. Sodium borohydride (38 mg, 1 mmol) was added, the reaction solution was stirred at 45° C. for 3 h. Water (20 mL) was added, the mixture was filtered, and an obtained filtrate was extracted with DCM (40 mL×2), followed by drying with anhydrous sodium sulfate and concentration under reduced pressure to obtain a crude product H-12.

At step 5: the obtained concentrate, i.e. the crude product H-12, was purified by preparative chromatography (preparative column: 21.2×250 mm C18 column; system: 10 mM NH$_4$HCO$_3$H$_2$O; wavelengths: 254/214 nm; gradients: 30%-60% changes in acetonitrile) to obtain a mixture of diastereomers H-12-1 (2.04 mg, a white solid) with a yield of 2.68%: MS m/z (ESI): 381.3 [M+1]; $^1$H NMR (400 MHz, CD$_3$OD) δ 8.56 (dd, J=3.9, 0.9 Hz, 1H), 8.44 (brs, 1H), 7.85-7.75 (m, 1H), 7.58-7.45 (m, 2H), 7.32-7.24 (m, 1H), 5.99 (dd, J=45.9, 1.7 Hz, 1H), 4.67-4.58 (m, 1H), 4.42 (t, J=7.4 Hz, 1H), 4.30 (dq, J=13.4, 6.7 Hz, 1H), 3.82-3.70 (m, 2H), 3.18-3.06 (m, 1H), 2.98-2.81 (m, 1H), 2.50 (dd, J=24.4, 13.6 Hz, 2H), 2.42-2.35 (m, 1H), 2.08 (ddd, J=25.9, 12.6, 4.4 Hz, 1H), 1.99-1.87 (m, 2H), 1.86-1.66 (m, 3H), 1.66-1.29 (m, 7H), 1.15-1.02 (m, 1H), 0.79-0.62 (m, 1H), and a mixture of diastereomers H-12-2 (0.83 mg, a white solid) with a yield of 1.09%: $^1$H NMR (400 MHz, CD$_3$OD) δ 8.59-8.54 (m, 1H), 8.36 (brs, 1H), 7.85-7.75 (m, 1H), 7.57-7.44 (m, 2H), 7.31-7.23 (m, 1H), 5.98 (dd, J=45.0, 1.4 Hz, 1H), 4.67-4.58 (m, 2H), 4.45-4.36 (m, 1H), 4.30 (dd, J=13.6, 6.8 Hz, 1H), 3.82-3.67 (m, 2H), 3.19-3.08 (m, 1H), 2.96-2.84 (m, 1H), 2.50 (dd, J=24.4, 13.5 Hz, 2H), 2.43-2.28 (m, 1H), 2.08 (ddd, J=17.2, 12.9, 4.8 Hz, 1H), 2.00-1.87 (m, 2H), 1.86-1.27 (m, 9H), 1.12-1.05 (m, 1H), 0.77-0.65 (m, 1H).

Example 13

6-(1-methylcyclopropyl)-N-(2-((R)-9-(4-fluorophenyl)-6-oxaspiro[4.5]decan-9-yl)ethyl)-6-isopropyl-5, 6-dihydro-4H-pyrrolo[1,2-b]pyrazol-4-amine (H-13)

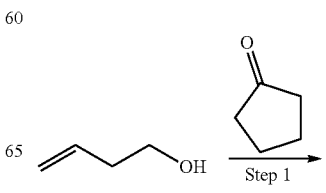

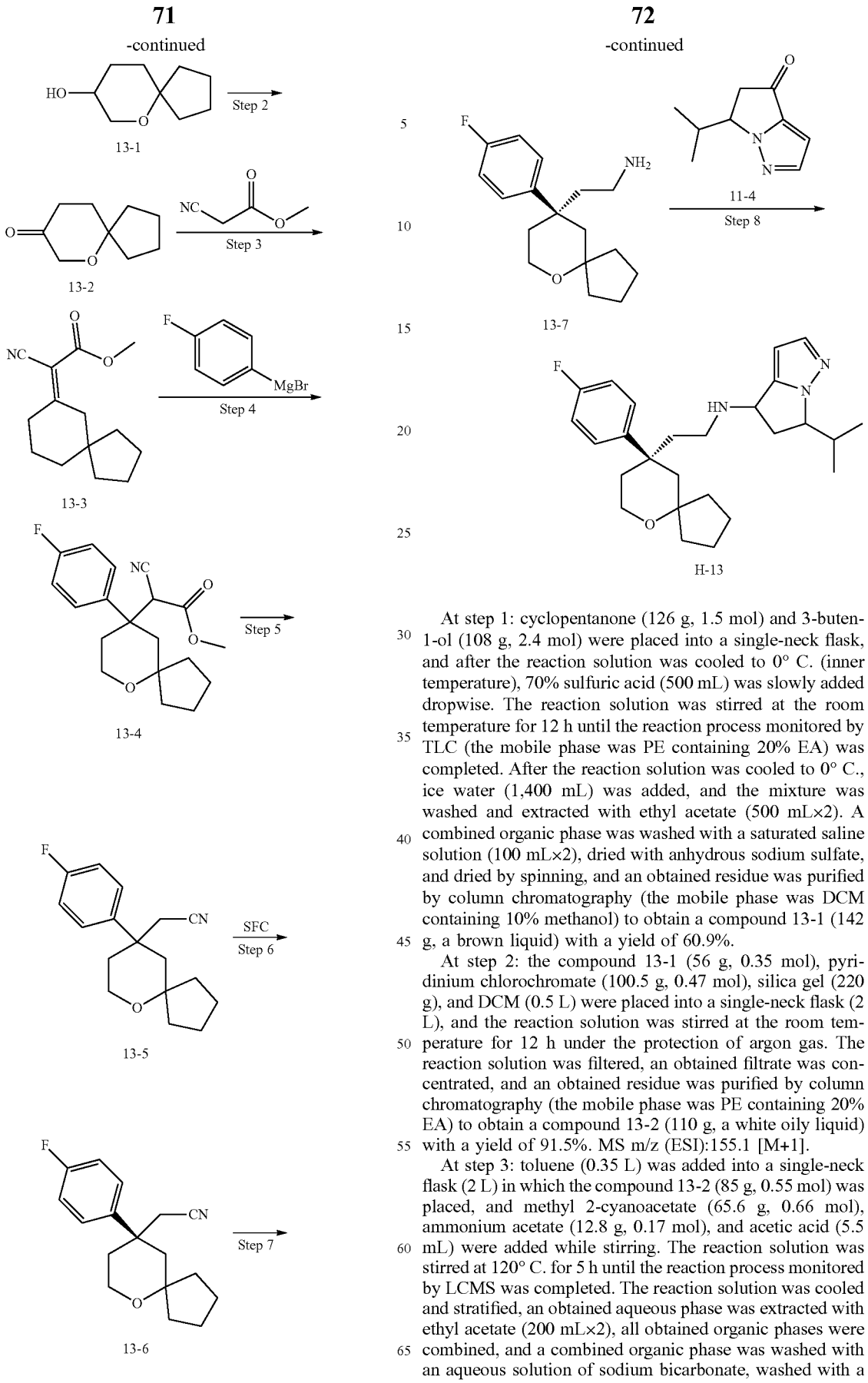

At step 1: cyclopentanone (126 g, 1.5 mol) and 3-buten-1-ol (108 g, 2.4 mol) were placed into a single-neck flask, and after the reaction solution was cooled to 0° C. (inner temperature), 70% sulfuric acid (500 mL) was slowly added dropwise. The reaction solution was stirred at the room temperature for 12 h until the reaction process monitored by TLC (the mobile phase was PE containing 20% EA) was completed. After the reaction solution was cooled to 0° C., ice water (1,400 mL) was added, and the mixture was washed and extracted with ethyl acetate (500 mL×2). A combined organic phase was washed with a saturated saline solution (100 mL×2), dried with anhydrous sodium sulfate, and dried by spinning, and an obtained residue was purified by column chromatography (the mobile phase was DCM containing 10% methanol) to obtain a compound 13-1 (142 g, a brown liquid) with a yield of 60.9%.

At step 2: the compound 13-1 (56 g, 0.35 mol), pyridinium chlorochromate (100.5 g, 0.47 mol), silica gel (220 g), and DCM (0.5 L) were placed into a single-neck flask (2 L), and the reaction solution was stirred at the room temperature for 12 h under the protection of argon gas. The reaction solution was filtered, an obtained filtrate was concentrated, and an obtained residue was purified by column chromatography (the mobile phase was PE containing 20% EA) to obtain a compound 13-2 (110 g, a white oily liquid) with a yield of 91.5%. MS m/z (ESI):155.1 [M+1].

At step 3: toluene (0.35 L) was added into a single-neck flask (2 L) in which the compound 13-2 (85 g, 0.55 mol) was placed, and methyl 2-cyanoacetate (65.6 g, 0.66 mol), ammonium acetate (12.8 g, 0.17 mol), and acetic acid (5.5 mL) were added while stirring. The reaction solution was stirred at 120° C. for 5 h until the reaction process monitored by LCMS was completed. The reaction solution was cooled and stratified, an obtained aqueous phase was extracted with ethyl acetate (200 mL×2), all obtained organic phases were combined, and a combined organic phase was washed with an aqueous solution of sodium bicarbonate, washed with a saturated saline solution, dried, and concentrated to obtain a compound 13-3 (106 g, a yellow liquid) with a yield of 81.7%. MS m/z (ESI):236.1 [M+1].

At step 4: THF (200 mL), 4-fluorophenylmagnesium bromide (72 mL, 0.14 mol, 2 mol/L), and cuprous iodide (2.3 g, 0.012 mol) were placed into a three-neck flask (500 mL) at 0° C. under the protection of nitrogen gas, and the reaction solution was stirred for 0.5 h. A THF (50 mL) solution of the compound 13-3 (28.2 g, 0.12 mol) was slowly added dropwise, and after the dropwise addition was completed, the reaction solution was slowly heated to the room temperature and stirred for 12 h. Ice water (500 mL) was added, the mixture was extracted with EA (600 mL×2), obtained organic phases were combined, and a combined organic phase with washed with a saturated saline solution, dried, and concentrated to obtain a brown liquid. The brown liquid was purified by column chromatography (the mobile phase was PE containing 10% EA) to obtain a compound 13-4 (27 g, a yellow solid) with a yield of 68%. MS m/z (ESI):332.1 [M+1].

At step 5: the compound 13-4 (12 g, 0.036 mol), potassium hydroxide (4.1 g, 0.072 mol), and ethylene glycol (84 mL) was placed into a three-neck flask (500 mL), and the reaction solution was stirred at 120° C. for 5 h. Ice water (300 mL) was added, the mixture was extracted with EA (500 mL×2), obtained organic phases were combined, and a combined organic phase was washed with a saturated saline solution, dried, and concentrated, to obtain a brown liquid. The brown liquid was purified by column chromatography (the mobile phase was PE containing 20% EA) to obtain a compound 13-5 (19.4 g, a colorless liquid) with a yield of 82.6%.

At step 6: chiral separation was performed on the compound 13-5 by supercritical fluid chromatography (SFC) to obtain (R)-2-(9-(4-fluorophenyl)-6-oxaspiro[4.5]decan-9-yl)acetonitrile (a compound 13-6, 8.51 g, a colorless liquid) with a yield of 41%. MS m/z (ESI):274.1 [M+1].

At step 7: the compound 13-6 (1 g, 3.6 mmol), ethanol (6 mL), ammonia water (0.6 mL), and Raney nickel (0.1 g) serving as a catalyst were placed into a single-neck flask (100 mL), and the reaction solution was stirred for 16 h under the protection of hydrogen gas. The reaction solution was filtered, and an obtained filtrate was concentrated to obtain a compound 13-7 (0.83 g, a yellow liquid) with a yield of 82%. MS m/z (ESI):278.2 [M+1].

At step 8: the compound 11-4 (100 mg, 0.6 mmol) was dissolved in DCE (10 mL), the compound 13-7 (169 mg, 0.6 mmol) and titanium isopropoxide (1 mL) were added, and the reaction solution was stirred at 65° C. for 12 h. Sodium borohydride (114 mg, 3 mmol) was added. The reaction solution was stirred at 65° C. for 6 h. Water (20 mL) was added, the mixture was filtered, and an obtained filtrate was extracted with DCM (30 mL×2), followed by drying with anhydrous sodium sulfate and concentration under reduced pressure. An obtained concentrate was purified by preparative chromatography (preparative column: 21.2×250 mm C18 column; system: 10 mM NH$_4$HCO$_3$H$_2$O; wavelengths: 254/214 nm; gradients: 30%-60% changes in acetonitrile) to obtain a compound H-13 (30.01 mg, a colorless liquid) with a yield of 11.8%. MS m/z (ESI):426.1 [M+1]; $^1$H NMR (400 MHz, CD$_3$OD) δ 7.39 (dd, J=8.9, 5.3 Hz, 3H), 7.09-6.99 (m, 2H), 5.85 (dd, J=21.3, 1.5 Hz, 1H), 4.15-3.99 (m, 2H), 3.82-3.67 (m, 2H), 2.71-2.64 (m, 1H), 2.60-2.48 (m, 1H), 2.42-3.35 (m, 1H), 2.31 (d, J=14.0 Hz, 1H), 2.15 (qd, J=11.4, 4.9 Hz, 2H), 1.98-1.82 (m, 3H), 1.81-1.67 (m, 3H), 1.66- 1.40 (m, 5H), 1.28-1.20 (m, 1H), 0.97 (t, J=12.9 Hz, 3H), 0.93-0.84 (m, 1H), 0.79-0.65 (m, 3H).

Example 14

6-propyl-N-(2-((R)-9-(pyridin-2-yl)-6-oxaspiro[4.5] decan-9-yl)ethyl)-5,6-dihydro-4H-pyrrolo[1,2-b] pyrazol-4-amine (H-14)

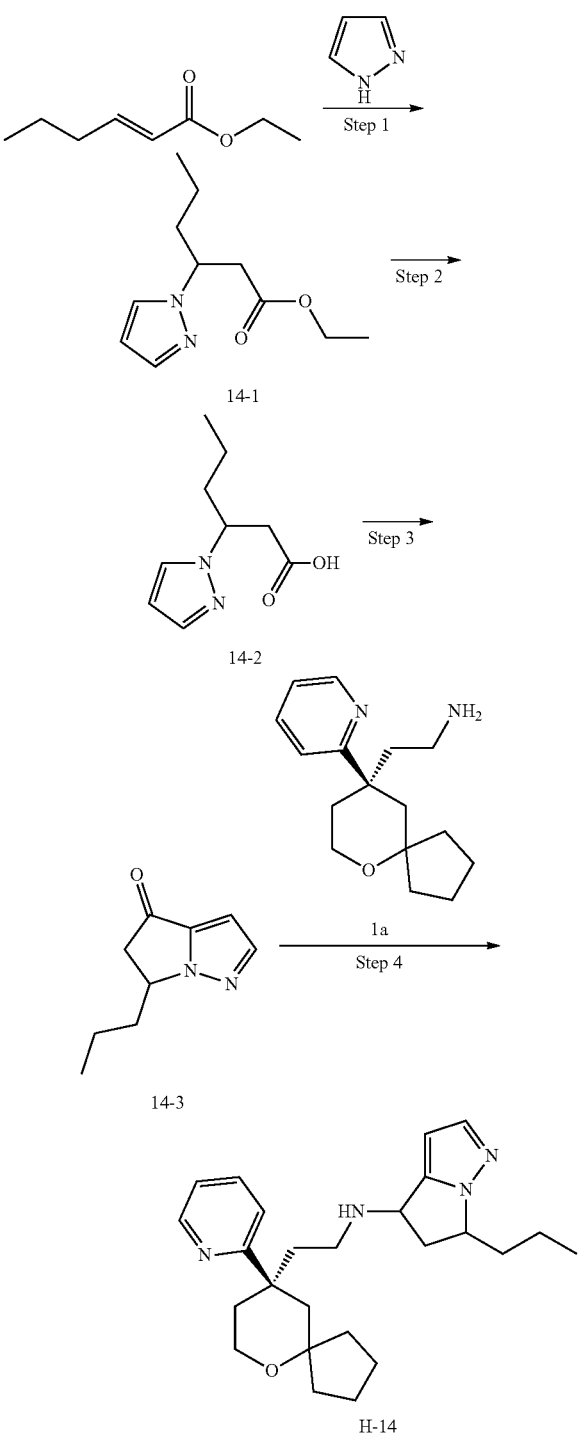

At step 1: DMF (30 mL) was placed into a single-neck flask (100 mL) in which ethyl (E)-hex-2-enoate (6 g, 42 mmol) was placed, potassium carbonate (8.7 g, 63 mmol) and pyrazole (4.3 g, 63 mmol) were added while stirring, and the reaction solution was stirred at 60° C. for 36 h until the reaction process monitored by LCMS was completed. The reaction solution was filtered, and an obtained filter cake was washed with EA (50 mL×2), followed by washing with a saturated saline solution (30 mL×3), drying with anhydrous sodium sulfate, drying by spinning, and purification by column chromatography (the mobile phase was PE containing 5% EA) to obtain a compound 14-1 (5.5 g, a yellow liquid) with a yield of 62.3%. MS m/z (ESI):211.1 [M+1].

At step 2: sodium hydroxide (1.52 g, 38 mmol) was dissolved in water (10 mL), and an obtained aqueous solution of sodium hydroxide was pre-cooled to 5° C. The compound 14-1 (4 g, 19 mol), methanol (20 mL), and THF (20 mL) were placed into a flask (100 mL), the pre-cooled aqueous solution of sodium hydroxide was added, the reaction solution was stirred for 2 h, concentrated hydrochloric acid was added to adjust a pH value of the reaction solution to about 4, the mixture was extracted with DCM (100 mL×2), all obtained organic phases were combined, and a combined organic phase was washed with a saturated saline solution, dried, and concentrated to obtain a compound 14-2 (3 g, a white solid) with a yield of 86.7%. MS m/z (ESI): 183.1 [M+1].

At step 3: the compound 14-2 (1.82 g, 10 mmol) and THF (40 mL) were placed into a three-neck flask (100 mL) under the protection of nitrogen gas, and the mixture was cooled to −75° C. A THF solution of 2.5 M n-butyllithium (10 mL, 25 mmol, 2.5 mol/L) was slowly added dropwise, and after the dropwise addition was completed, the reaction solution was stirred at −75° C. for 3 h. Saturated ammonium chloride was added to quench the reaction, water (40 mL) was added, the mixture was extracted with EA (100 mL×2), obtained organic phases were combined, and a combined organic phase was washed with a saturated saline solution, dried, and concentrated to obtain a brown liquid. The brown liquid was purified by column chromatography (the mobile phase was PE containing 30% EA) to obtain a compound 14-3 (100 mg, a yellow liquid) with a yield of 6%. MS m/z (ESI):165.1 [M+1].

At step 4: the compound 14-3 (42 mg, 0.25 mmol) was dissolved in DCE (10 mL), the compound 1a (65 mg, 0.25 mmol) and titanium isopropoxide (0.8 mL) were added, and the reaction solution was stirred at 58° C. for 12 h. Sodium borohydride (47.3 mg, 1.25 mmol) was added, the reaction solution was stirred at 45° C. for 3 h. Water (20 mL) was added, the mixture was filtered, and an obtain filtrate was extracted with DCM (40 mL×2), followed by drying with anhydrous sodium sulfate and concentration under reduced pressure. An obtained concentrate was purified by preparative chromatography (preparative column: 21.2×250 mm C18 column; system: 10 mM $NH_4HCO_3H_2O$; wavelengths: 254/214 nm; gradients: 30%-60% changes in acetonitrile) to obtain a compound H-14 (15.05 mg, a white liquid) with a yield of 14.7%. MS m/z (ESI): 409.2 [M+1]; $^1$H NMR (400 MHz, $CD_3OD$) δ 8.55-8.49 (m, 1H), 7.81-7.73 (m, 1H), 7.54-7.48 (m, 1H), 7.39 (dd, J=5.8, 1.8 Hz, 1H), 7.27-7.20 (m, 1H), 5.83 (ddd, J=4.6, 1.9, 0.6 Hz, 1H), 4.16-4.00 (m, 2H), 3.80-3.72 (m, 2H), 2.95-2.78 (m, 1H), 2.67-2.48 (m, 2H), 2.47-2.37 (m, 1H), 2.16-1.97 (m, 3H), 1.89 (dd, J=13.2, 5.9 Hz, 1H), 1.85-1.64 (m, 4H), 1.64-1.30 (m, 8H), 1.13-1.04 (m, 1H), 0.99-0.88 (m, 3H), 0.79-0.71 (m, 1H).

Example 15

6-(sec-butyl)-N-(2-((R)-9-(pyridin-2-yl)-6-oxaspiro [4.5]decan-9-yl)ethyl)-5,6-dihydro-4H-pyrrolo[1,2-b]pyrazol-4-amine (H-15)

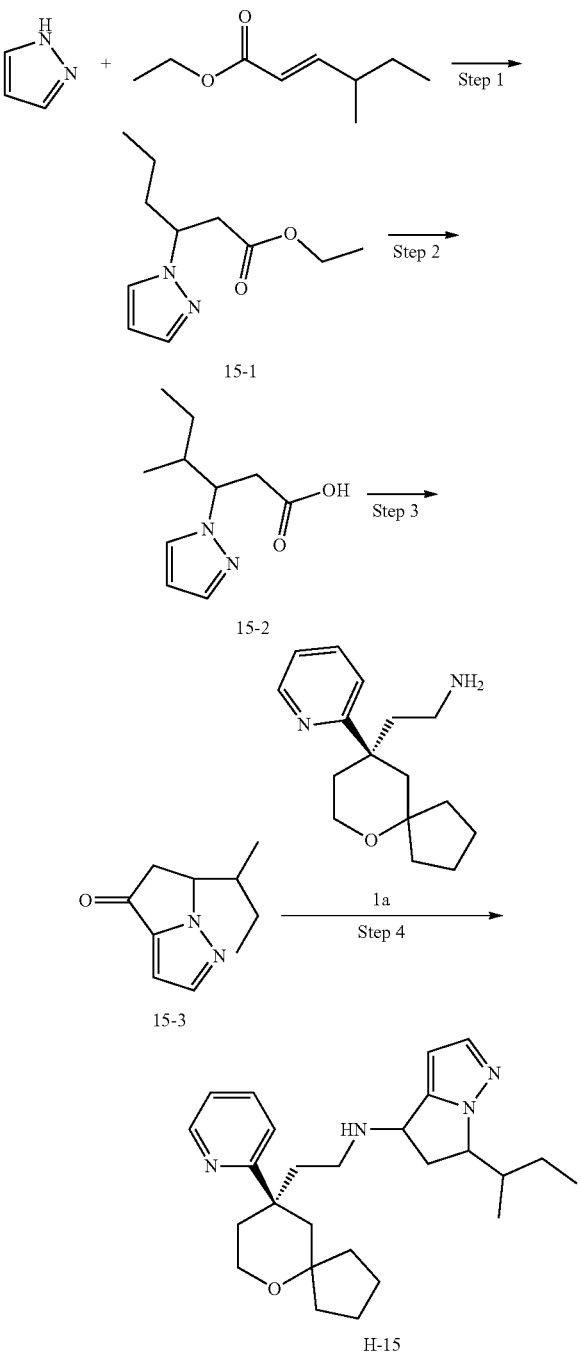

At step 1: pyrazole (2.65 g, 39 mmol) was dissolved in a DMF solution (60 mL), ethyl (E)-4-methylhexagonal-2-enoate (3 g, 19.5 mmol) and potassium carbonate (4.03 g, 29 mmol) were added, and the reaction solution was stirred at 60° C. overnight. EA (100 mL) was added, followed by washing with a saturated sodium bicarbonate solution, drying with anhydrous sodium sulfate, and concentration under reduced pressure. An obtained residue was purified by thin layer chromatography using eluents (PE:EA=1:1) to obtain a compound 15-1 (3 g) with a yield of 68%. MS m/z (ESI): 225.1 [M+1].

At step 2: the compound 15-1 (2.6 g, 11.6 mmol) was dissolved in a mixture of methanol (20 mL) and water (4 mL), lithium hydroxide (0.8 g, 34.8 mmol) was added, and the reaction solution was stirred at the room temperature for 4 h. A 3 N hydrochloric acid solution was added to adjust a pH value of the reaction solution to 2, the mixture was extracted with a mixture of DCM and methanol (10/1), and an obtained organic phase was distilled under reduced pressure to obtain a yellow solid. The yellow solid was purified by preparative liquid chromatography to obtain a compound 15-2 (1.5 g) with a yield of 65%. MS m/z (ESI): 197.1 [M+1].

At step 3: the compound 15-2 (500 mg, 2.55 mmol) was dissolved in a THF solution (20 mL), a 2.5 M n-butyllithium solution (2.3 mL, 5.61 mmol) was added at −78° C., and the reaction solution was stirred at the room temperature for 1 h. An aqueous solution of sodium chloride was added, the mixture was extracted with EA, an obtained organic phase was concentrated under reduced pressure, and an obtained residue was purified by thin layer chromatography using eluents (PE:EA=1:1) to obtain a compound 15-3 (180 mg) with a yield of 40%. MS m/z (ESI): 179.1 [M+1].

At step 4: the compound 1a (116 mg, 0.45 mmol) was dissolved in a DCE solution (5 mL), the compound 15-3 (80 mg, 0.45 mmol) and titanium isopropoxide (1 mL) were added, and the reaction solution was heated to 60° C. to react overnight. After the reaction solution was cooled to the room temperature, sodium borohydride (35 mg, 0.9 mmol) was added, and the reaction solution was stirred at the room temperature for 1 h. Water was added, the mixture was filtered, an obtained filtrate was concentrated under reduced pressure, and an obtained residue was purified by preparative liquid chromatography (preparative column: 21.2×250 mm C18 column; system: 10 mM $NH_4HCO_3H_2O$; wavelengths: 254/214 nm; gradients: 30%-60% changes in acetonitrile) to obtain a compound H-15 (34.96 mg) with a yield of 18%. MS m/z (ESI): 423.1 [M+1]; $^1$H NMR (400 MHz, DMSO-d6): δ 8.51-8.50 (d, J=4 Hz, 1H), 8.14 (s, 1H), 7.72-7.68 (m, 1H), 7.45-7.43 (m, 1H), 7.31-7.30 (m, 1H), 7.19-7.16 (m, 1H), 5.72-5.66 (m, 1H), 4.09-4.02 (m, 1H), 3.93-3.90 (m, 1H), 3.58-3.53 (m, 2H), 2.54-2.47 (m, 1H), 2.47-2.46 (m, 1H), 2.40-2.35 (m, 1H), 2.02-1.95 (m, 2H), 1.88-1.67 (m, 4H), 1.62-1.30 (m, 9H), 1.16-1.08 (m, 1H), 0.97-0.94 (m, 1H), 0.88-0.84 (t, J=8 Hz, 3H), 0.79-0.77 (t, J=4 Hz, 1H), 0.64-0.54 (m, 3H).

Example 16

6-(1-methylcyclobutyl)-N-(2-((R)-9-(pyridin-2-yl)-6-oxaspiro[4.5]decan-9-yl)ethyl)-5,6-dihydro-4H-pyrrolo[1,2-b]pyrazol-4-amine (H-16)

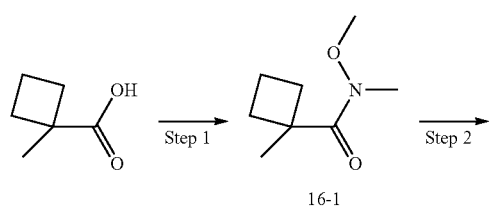

16-1

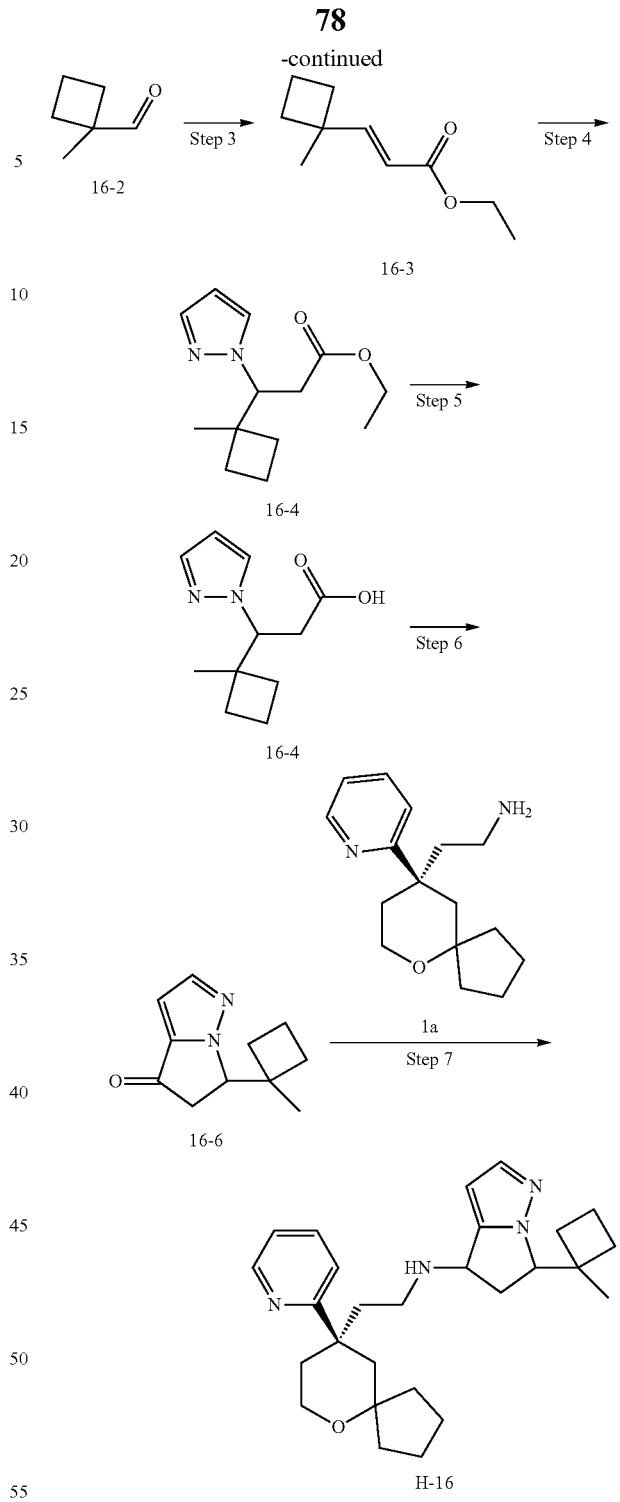

At step 1: 1-methylcyclobutane-1-carboxylic acid (1.8 g, 12.7 mmol) was dissolved in a DMF solution (20 mL), dimethylhydroxylamine hydrochloride (1.47 g, 15.2 mmol), HATU (7.2 g, 19 mmol), and a triethylamine solution (3.85 g, 38.1 mmol) were added, and the reaction solution was stirred at the room temperature overnight. EA (100 mL) was added, followed by washing with a saturated sodium bicarbonate solution, drying with anhydrous sodium sulfate, and concentration under reduced pressure. An obtained residue was purified by thin layer chromatography using eluents (PE:EA=1:1) to obtain a compound 16-1 (2.1 g) with a yield of 100%. MS m/z (ESI): 158.1 [M+1].

At step 2: the compound 16-1 (1.7 g, 10.8 mmol) was dissolved in a THF solution (20 mL), lithium aluminum hydride (0.82 g, 21.6 mmol) was added at 0° C., and the reaction solution was stirred at 0° C. for 1 h. Sodium sulfate decahydrate was added, the mixture was stirred for 30 min and filtered, and an obtained filtrate was concentrated under reduced pressure to obtain a compound 16-2.

At step 3: the compound 16-2 (1.06 g, 10.8 mmol) was dissolved in an acetonitrile solution (20 mL), ethyl diethoxyphosphinylformate (3.63 g, 16.2 mmol), DBU (3.28 g, 21.6 mmol), and lithium chloride (0.91 g, 21.6 mmol) were added, and the reaction solution was stirred at the room temperature overnight. EA (100 mL) was added, followed by washing with a saturated saline solution, drying with anhydrous sodium sulfate, and concentration under reduced pressure. An obtained residue was purified by thin layer chromatography using eluents (PE:EA=2:1) to obtain a compound 16-3 (500 mg) with a yield of 28%. MS m/z (ESI):169.1 [M+1].

At step 4: pyrazole (303 mg, 4.46 mmol) was dissolved in a DMF solution (10 mL), the compound 16-3 (500 mg, 2.98 mmol) and potassium carbonate (822 mg, 5.96 mmol) were added, and the reaction solution was stirred at 60° C. overnight. EA (100 mL) was added, followed by washing with a saturated sodium bicarbonate solution, drying with anhydrous sodium sulfate, and concentration under reduced pressure. An obtained residue was purified by thin layer chromatography using eluents (PE:EA=2:1) to obtain a compound 16-4 (400 mg) with a yield of 57%. MS m/z (ESI): 237.1 [M+1].

At step 5: the compound 16-4 (400 mg, 1.69 mmol) was dissolved in a mixture of methanol (10 mL) and water (2 mL), lithium hydroxide (78 mg, 3.39 mmol) was added, and the reaction solution was stirred at the room temperature for 2 h. A 3 N hydrochloric acid solution was added to adjust a pH value of the reaction solution to 2, the mixture was extracted with a mixture of DCM and methanol (10/1), an obtained organic phase was distilled under reduced pressure, and an obtained residue was purified by preparative liquid chromatography to obtain a compound 16-(330 mg) with a yield of 94%. MS m/z (ESI): 209.1 [M+1].

At step 6: the compound 16-5 (270 g, 1.3 mmol) was dissolved in a THF solution (10 mL), a 2.5 M n-butyllithium solution (1.3 mL, 3.25 mmol) was added at −78° C., and the reaction solution was stirred at the room temperature for 1 h. An aqueous solution of sodium chloride was added, the mixture was extracted with EA, an obtained organic phase was concentrated under reduced pressure, and an obtained residue was purified by thin layer chromatography using eluents (PE:EA=1:1) to obtain a compound 16-6 (100 mg) with a yield of 40%. MS m/z (ESI): 191.1 [M+1].

At step 7: the compound 1a (136 mg, 0.53 mmol) was dissolved in a DCE solution (10 mL), the compound 16-6 (100 mg, 0.53 mmol) and titanium isopropoxide (0.5 mL) were added, and the reaction solution reacted at 60° C. overnight. After the reaction solution was cooled to the room temperature, sodium borohydride (40 mg, 1.06 mmol) was added, and the reaction solution was stirred at the room temperature for 1 h. Water was added, the mixture was filtered, an obtained filtrate was concentrated under reduced pressure, and an obtained residue was purified by preparative liquid chromatography (preparative column: 21.2×250 mm C18 column; system: 10 mM NH$_4$HCO$_3$H$_2$O; wavelengths: 254/214 nm; gradients: 30%-60% changes in acetonitrile) to obtain a compound H-16 (15.4 mg) with a yield of 6.7%. MS m/z (ESI): 435.1 [M+1]; $^1$H NMR (400 MHz, CD$_3$OD): δ 8.50-8.49 (d, J=4 Hz, 1H), 7.69-7.67 (m, 1H), 7.44-7.42 (d, J=8 Hz, 1H), 7.29-7.27 (m, 1H), 7.18-7.15 (m, 1H), 5.71-5.65 (m, 1H), 4.14-4.12 (m, 1H), 3.86-3.83 (m, 1H), 3.62-3.57 (m, 2H), 2.65-2.63 (m, 1H), 2.47-2.45 (m, 2H), 2.30-2.29 (m, 2H), 2.05-2.03 (m, 1H), 1.97-1.89 (m, 2H), 1.84-1.73 (m, 4H), 1.63-1.53 (m, 6H), 1.41-1.30 (m, 5H), 0.92-0.89 (m, 4H).

Example 17

N-(2-((R)-9-(pyridin-2-yl)-6-oxaspiro[4.5]decan-9-yl)ethyl)-6-(1-(trifluoromethyl)cyclopropyl)-5,6-dihydro-4H-pyrrolo[1,2-b]pyrazol-4-amine (H-17)

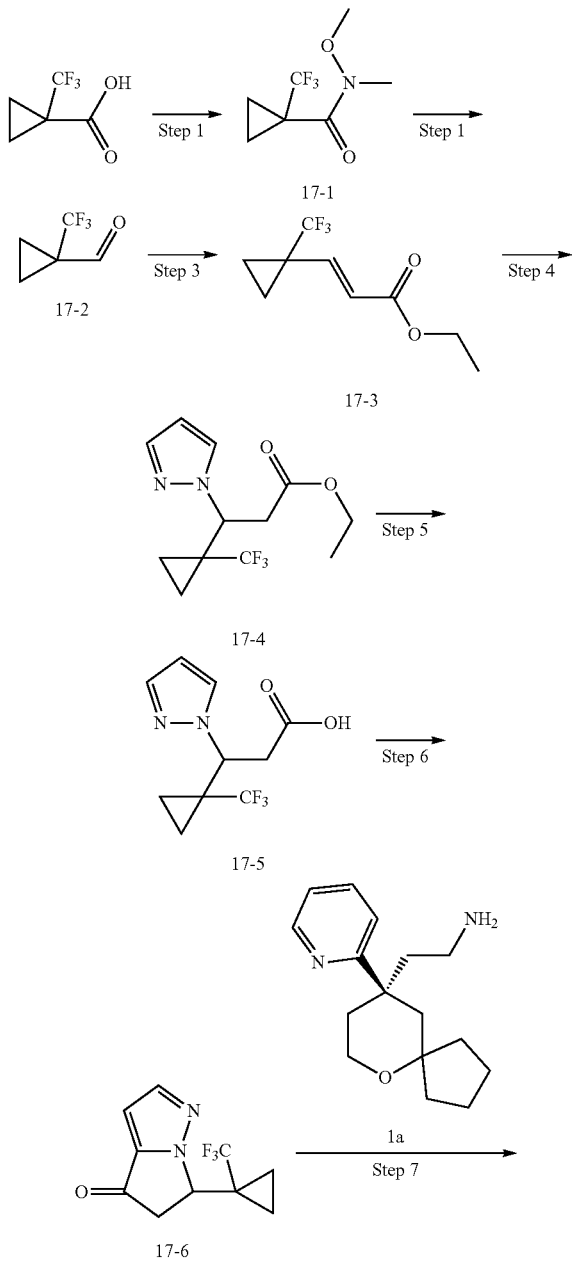

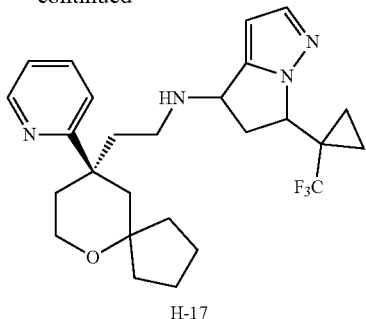

H-17

At step 1: 1-(trifluoromethyl)cyclopropane-1-carboxylic acid (6.8 g, 44 mmol) was dissolved in a DMF solution (100 mL), dimethylhydroxylamine hydrochloride (5.14 g, 53 mmol), HATU (25 g, 66 mmol), and a triethylamine solution (13.3 g, 132 mmol) were added, and the reaction solution was stirred at the room temperature overnight. EA (400 mL) was added, followed by washing with a saturated sodium bicarbonate solution, drying with anhydrous sodium sulfate, and concentration under reduced pressure. An obtained residue was purified by thin layer chromatography using eluents (PE:EA=1:1) to obtain a compound 17-1 (8 g) with a yield of 92%. MS m/z (ESI): 198.1 [M+1].

At step 2: the compound 17-1 (8 g, 4.06 mmol) was dissolved in a THF solution (100 mL), DIBAL-H (1.0 M, 60 mL, 6.1 mmol) was added at −78° C., and the reaction solution was stirred at −78° C. for 1 h. Sodium sulfate decahydrate was added, the mixture was stirred for 30 min and filtered, and an obtained filtrate was concentrated under reduced pressure to obtain a compound 17-2.

At step 3: the compound 17-2 (5.6 g, 40.6 mmol) was dissolved in an acetonitrile solution (100 mL), ethyl diethoxyphosphinylformate (13.64 g, 60.9 mmol), DBU (12.34 g, 81.2 mmol), and lithium chloride (3.4 g, 81.2 mmol) were added, and the reaction solution was stirred at the room temperature overnight. EA (300 mL) was added, followed by washing with a saturated saline solution, drying with anhydrous sodium sulfate, and concentration under reduced pressure. An obtained residue was purified by thin layer chromatography using eluents (PE:EA=2:1) to obtain a compound 17-3 (4 g) with a yield of 47%. MS m/z (ESI): 209.1 [M+1].

At step 4: pyrazole (2.61 g, 38.5 mmol) was dissolved in a DMF solution (100 mL), the compound 17-3 (4 g, 19.2 mmol) and potassium carbonate (7.95 g, 57.6 mmol) were added, and the reaction solution was stirred at 60° C. overnight. EA (300 mL) was added, followed by washing with a saturated sodium bicarbonate solution, drying with anhydrous sodium sulfate, and concentration under reduced pressure. An obtained residue was purified by thin layer chromatography using eluents (PE:EA=1:1) to obtain a compound 17-4 (3.3 g) with a yield of 62%. MS m/z (ESI): 277.1 [M+1].

At step 5: the compound 17-4 (3.3 g, 12 mmol) was dissolved in a mixture of methanol (20 mL) and water (5 mL), lithium hydroxide (0.55 g, 24 mmol) was added, and the reaction solution was stirred at the room temperature for 2 h. A 3 N hydrochloric acid solution was added to adjust a pH value of the reaction solution to 2, the mixture was extracted with a mixture of DCM and methanol (10/1), an obtained organic phase was distilled under reduced pressure, and an obtained residue was purified by preparative liquid chromatography to obtain a compound 17-5 (1.8 g) with a yield of 61%. MS m/z (ESI): 249.1 [M+1].

At step 6: the compound 17-5 (1.8 g, 7.26 mmol) was dissolved in a THF solution (30 mL), a 2.5 M n-butyllithium solution (7.3 mL, 18.1 mmol) was added at −78° C., and the reaction solution was stirred at −20° C. for 30 min. An aqueous solution of sodium chloride was added, the mixture was extracted with an EA solution, an obtained organic phase was concentrated under reduced pressure, and an obtained residue was purified by thin layer chromatography using eluents (PE:EA=1: 2) to obtain a compound 17-6 (700 mg) with a yield of 42%. MS m/z (ESI): 231.1 [M+1].

At step 7: the compound 17-6 (50 mg, 0.22 mmol), the compound 1a (62 mg, 0.24 mmol), and titanium isopropoxide (1 mL) were dissolved in DCE (10 mL), and the reaction solution reacted at 50° C. overnight. Sodium borohydride (60 mg, 1.6 mmol) was added, and the reaction solution reacted at 60° C. for 2 h. Water (1 mL) was added to quench the reaction, the mixture was stirred at the room temperature for 30 min and filtered, and an obtained filtrate was concentrated under reduced pressure. An obtained residue was purified by preparative liquid chromatography (preparative column: 21.2×250 mm C18 column; system: 10 mM NH$_4$HCO$_3$H$_2$O; wavelengths: 254/214 nm; gradients: 30%-60% changes in acetonitrile) to obtain a compound H-17 (30.89 mg, a colorless oily liquid) with a yield of 30%. MS m/z (ESI): 475.1 [M+1]; $^1$H NMR (400 MHz, CD$_3$OD) δ 8.54-8.47 (m, 1H), 7.79-7.70 (m, 1H), 7.50 (dd, J=8.1, 1.0 Hz, 1H), 7.42 (dd, J=3.4, 1.9 Hz, 1H), 7.25-7.21 (m, 1H), 5.87 (ddd, J=16.6, 1.9, 0.7 Hz, 1H), 4.27 (t, J=6.7 Hz, 1H), 4.09-3.95 (m, 1H), 3.81-3.65 (m, 2H), 3.03-2.98 (m, 1H), 2.65-2.37 (m, 3H), 2.25-1.87 (m, 4H), 1.80-1.24 (m, 9H), 1.12-1.01 (m, 3H), 0.91-0.85 (m, 1H), 0.76-0.67 (m, 1H).

Example 18

N-(2-((R)-9-(pyridin-2-yl)-6-oxaspiro[4.5]decan-9-yl)ethyl)-6-(1,1,1,-trifluoro-2-methylprop-2-yl)-5,6-dihydro-4H-pyrrolo[1,2-b]pyrazol-4-amine (H-18)

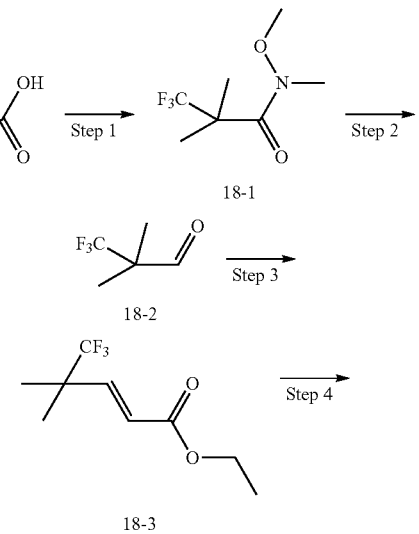

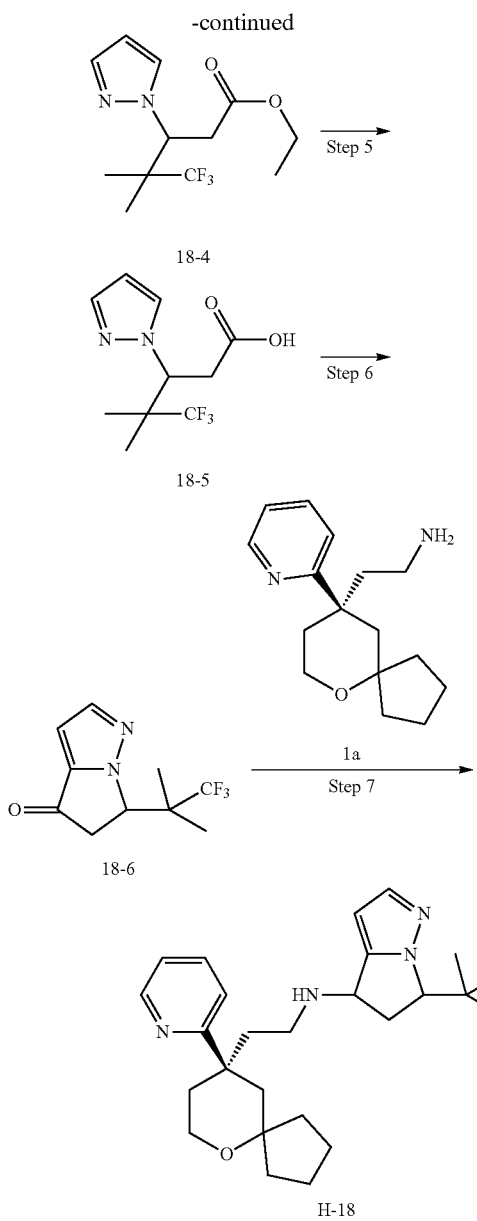

At step 3: the compound 18-2 (3.02 g, 21.6 mmol) was dissolved in an acetonitrile solution (30 mL), ethyl diethoxyphosphinylformate (7.26 g, 32.4 mmol), DBU (6.57 g, 43.2 mmol), and lithium chloride (1.81 g, 43.2 mmol) were added, and the reaction solution was stirred at the room temperature overnight. EA (100 mL) was added, followed by washing with a saturated saline solution, drying with anhydrous sodium sulfate, and concentration of organic phase under reduced pressure, and an obtained residue was purified by thin layer chromatography using eluents (PE:EA=2:1) to obtain a compound 18-3 (700 mg) with a yield of 15%. MS m/z (ESI): 211.1 [M+1].

At step 4: pyrazole (340 mg, 5 mmol) was dissolved in a DMF solution (10 mL), the obtained compound 18-3 (700 mg, 3.33 mmol) and potassium carbonate (919 mg, 6.66 mmol) were added, and the reaction solution was stirred at 60° C. overnight. EA (100 mL) was added, followed by washing with a saturated sodium bicarbonate solution, drying with anhydrous sodium sulfate, and concentration of organic phase under reduced pressure. An obtained residue was purified by thin layer chromatography using eluents (PE:EA=1:1) to obtain a compound 18-4 (800 mg) with a yield of 86%. MS m/z (ESI): 279.1 [M+1].

At step 5: the compound 18-4 (800 mg, 2.88 mmol) was dissolved in a mixture of methanol (10 mL) and water (2 mL), lithium hydroxide (0.13 g, 5.76 mmol) was added, and the reaction solution was stirred at the room temperature for 2 h. A 3 N hydrochloric acid solution was added to adjust a pH value of the reaction solution to 2, the mixture was extracted with a mixture of DCM and methanol (10/1), an obtained organic phase was distilled under reduced pressure, and an obtained residue was purified by preparative liquid chromatography to obtain a compound 18-(0.5 g) with a yield of 69%. MS m/z (ESI): 251.1 [M+1].

At step 6: the compound 18-5 (0.2 g, 0.8 mmol) was dissolved in a THF solution (10 mL), a 2.5 M n-butyllithium solution (0.8 mL, 2 mmol) was added at −78° C., and the reaction solution was stirred at the room temperature for 1 h. An aqueous solution of sodium chloride was added, the mixture was extracted with an EA solution, an obtained organic phase was concentrated under reduced pressure, and an obtained residue was purified by thin layer chromatography using eluents (PE:EA=1:1) to obtain a compound 18-6 (20 mg) with a yield of 10%. MS m/z (ESI): 233.1 [M+1].

At step 7: the compound 1a (23 mg, 0.09 mmol) was dissolved in a DCE solution (5 mL), the compound 18-6 (20 mg, 0.09 mmol) and titanium isopropoxide (0.3 mL) were added, the reaction solution was heated to 60° C. to react overnight. After the reaction solution was cooled to the room temperature, sodium borohydride (11 mg, 0.27 mmol) was added, and the reaction solution was stirred at the room temperature for 1 h. Water was added, the mixture was filtered, an obtained filtrate was concentrated under reduced pressure, and an obtained residue was purified by preparative liquid chromatography (preparative column: 21.2×250 mm C18 column; system: 10 mM NH$_4$HCO$_3$H$_2$O; wavelengths: 254/214 nm; gradients: 30%-60% changes in acetonitrile) to obtain a compound H-18 (1.65 mg) with a yield of 3.9%. MS m/z (ESI): 477.1 [M+1]; $^1$H NMR (400 MHz, CD$_3$OD): δ 8.53-8.52 (m, 1H), 7.77-7.73 (m, 1H), 7.52-7.50 (m, 1H), 7.42-7.40 (m, 1H), 7.25-7.21 (m, 1H), 5.91-4.84 (m, 1H), 5.33-5.31 (t, J=4 Hz, 1H), 4.28-4.24 (t, J=4 Hz, 1H), 4.02-3.99 (m, 1H), 3.80-3.74 (m, 2H), 2.64-2.40 (m, 4H), 2.17-2.03 (m, 5H), 1.92-1.89 (d, J=12 Hz, 1H), 1.75-1.70 (m, 2H), 1.65 (s, 3H), 1.54-1.39 (m, 5H), 1.01-1.00 (d, J=4 Hz, 3H).

At step 1: 3,3,3-trifluoro-2,2-dimethylpropanoic acid (5 g, 32 mmol) was dissolved in a DMF solution (100 mL), dimethylhydroxylamine hydrochloride (3.74 g, 38.5 mmol), HATU (18.2 g, 48 mmol), and a triethylamine solution (9.7 g, 96 mmol) were added, and the reaction solution was stirred at the room temperature overnight. EA (400 mL) was added, followed by washing with a saturated sodium bicarbonate solution, drying with anhydrous sodium sulfate, and concentration of organic phase under reduced pressure. An obtained residue was purified by thin layer chromatography using eluents (PE:EA=1:1) to obtain a compound 18-1 (4.5 g) with a yield of 70%. MS m/z (ESI): 200.1 [M+1].

At step 2: the compound 18-1 (4.3 g, 21.6 mmol) was dissolved in a THF solution (30 mL), lithium aluminum hydride (1.64 g, 43.2 mmol) was added at 0° C., and the reaction solution was stirred at 0° C. for 1 h. Sodium sulfate decahydrate was added, the mixture was stirred for 30 min and filtered, and an obtained filtrate was concentrated under reduced pressure to obtain a compound 18-2.

Example 19

N-(2-((R)-9-(pyridin-2-yl)-6-oxaspiro[4.5]decan-9-yl)ethyl)-4',5'-dihydrospiro[cyclopentane-1,6'-pyrrolo[1,2-b]pyrazol]-4'-amine (H-19)

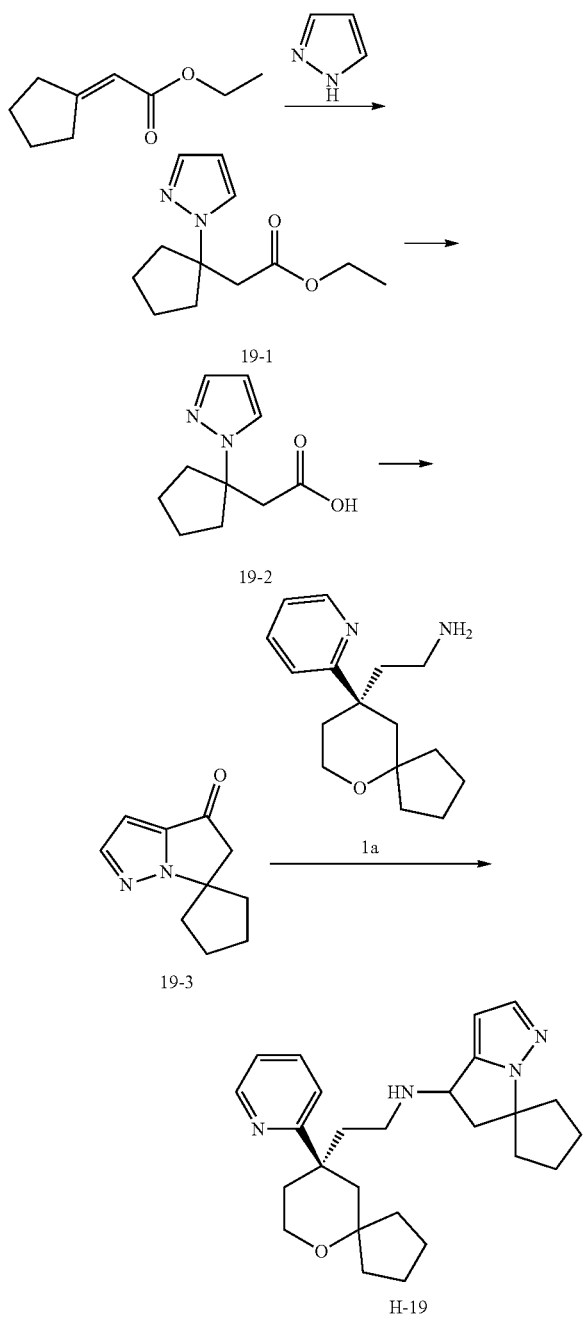

At step 1: an acetonitrile solution (60 mL) and DBU (2.28 g, 15 mmol) were added to a sealed tube in which ethyl 2-cyclopentylideneacetate (1.54 g, 10 mmol) and pyrazole (1 g, 15 mmol) were placed. The mixture was stirred at 100° C. for 18 h, cooled to the room temperature, and concentrated, and an obtained residue was diluted with ethyl acetate (100 mL), followed by washing with water (60 mL×1), washing with a saturated saline solution (30 mL×1), drying with anhydrous sodium sulfate, and filtration. An obtained filtrate was concentrated under reduced pressure. An obtained residue was purified by silica gel column chromatography (petroleum ether/ethyl acetate=6/1) to obtain a compound 19-1 (1.11 g, a yellow oily liquid) with a yield of 50%. MS m/z (ESI): 223.1 [M+1].

At step 2: the compound 19-1 (1.11 g, 5 mmol) was dissolved in a mixture of methanol (20 mL) and water (5 mL), sodium hydroxide (0.4 g, 10 mmol) was added, and the reaction solution was stirred at the room temperature for 1 h until the reaction was completed. The reaction solution was concentrated, an obtained residue was dissolved in water (20 mL), 2 M hydrochloric acid was added to adjust a pH value of the mixture to 3 to 4, the mixture was extracted with dichloromethane (40 mL×3), a combined organic phase was dried with anhydrous sodium sulfate and filtered, and an obtained filtrate was concentrated under reduced pressure to obtain a compound 19-2 (0.77 g, a yellow oily liquid) with a yield of 80%. MS m/z (ESI): 195.2 [M+1].

At step 3: the compound 19-2 (0.77 g, 4 mmol) was dissolved in dry tetrahydrofuran (15 mL), and after the mixture was cooled to −70° C. under the protection of nitrogen gas, a tetrahydrofuran solution of 2.5 M butyl-lithium (4 mL, 10 mmol) was slowly added dropwise. After the dropwise addition was completed, the reaction was slowly heated to −40° C. and stirred for 45 min. Water (10 mL) was added to quench the reaction, followed by filtration, concentration, and purification by silica gel column chromatography (petroleum ether/ethyl acetate=6/1) to obtain a compound 19-3 (85 mg, a yellow oily liquid) with a yield of 12%. MS m/z (ESI): 177.3 [M+1].

At step 4: the compound 19-3 (53 mg, 0.30 mmol) and the compound 1a (78 mg, 0.30 mmol) were dissolved in 1,2-dichloroethane (10 mL), titanium isopropoxide (1 mL) was added, and the reaction solution was stirred at 45° C. for 18 h. After the reaction solution was cooled to the room temperature, sodium borohydride (34 mg, 0.9 mmol) was added, the reaction solution was stirred for 3 h, water (5 mL) was added, the mixture was stirred for 0.5 h and filtered, an obtained filtrate was concentrated under reduced pressure, and an obtained residue was purified by preparative chromatography (preparative column: 21.2×250 mm C18 column; system: 10 mM NH$_4$HCO$_3$H$_2$O; wavelengths: 254/214 nm; gradients: 30%-60% changes in acetonitrile) to obtain a compound H-19 (26 mg, a colorless oily substance) with a yield of 20.6%. MS m/z (ESI): 421.3 [M+1]; $^1$H NMR (400 MHz, DMSO-d6) δ 8.54-8.47 (m, 1H), 7.71-7.68 (m, 1H), 7.44 (d, J=8.0 Hz, 1H), 7.28 (dd, J=4.8, 1.8 Hz, 1H), 7.17 (dd, J=7.4, 4.8 Hz, 1H), 5.65 (dd, J=23.8, 1.7 Hz, 1H), 3.88 (dt, J=7.6, 5.3 Hz, 1H), 3.64-3.49 (m, 2H), 2.58-2.54 (m, 1H), 2.47-2.26 (m, 5H), 2.09-1.20 (m, 19H), 1.00-0.89 (m, 1H), 0.60-0.56 (m, 1H).

Example 20

N-(2-((R)-9-(pyridin-2-yl)-6-oxaspiro[4.5]decan-9-yl)ethyl)-2,3,4',5,5',6-hexahydrospiro[pyran-4,6'-pyrrolo[1,2-b]pyrazol]-4'-amine (H-20)

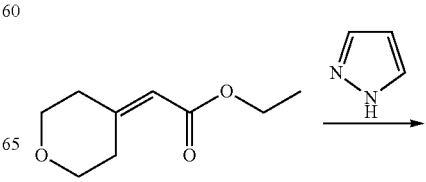

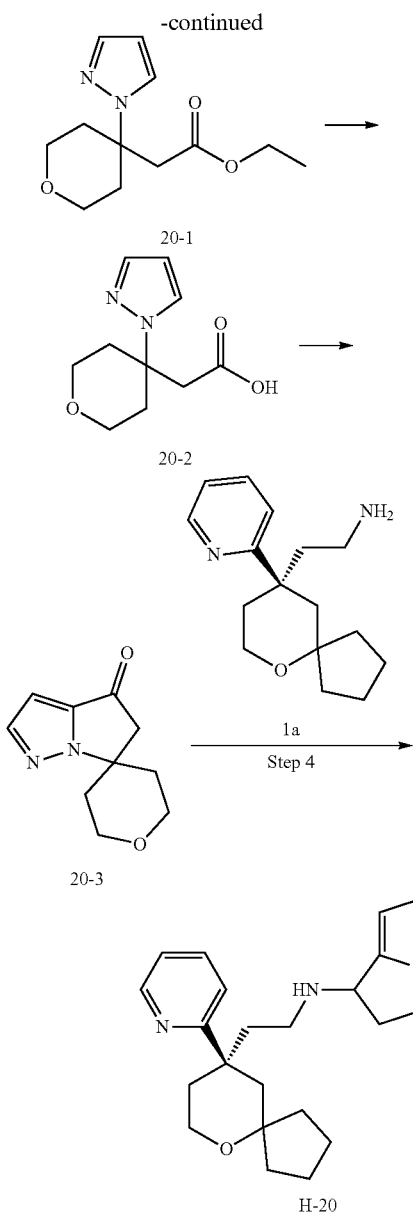

was concentrated, an obtained residue was dissolved in water (20 mL), 2 M hydrochloric acid was added to adjust a pH value of the mixture to 3 to 4, the mixture was extracted with dichloromethane (40 mL×3), a combined organic phase was dried with anhydrous sodium sulfate and filtered, and an obtained filtrate was concentrated under reduced pressure to obtain a compound 20-2 (0.73 g, a yellow oily liquid) with a yield of 76%. MS m/z (ESI): 211.2 [M+1].

At step 3: the compound 20-2 (0.73 g, 3.5 mmol) was dissolved in dry tetrahydrofuran (15 mL), and after the mixture was cooled to −70° C. under the protection of nitrogen gas, a tetrahydrofuran solution of 2.5 M butyllithium (3.5 mL, 8.7 mmol) was slowly added dropwise. After the dropwise addition was completed, the reaction was slowly heated to −40° C. and stirred for 45 min. Water (10 mL) was added to quench the reaction, followed by filtration, concentration, and purification by silica gel column chromatography (petroleum ether/ethyl acetate=6/1) to obtain a compound 20-3 (168 mg, a yellow oily liquid) with a yield of 25%. MS m/z (ESI): 193.3 [M+1].

At step 4: the compound 20-3 (58 mg, 0.30 mmol) and the compound 1a (78 mg, 0.30 mmol) were dissolved in 1,2-dichloroethane (10 mL), titanium isopropoxide (1 mL) was added, and the reaction solution was stirred at 45° C. for 18 h. After the reaction solution was cooled to the room temperature, sodium borohydride (34 mg, 0.9 mmol) was added, the reaction solution was stirred for 3 h, water (5 mL) was added, the mixture was stirred for 0.5 h and filtered, an obtained filtrate was concentrated under reduced pressure, and an obtained residue was purified by preparative chromatography (preparative column: 21.2×250 mm C18 column; system: 10 mM $NH_4HCO_3H_2O$; wavelengths: 254/214 nm; gradients: 30%-60% changes in acetonitrile) to obtain a compound H-20 (20 mg, a colorless oily substance) with a yield of 20.6%. MS m/z (ESI): 437.2 [M+1]; $^1$H NMR (400 MHz, DMSO-d6) δ 8.52-8.50 (m, 1H), 7.75-7.65 (m, 1H), 7.44 (dd, J=8.1, 1.2 Hz, 1H), 7.31 (dd, J=5.4, 1.8 Hz, 1H), 7.22-7.13 (m, 1H), 5.68 (dd, J=24.4, 1.7 Hz, 1H), 3.94-3.92 (m, 3H), 3.58-3.55 (m, 2H), 3.47-3.32 (m, 2H), 2.73-2.63 (m, 1H), 2.43-2.41 (m, 2H), 2.35-2.26 (m, 2H), 2.12-1.71 (m, 7H), 1.66-1.22 (m, 9H), 0.99-0.90 (m, 1H), 0.60-0.57 (m, 1H).

Example 21

N-(2-((R)-9-(pyridin-2-yl)-6-oxaspiro[4.5]decan-9-yl)ethyl)-4',5'-dihydrospiro[cyclobutane-1,6'-pyrrolo[1,2-b]pyrazol]-4'-amine (H-21)

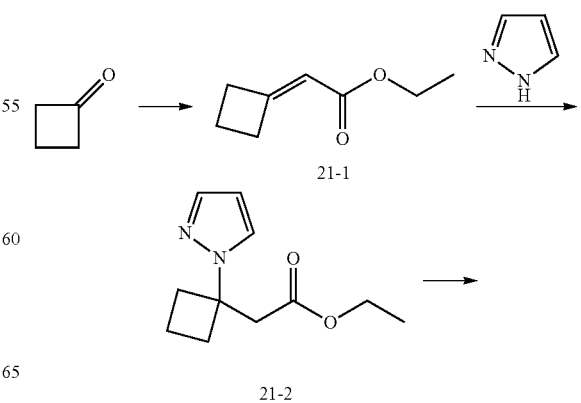

At step 1: an acetonitrile solution (60 mL) and DBU (2.28 g, 15 mmol) were added to a sealed tube in which ethyl 2-(dihydro-2H-pyran-4(3H)-alkylene)acetate (1.7 g, 10 mmol) and pyrazole (1 g, 15 mmol) were placed. The mixture was stirred at 100° C. for 18 h, cooled to the room temperature, and concentrated, and an obtained residue was diluted with ethyl acetate (100 mL), followed by washing with water (60 mL×1), washing with a saturated saline solution (30 mL×1), drying with anhydrous sodium sulfate, and filtration. An obtained filtrate was concentrated under reduced pressure. An obtained residue was purified by silica gel column chromatography (petroleum ether/ethyl acetate=6/1) to obtain a compound 20-1 (1.09 g, a yellow oily liquid) with a yield of 46%. MS m/z (ESI): 239.1 [M+1].

At step 2: the compound 20-1 (1.09 g, 4.6 mmol) was dissolved in a mixture of methanol (20 mL) and water (5 mL), sodium hydroxide (0.4 g, 10 mmol) was added, and the reaction solution was stirred at the room temperature for 1 h until the reaction was completed. The reaction solution

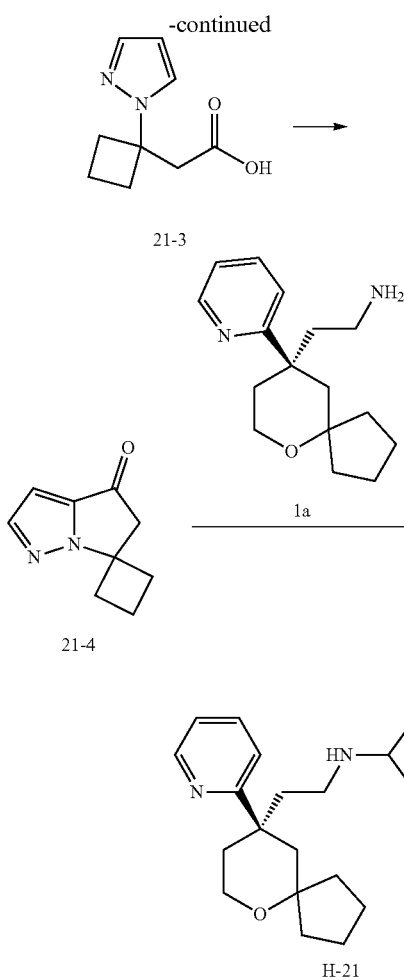

At step 3: the compound 21-2 (5 g, 24 mmol) was dissolved in a mixture of methanol (60 mL) and water (15 mL), sodium hydroxide (1.92 g, 48 mmol) was added, and the reaction solution was stirred at the room temperature for 1 h until the reaction was completed. The reaction solution was concentrated, an obtained residue was dissolved in water (40 mL), 2 M hydrochloric acid was added to adjust a pH value of the mixture to 3 to 4, the mixture was extracted with dichloromethane (60 mL×3), a combined organic phase was dried with anhydrous sodium sulfate and filtered, and an obtained filtrate was concentrated under reduced pressure to obtain a compound 21-3 (3.0 g, a yellow oily liquid) with a yield of 70%. MS m/z (ESI): 181.2 [M+1].

At step 4: the compound 21-3 (3.0 g, 16.7 mmol) was dissolved in dry tetrahydrofuran (80 mL), and after the mixture was cooled to −70° C. under the protection of nitrogen gas, a tetrahydrofuran solution of 2.5 M butyllithium (16.7 mL, 41.7 mmol) was slowly added dropwise. After the dropwise addition was completed, the reaction solution was slowly heated to −40° C. and stirred for 45 min. Water (10 mL) was added to quench the reaction, followed by filtration, concentration, and purification by silica gel column chromatography (petroleum ether/ethyl acetate=6/1) to obtain a compound 21-4 (243 mg, a yellow oily liquid) with a yield of 9%. MS m/z (ESI): 163.3 [M+1].

At step 5: the compound 21-4 (49 mg, 0.30 mmol) and the compound 1a (78 mg, 0.30 mmol) were dissolved in 1,2-dichloroethane (10 mL), titanium isopropoxide (1 mL) was added, and the reaction solution was stirred at 45° C. for 18 h. After the reaction solution was cooled to the room temperature, sodium borohydride (34 mg, 0.9 mmol) was added, the reaction solution was stirred for 3 h, water (5 mL) was added, the mixture was stirred for 0.5 h and filtered, an obtained filtrate was concentrated under reduced pressure, and an obtained residue was purified by preparative chromatography (preparative column: 21.2×250 mm C18 column; system: 10 mM NH$_4$HCO$_3$H$_2$O; wavelengths: 254/214 nm; gradients: 30%-60% changes in acetonitrile) to obtain a compound H-21 (8 mg, a colorless oily substance) with a yield of 6.6%. MS m/z (ESI): 407.3 [M+1]; $^1$H NMR (400 MHz, DMSO-d6) δ 8.51-8.49 (m, 1H), 7.74-7.64 (m, 1H), 7.43 (d, J=8.1 Hz, 1H), 7.34-7.31 (m, 1H), 7.18-7.15 (m, 1H), 5.66 (dd, J=17.7, 1.7 Hz, 1H), 3.86 (dt, J=7.6, 4.9 Hz, 1H), 3.64-3.49 (m, 2H), 2.79 (dd, J=13.0, 7.5 Hz, 1H), 2.64-2.50 (m, 1H), 2.46-2.24 (m, 5H), 2.17 (ddd, J=13.1, 5.1, 1.5 Hz, 1H), 2.06-2.01 (m, 2H), 1.97-1.65 (m, 5H), 1.65-1.18 (m, 8H), 0.99-0.88 (m, 1H), 0.59-0.55 (m, 1H).

At step 1: cyclobutanone (3.5 g, 50 mmol) was dissolved in acetonitrile (100 mL), triethyl phosphonoacetate (11.8 g, 52.5 mmol) and lithium chloride (2.2 g, 52.5 mmol) were added, the reaction solution was cooled to 2 to 5° C., DBU (7.5 g, 52.5 mmol) was slowly added, and the reaction solution reacted at the room temperature for 18 h. The reaction solution was concentrated, an obtained residue was diluted with ethyl acetate (120 mL), followed by washing with water (70 mL×1), washing with a saturated saline solution (40 mL×1), drying with anhydrous sodium sulfate, and filtration. An obtained filtrate was concentrated under reduced pressure. An obtained residue was purified by silica gel column chromatography (petroleum ether/ethyl acetate=10/1) to obtain a compound 21-1 (5.6 g, a yellow oily liquid) with a yield of 80%. MS m/z (ESI): 141.2 [M+1].

At step 2: an acetonitrile solution (90 mL) and DBU (9.12 g, 60 mmol) were added to a sealed tube in which the compound 21-1 (5.6 g, 40 mmol) and pyrazole (4 g, 60 mmol) were placed. The mixture was stirred at 100° C. for 18 h, cooled to the room temperature, and concentrated, and an obtained residue was diluted with ethyl acetate (100 mL), followed by washing with water (60 mL×1), washing with a saturated saline solution (30 mL×1), drying with anhydrous sodium sulfate, and filtration. An obtained filtrate was concentrated under reduced pressure. An obtained residue was purified by silica gel column chromatography (petroleum ether/ethyl acetate=6/1) to obtain a compound 21-2 (5 g, a yellow oily liquid) with a yield of 60%. MS m/z (ESI): 209.1 [M+1].

Example 22

6,6-dimethyl-N-(2-((R)-9-(pyridin-2-yl)-6-oxaspiro[4.5]decan-9-yl)ethyl)-5,6-dihydro-4H-pyrrolo[1,2-b]pyrazol-4-amine (H-22)

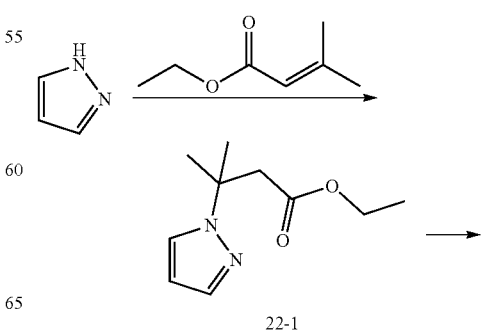

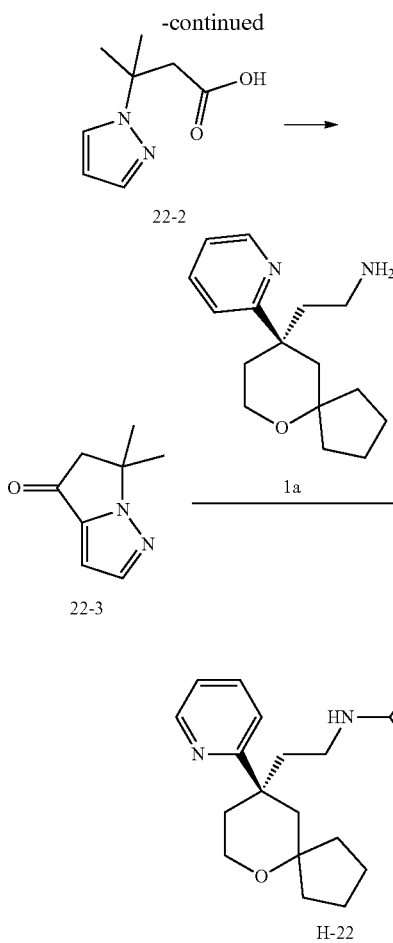

At step 1: 1H-pyrazole (2.68 g, 40 mmol) was dissolved in a DMF solution (50 mL), ethyl 3-methyl-2-enoate (4.5 g, 40 mmol) and potassium carbonate (8.3 g, 60 mmol) were added, and the reaction solution was stirred at 60° C. overnight. Ethyl acetate (100 mL) was added, followed by washing with a saturated sodium bicarbonate solution, drying with anhydrous sodium sulfate, and concentration of organic phase under reduced pressure. An obtained residue was purified by thin layer chromatography using eluents (petroleum ether:ethyl acetate=1:1) to obtain a compound 22-1 (1.2 g) with a yield of 15%. MS m/z (ESI): 197.1 [M+1].

At step 2: the compound 22-1 (1.2 g, 6.2 mmol) was dissolved in a mixture of methanol (30 mL) and water (10 mL), lithium hydroxide (0.43 g, 18.6 mmol) was added, and the reaction solution was stirred at the room temperature for 4 h. A 3 N hydrochloric acid solution was added to adjust a pH value of the reaction solution to 2, the mixture was extracted with a mixture of dichloromethane and methanol (10/1), and an obtained organic phase was distilled under reduced pressure to obtain a yellow compound 22-2 (0.8 g). MS m/z (ESI): 169.1 [M+1].

At step 3: the compound 22-2 (0.8 g, 4.8 mmol) was dissolved in a tetrahydrofuran solution (40 mL), and a 2.5 M n-butyllithium solution (4.2 mL, 10.6 mmol) was added at −78° C., and the reaction solution was stirred at the room temperature for 1 h. An aqueous solution of sodium chloride was added, the mixture was extracted with an ethyl acetate solution, an obtained organic phase was concentrated under reduced pressure, and an obtained residue was purified by thin layer chromatography using eluents (petroleum ether:ethyl acetate=1:1) to obtain a compound 22-3 (50 mg) with a yield of 7%. MS m/z (ESI): 151.1 [M+1].

At step 4: the compound 1a (87 mg, 0.33 mmol) was dissolved in a 1,2-dichloroethane solution (10 mL), the compound 22-3 (50 mg, 0.33 mmol) and titanium isopropoxide (0.5 mL) were added, and the reaction solution was heated to 60° C. to react overnight. After the reaction solution was cooled to the room temperature, sodium borohydride (26 mg, 0.66 mmol) was added, and the reaction solution was stirred at the room temperature for 1 h. Water was added, the mixture was filtered, an obtained filtrate was concentrated under reduced pressure, and an obtained residue was purified by preparative liquid chromatography (preparative column: 21.2×250 mm C18 column; system: 10 mM $NH_4HCO_3H_2O$; wavelengths: 254/214 nm; gradients: 30%-60% changes in acetonitrile) to obtain a compound H-22 (2.27 mg) with a yield of 1.7%. MS m/z (ESI): 395.1 [M+1]; $^1H$ NMR (400 MHz, DMSO-d6): δ 8.51 (d, J=4 Hz, 1H), 7.70-7.68 (m, 1H), 7.45-7.43 (d, J=8 Hz, 1H), 7.29-7.27 (m, 1H), 7.19-7.16 (m, 1H), 5.68-5.60 (m, 1H), 3.92-3.89 (m, 1H), 3.58-3.56 (m, 2H), 2.51-2.50 (m, 1H), 2.46-2.42 (m, 2H), 1.95-1.74 (m, 5H), 1.64-1.48 (m, 5H), 1.46-1.36 (m, 4H), 1.31-1.29 (m, 2H), 1.22-1.20 (m, 5H).

Example 23

N-(2-((R)-9-(pyridin-2-yl)-6-oxaspiro[4.5]decan-9-yl)ethyl)-4',5'-dihydrospiro[cyclopropane-1,6'-pyrrolo[1,2-b]pyrazol]-4'-amine (H-23)

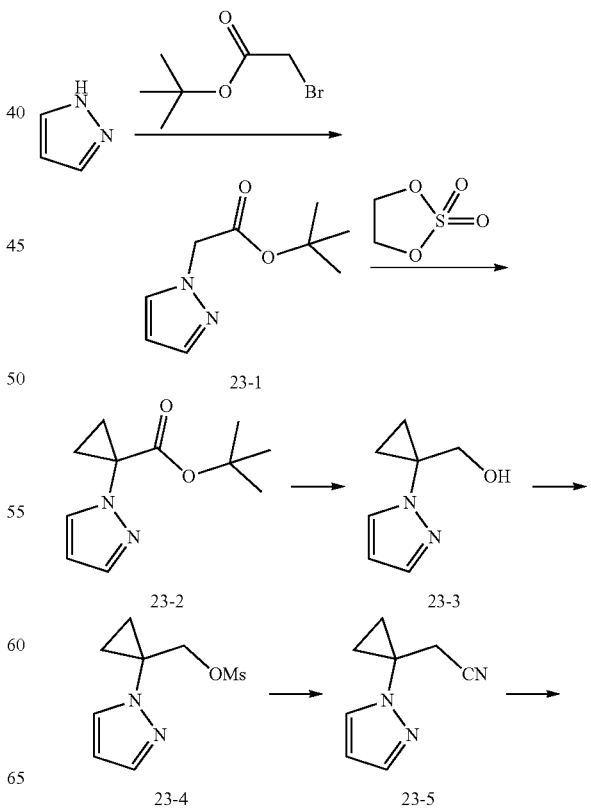

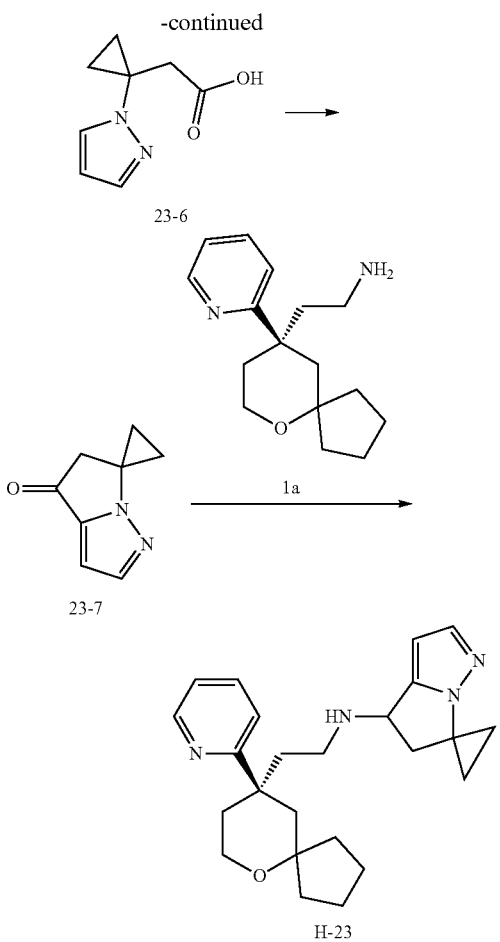

At step 1: 1H-pyrazole (6.8 g, 100 mmol) was dissolved in DMF (200 mL), tert-butyl 2-bromoacetate (21.8 g, 120 mmol) and potassium carbonate (20.7 g, 150 mmol) were added, and the reaction solution was stirred at the room temperature for 4 h. Ethyl acetate (400 mL) was added, followed by washing with a saturated sodium bicarbonate solution, drying with anhydrous sodium sulfate, and concentration of organic phase under reduced pressure. An obtained residue was purified by thin layer chromatography using eluents (petroleum ether:ethyl acetate=3: 2) to obtain a compound 23-1 (7 g) with a yield of 38%. MS m/z (ESI): 183.1 [M+1].

At step 2: the compound 23-1 (7 g, 38.5 mmol) was dissolved in a tetrahydrofuran solution (200 mL), a LiHMDs solution (1 M, 85 mL) was added at −78° C., the reaction solution was stirred at −78° C. for 1 h, 1,3-dioxathiolane-2,2-dioxide (4.77 g, 38.5 mmol) was added, and the reaction solution was stirred at the room temperature for 3 h. An ammonium chloride solution was added, the mixture was extracted with an ethyl acetate solution, an obtained organic phase was concentrated under reduced pressure, and an obtained residue was purified by thin layer chromatography using eluents (petroleum ether:ethyl acetate=1:1) to obtain a compound 23-2 (5.4 g) with a yield of 67.5%. MS m/z (ESI): 209.1 [M+1].

At step 3: the compound 23-2 (5.4 g, 26 mmol) was dissolved in a tetrahydrofuran solution (100 mL), lithium aluminum hydride (2.96 g, 78 mmol) was added at 0° C., and the reaction solution was stirred at 0° C. for 1 h. Sodium sulfate decahydrate was added, the reaction solution was stirred for 30 min and filtered, an obtained filtrated was concentrated to obtain a solid. The solid was purified by thin layer chromatography using eluents (petroleum ether:ethyl acetate=1:1) to obtain a compound 23-3 (2.2 g) with a yield of 61%. MS m/z (ESI): 139.1 [M+1].

At step 4: the compound 23-3 (2.2 g, 16 mmol) was dissolved in a dichloromethane solution (100 mL), a triethylamine solution (3.23 g, 32 mmol) and a methanesulfonyl chloride solution (2.76 g, 24 mmol) were added at 0° C., and the reaction solution was stirred at 0° C. for 1 h. A dichloromethane solution was added, following by washing with a 3 N hydrochloric acid solution, washing with a saturated sodium bicarbonate solution, drying with anhydrous sodium sulfate, and concentration under reduced pressure to obtain a compound 23-4 (3 g, a yellow solid). MS m/z (ESI): 217.1 [M+1].

At step 5: the compound 23-4 (1.5 g, 6.9 mmol) was dissolved in an acetonitrile solution (20 mL), and tetrabutylammonium cyanide (1.85 g, 6.9 mmol) and potassium carbonate (1.44 g, 10.4 mmol) were added. The reaction solution was heated under microwave conditions at 120° C. for 30 min. The reaction solution was concentrated under reduced pressure, and an obtained residue was purified by thin layer chromatography using eluents (petroleum ether: ethyl acetate=1:1) to obtain a compound 23-5 (800 mg) with a yield of 79%. MS m/z (ESI): 148.1 [M+1].

At step 6: the compound 23-5 (800 mg, 5.4 mmol) was dissolved in an ethanol solution (6 mL), a potassium hydroxide solution (50%, 6 mL) was added, and the reaction solution was stirred at 100° C. overnight. A 3 N hydrochloric acid solution was added to adjust a pH value of the reaction solution to 2, the mixture was extracted with a mixture of dichloromethane and methanol (10/1), an obtained organic phase was distilled under reduced pressure to obtain a yellow solid (500 mg). The yellow solid was purified by preparative liquid chromatography to obtain a compound 23-6 (150 mg) with a yield of 18.5%. MS m/z (ESI): 167.1 [M+1].

At step 7: the compound 23-6 (150 mg, 0.9 mmol) was dissolved in a tetrahydrofuran solution (10 mL), and a 2.5 M n-butyllithium solution (0.8 mL, 2 mmol) was added at −78° C., and the reaction solution was stirred at the room temperature for 1 h. An aqueous solution of sodium chloride was added, the mixture was extracted with an ethyl acetate solution, and an obtained organic phase was concentrated under reduced pressure to obtain a compound 23-7. MS m/z (ESI): 149.1 [M+1].

At step 8: the compound 1a (35 mg, 0.14 mmol) was dissolved in a 1,2-dichloroethane solution (4 mL), the compound 23-7 (20 mg, 0.14 mmol) and titanium isopropoxide (0.2 mL) were added, and the reaction solution was heated to 60° C. to react overnight. After the reaction solution was cooled to the room temperature, sodium borohydride (11 mg, 0.28 mmol) was added, and the reaction solution was stirred at the room temperature for 1 h. Water was added, the mixture was filtered, an obtained filtrate was concentrated under reduced pressure, and an obtained residue was purified by preparative liquid chromatography to obtain a compound H-23 (0.45 mg) with a yield of 0.8%. MS m/z (ESI): 393.1 [M+1].

Bioassay

Cell lines used in the following assays are PathHunter® CHO-K1 OPRM1 β-Arrestin Cell Line, from DiscoverX, catalog No. 93-0213C$_2$, lot No. 13K0402.

Reagents used, suppliers, catalog No., and storage temperature are as follows:
Assay Complete™ Cell Culture Kit 107, DiscoverX, 92-3107G, −20° C.;
Assay Complete™ Thawing Reagent, DiscoverX, 92-4002TR, −20° C.;
Assay Complete™ Cell Detachment Reagent, DiscoverX, 92-0009, −20° C.;
Assay Complete™ Cell Plating Reagent, DiscoverX, 93-0563R2, −20° C.;
Pathhunter Detection Kit, DiscoverX, 93-0001, −20° C.;
PBS (1×) 0.0067M (PO4), Hyclone, SH30256.01, 4° C.;
DMSO, Sigma, D5879-100ML, room temperature;
NKH477, Sigma, 1603, −20° C.; and
IBMX, Tocris, 15879, −20° C.
Instruments used, models, and suppliers are as follows:
Countsatr BioMed, IM1200, ALIT;
Microscope, IX51, OLYMPUS;
Centrifuge, 5804, Eppendorf;
Thermostatic Water Bath, DK-S420, Shanghai Shenxian thermostatic equipment factory;
Cell Incubator, 3111, Thermo;
Biological Safety Cabinet, BSC-1300IIA2, AIRTECH;
OptiPlate-384 White Opaque, 6007290, Perkin Elmer;
Multimode plate Reader, Victor X5, PerkinElmer; and
Culture Plate-384 White Opaque, TC-treated, 6007680, PerkinElmer.

Test example 1 HTRF-cAMP cell experiment

Experimental Methods and Steps

I. Resuscitation of Cells
1. A resuscitation solution was taken out of a refrigerator at 4° C. and pre-heated in a water bath kettle at 37° C. for 15 min.
2. P6 generation cells were taken out of a liquid nitrogen container, the frozen cell cryopreservation tube was immediately placed into the water bath kettle at 37° C. and gently shaken for 30 sec to 1 min until small ice crystals were seen or the cells were about to thaw completely.
3. The cryopreservation tube was thoroughly sterilized with 70% alcohol and dried by wiping.
4. The cells were centrifuged to remove the cryoprotectant, and resuspended with a pre-heated fresh resuscitation solution.
a. 3 mL of pre-heated cell resuscitation solution was taken by suction and placed into a 15 mL centrifuge tube.
b. The cells were centrifuged at 1,300 rpm for 3 min.
c. A supernatant cryoprotectant was removed, and the cells were resuspended with 4 mL of pre-heated resuscitation solution.
5. The cell suspension was transferred into a T25 cell culture flask and cultured with 5% $CO_2$ at 37° C. for 24 h.
6. After the cells were cultured for 24 h, the resuscitation solution in the cell culture flask was replaced with a pre-heated cell culture medium.

II. Subculture of Cells
1. After the cell growth density in the T25 culture flask was greater than 70%, the cells were digested with a cell dissociation solution for subculture.
a. The medium in the culture flask was removed by suction, 4 mL of pre-heated PBS was added, the culture flask was gently shaken to rinse the cells, and PBS was removed by suction.
b. 1 mL of cell dissociation solution was taken by suction and added to the T25 culture flask.
c. The culture flask was repeatedly shaken to allow the dissociation solution to thoroughly cover the culture flask, and placed into an incubator with 5% $CO_2$ at 37° C. for 5 min.
d. The cell culture flask was taken out, and the cells were observed under a microscope to see if the cells were dissociated.
e. 3 mL of pre-heated cell culture medium was added to terminate the digestion.
f. The cell culture flask was repeatedly rinsed with the cell culture medium gently, and a cell suspension was collected and placed into a 15 mL centrifuge tube.
g. The cells were centrifuged at 1,300 rpm for 3 min, and a supernatant was removed.
h. The cells were resuspended with 3 mL of cell culture medium.
2. Subculture of the cells was performed according to a ratio of 1:3 (that is, 1 mL of cell resuspension solution and 3 mL of cell culture medium were placed into each T25 cell culture flask).

III. Inoculation of Cells into Plate
1. Step 2.2.1 (a to h) was repeated until P8 generation cells were obtained. The cells were counted and resuspended with 2×/1 mM IBMX stimulation buffer solution until the cell density was $1.2 \times 10^6$ cells/mL.
2. The cell solution at the density of $1.2 \times 10^6$ cells/mL was inoculated into a 384-well plate by a multichannel pipette, 10 μL/well (i.e., 12,000 cells/well).

IV. c-AMP assay
1. Relevant reagents were prepared, and the compounds were prepared according to drug dilution preparation tables.
a. 1× Stimulation buffer solution: 1 mL of 5× Stimulation buffer stock solution was added to and uniformly mixed with 4 mL of distilled water.
b. 2×/1 mM IBMX stimulation buffer solution (5 mL): 10 μL of 500 mM IBMX stock solution was added to 4,990 μL of cell culture medium and uniformly mixed by gentle pipetting.
c. A gradient dilution preparation table for a positive drug morphine:

| Concentration of original solution/μM | Volume from high gradient concentration (μL) | Volume of stimulation buffer (μL) | Concentration after dilution/μM | Volume of sample to be added to the 384-well plate (μL) | Final reaction concentration/μM |
|---|---|---|---|---|---|
| 26606 | — | — | — | — | — |
| Gradients | 1 | 19 | 1330.3 | — | — |
| 1) | 2 | 104.4 | 25 | 8 | 10.0000 |
| 2) | 20 | 40 | 8.3333 | 8 | 3.3333 |

-continued

| Concentration of original solution/μM | Volume from high gradient concentration (μL) | Volume of stimulation buffer (μL) | Concentration after dilution/μM | Volume of sample to be added to the 384-well plate (μL) | Final reaction concentration/μM |
|---|---|---|---|---|---|
| 3) | 20 | 40 | 2.7778 | 8 | 1.1111 |
| 4) | 20 | 40 | 0.9259 | 8 | 0.3704 |
| 5) | 20 | 40 | 0.3086 | 8 | 0.1235 |
| 6) | 20 | 40 | 0.1029 | 8 | 0.0412 |
| 7) | 20 | 40 | 0.0343 | 8 | 0.0137 |
| 8) | 20 | 40 | 0.0114 | 8 | 0.0046 |
| 9) | 20 | 40 | 0.0038 | 8 | 0.0015 |
| 10) | 20 | 40 | 0.0013 | 8 | 0.0005 |
| 11) | 20 | 40 | 0.0004 | 8 | 0.0002 | d. Before being diluted, the compound was dissolved in DMSO until the storage concentration was 10 mM.

Dilution preparation table for a positive drug TRV130 and various compounds:

| Concentration of original solution/μM | Volume from high gradient concentration (μL) | Volume of stimulation buffer (μL) | Concentration after dilution/μM | Volume of sample to be added to the 384-well plate (μL) | Final reaction concentration/μM |
|---|---|---|---|---|---|
| 10000 | — | — | — | — | — |
| 1) | 1 | 399 | 25 | 8 | 10.0000 |
| 2) | 20 | 40 | 8.3333 | 8 | 3.3333 |
| 3) | 20 | 40 | 2.7778 | 8 | 1.1111 |
| 4) | 20 | 40 | 0.9259 | 8 | 0.3704 |
| 5) | 20 | 40 | 0.3086 | 8 | 0.1235 |
| 6) | 20 | 40 | 0.1029 | 8 | 0.0412 |
| 7) | 20 | 40 | 0.0343 | 8 | 0.0137 |
| 8) | 20 | 40 | 0.0114 | 8 | 0.0046 |
| 9) | 20 | 40 | 0.0038 | 8 | 0.0015 |
| 10) | 20 | 40 | 0.0013 | 8 | 0.0005 |
| 11) | 20 | 40 | 0.0004 | 8 | 0.0002 | e. 50 uM NK477 (1 mL): 1 μL of 50 mM NKH477 stock solution was added to 999 μL of 1× Stimulation buffer solution, and uniformly mixed by shaking.

f. Detection reagents

A. cAMP-Cryptate (donor, lyophilized) reaction solution: 1 mL of 5× cAMP-Cryptate stock solution was added to 4 mL of 1× Lysis & Detection Buffer solution and uniformly mixed gently.

B. Anti-cAMP-d2 (acceptor, lyophilized) reaction solution: 1 mL of 5× Anti-cAMP-d2 stock solution was added to 4 mL of 1× Lysis & Detection Buffer solution and uniformly mixed gently.

2. cAMP assay steps a. 12,000 cells were inoculated into each well containing 10 μL of 2×IBMX stimulation buffer solution.

b. 8 μL of a diluted compound sample solution was added to the cells in each well.

c. 2 μL of prepared 10×NKH477 solution was added to each well.

d. The cells were incubated at 37° C. for 45 min.

e. 10 μL of cAMP-d2 and 10 μL of anti-cAMP Cryptate reaction solution were added.

f. The cells were incubated in the dark at the room temperature for 60 min.

g. The cell culture plate was read by HTRF.

3. RFU detection and plate reading

After the cells were incubated for 60 min, the plate with all samples was detected and read by homogeneous time-resolved fluorescence.

Data Analysis

Data, which included two signal values respectively at 665 nm and 620 nm, were exported from corresponding software in a computer connected to the multimode plate reader. A ratio calculation Formula was that: ratio=signal value at 665 nm/signal value at 620 nm×10000. The data were analyzed by using GraphPad Prism software. The best fitting curve was log(agonist) vs. response. EC50 values of the compounds were determined by nonlinear regression analysis of computer-aided dose-response curves; PEC50=–log EC50 (the unit of EC50 values was mole); % the maximum effect value of morphine=(compound sample ratio–blank well ratio)/TOP×100 (note: TOP is a Top value of a curve of morphine sample ratio-blank well ratio, which was analyzed and fitted by using Graphpad Prism software). Results are shown in Table 1:

TABLE 1

Activity of compounds against cAMP

| Compound | cAMP $EC_{50}$ (nM) | cAMP Emax (%) Morphine was 100% | Compound | cAMP $EC_{50}$ (nM) | cAMP Emax Morphine was 100% |
|---|---|---|---|---|---|
| H-1 | 49 | 124.6 | H-2 | 47 | 93.2 |
| H-3 | 17 | 74.6 | H-4-1 | 8 | 64.1 |
| H-4-2 | 18 | 91.8 | H-6 | 9 | 99.6 |
| H-7 | 29 | 104.6 | H-10 | 11 | 74.7 |
| H-11 | 15 | 84.8 | H-12-1 | 12 | 99.5 |
| H-12-2 | 12 | 77.8 | H-14 | 31 | 73 |
| H-15 | 84 | 64.9 | H-17 | 31 | 68.6 |
| H-18 | 68 | 89.1 | H-19 | 21 | 94.1 |
| H-20 | 4 | 107 | H-21 | 22 | 70.8 |
| H-22 | 11 | 104 | | | |

Test Example 2 β-Arrestin Cell Experiment

Experimental Method and Steps

I. Resuscitation of Cells
1. A resuscitation solution was taken out of a refrigerator at 4° C. and pre-heated in a water bath kettle at 37° C. for 15 min.
2. P6 generation cells were taken out of a liquid nitrogen container, the frozen cell culture tube was immediately placed into the water bath kettle at 37° C. and gently shaken for 30 sec to 1 min until small ice crystals were seen or the cells were about to thaw completely.
3. The culture tube was thoroughly sterilized with 70% alcohol and dried by wiping.
4. The cells were centrifuged to remove the cryoprotectant, and resuspended with a pre-heated fresh resuscitation solution.
  a. 3 mL of pre-heated cell resuscitation solution was taken by suction and placed into a 15 mL centrifuge tube.
  b. The cells were centrifuged at 1,300 rpm for 3 min.
  c. A supernatant was removed, and the cells were resuspended with 4 mL of pre-heated resuscitation solution.
5. The cell suspension was transferred into a T25 cell culture flask and cultured with 5% $CO_2$ at 37° C. for 24 h.
6. After the cells were cultured for 24 h, the resuscitation solution in the cell culture flask was replaced with a pre-heated cell culture medium.

II. Subculture of Cells
1. After the cell growth density in the T25 culture flask was greater than 70%, the cells were digested with a cell dissociation solution for subculture.
  a. The medium in the culture flask was removed by suction, 4 mL of pre-heated PBS was added, the culture flask was gently shaken to rinse the cells, and PBS was removed by suction.
  b. 1 mL of cell dissociation solution was taken by suction and added to the T25 culture flask.
  c. The culture flask was repeatedly shaken to allow the dissociation solution to thoroughly cover the culture flask, and placed into an incubator with 5% $CO_2$ at 37° C. for 5 min.
  d. The cell culture flask was taken out, and the cells were observed under a microscope to see if the cells were dissociated.
  e. 3 mL of pre-heated cell culture medium was added to terminate the digestion.
  f. The cell culture flask was repeatedly rinsed with the cell culture medium gently, and the cell suspension was finally transferred into a 15 mL centrifuge tube.
  g. The cells were centrifuged at 1,300 rpm for 3 min, and a supernatant was removed.
  h. The cells were resuspended with 3 mL of cell culture medium.
2. Subculture of the cells was performed according to a ratio of 1:3 (that is, 1 mL of cell resuspension solution and 3 mL of cell culture medium were placed into each T25 cell culture flask).
3. Step 2.2.1 (a to h) was repeated until P8 generation cells were obtained.

III. Inoculation of Cells into Plate
1. 20 μL of cell suspension was taken by using a pipette, and the number of the cells was measured by using a cell counter.
2. The cells were centrifuged at 1,300 rpm for 3 min to settle the cells down.
3. A supernatant was removed, and a corresponding cell plating solution was added until the cell density was $2 \times 10^5$ cells/mL.
4. The cell solution at the density of $2 \times 10^5$ cells/mL was inoculated into a 384-well plate by a multichannel pipette, 20 μL/well (i.e., 4,000 cells/well).
5. The 384-well plate inoculated with the cells was placed into the incubator with 5% $CO_2$ at 37° C. for 24 h.

IV. β-Arrestin Assay
1. The compounds were prepared according to the following dilution tables.
  a. A gradient dilution preparation table for a positive drug morphine

| Concentration of original solution/μM | Volume from high gradient concentration (μL) | Volume of Plating Buffer added (μL) | Volume of DMSO added (μL) | Concentration after dilution/μM | Volume of sample to be added to the 384-well plate (μL) | Final reaction concentration/ μM |
|---|---|---|---|---|---|---|
| 26606 Prepare | 2 | 18 | 0 | 2660.6 | — | — |
| A | 2 | 101.763 | 2.661 | 50.000 | 5 | 10.000 |
| B | 20 | 39 | 1 | 16.667 | 5 | 3.333 |
| C | 20 | 39 | 1 | 5.556 | 5 | 1.111 |
| D | 20 | 39 | 1 | 1.852 | 5 | 0.370 |
| E | 20 | 39 | 1 | 0.617 | 5 | 0.123 |
| F | 20 | 39 | 1 | 0.206 | 5 | 0.041 |
| G | 20 | 39 | 1 | 0.069 | 5 | 0.014 |
| H | 20 | 39 | 1 | 0.023 | 5 | 0.005 | b. Before being diluted, the compound was dissolved in DMSO until the storage concentration was 10 mM.

A dilution preparation table for a positive drug TRV 130 and various compounds:

| Concentration of original solution/ μM | Volume from high gradient concentration (μL) | Volume of DMSO added (μL) | Concentration after dilution/ μM | Volume of diluted solution (μL) | Volume of Plating Buffer added (μL) | Final concentration of diluted solution/ μM | Volume of sample to be added to the 384-well plate (μL) | Final reaction concentration/ μM |
|---|---|---|---|---|---|---|---|---|
| 10000 | — | — | — | — | — | — | — | — |
| A | 12.5 | 50 | 2000 | 2.5 | 97.5 | 50.000 | 5 | 10.000 |
| B | 20 | 40 | 666.667 | 2.5 | 97.5 | 16.667 | 5 | 3.333 |
| C | 20 | 40 | 222.222 | 2.5 | 97.5 | 5.556 | 5 | 1.111 |
| D | 20 | 40 | 74.074 | 2.5 | 97.5 | 1.852 | 5 | 0.370 |
| E | 20 | 40 | 24.691 | 2.5 | 97.5 | 0.617 | 5 | 0.123 |
| F | 20 | 40 | 8.230 | 2.5 | 97.5 | 0.206 | 5 | 0.041 |
| G | 20 | 40 | 2.743 | 2.5 | 97.5 | 0.069 | 5 | 0.014 |
| H | 20 | 40 | 0.914 | 2.5 | 97.5 | 0.023 | 5 | 0.005 |

2. 5 μL of each diluted compound sample solution was added to the 384-well plate.
3. After the samples were added, the 384-well plate was placed into the incubator with 5% $CO_2$ at 37° C. for 90 min.

V. RLU Detection

1. Before the incubation of the compound was completed, a Working Detection solution was prepared (in the dark) according to the following ratio. Then, 12.5 μL of Working Detection solution was added to each well, and the cells were incubated by shaking in the dark at the room temperature for 1 h.

| Ingredients | Ratio |
|---|---|
| Cell Assay Buffer | 19 |
| Substrate Reagent 1 | 5 |
| Substrate Reagent 2 | 1 |
| Total volume | 25 |

2. After the incubation of the compound was completed, 12.5 μL of the above working solution was added to each well, and the cells were incubated by shaking in the dark at the room temperature and 80 rpm for 1 h.
3. After the incubation was completed, the plate was read by using a multimode plate reader.

Data Analysis

Data were exported from corresponding software in a computer connected to the multimode plate reader, and analyzed by using GraphPad Prism software. The best fitting curve was log(agonist) vs. response. EC50 values of the compounds were determined by nonlinear regression analysis of computer-aided dose-response curves; PEC50=−log EC50 (the unit of EC50 values was mole); % the maximum effect value of morphine=(RLU value of compound sample-RLU value of blank well)/TOP×100 (note: TOP is a Top value of a curve of RLU value of morphine sample-RLU value of blank well, which was analyzed and fitted by using Graphpad Prism software). Results are shown in Table 2:

TABLE 2

Testing results of compounds on β-arrestin

| Compound | β-arrestin Emax (%) Morphine was 100% | Compound | β-arrestin Emax (%) Morphine was 100% |
|---|---|---|---|
| H-1 | 29.7 | H-2 | 6.2 |
| H-3 | 4.9 | H-4-1 | 1.8 |
| H-4-2 | 4.8 | H-5 | 4.8 |

TABLE 2-continued

Testing results of compounds on β-arrestin

| Compound | β-arrestin Emax (%) Morphine was 100% | Compound | β-arrestin Emax (%) Morphine was 100% |
|---|---|---|---|
| H-6 | 15.3 | H-7 | 22.1 |
| H-9 | 1.0 | H-10 | 5.1 |
| H-11 | 4.3 | H-12-1 | 12 |
| H-12-2 | 15.7 | H-14 | 7.2 |
| H-17 | 2.6 | H-19 | 17.3 |
| H-21 | 8.0 | H-22 | 39.9 |

It can be seen from Table 1 and Table 2 that the representative compounds of the present disclosure have high inhibitory activity against cAMP, and have high Emax values. In addition, the compounds of the present disclosure have small Emax values against $-arrestin, and have good bias.

All documents mentioned in the present disclosure are incorporated by reference in the present disclosure as if each document was individually incorporated by reference. In addition, it should be understood that after reading the above teaching content of the present disclosure, those skilled in the art can make various changes or modifications to the present disclosure, and these equivalent forms also fall within the scope defined by the appended claims of the present disclosure.

The invention claimed is:
1. A compound of Formula (I):

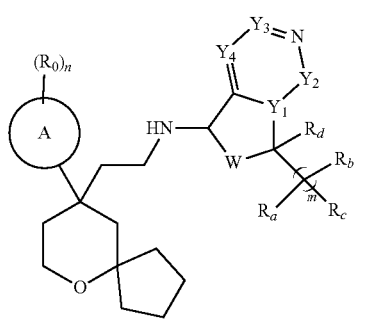

(I)

or a pharmaceutically acceptable salt or stereoisomer thereof,
wherein:
ring A is a $C_{6-10}$ aryl or a 5- or 6-membered heteroaryl;
each $R_0$ is independently halogen, CN, $NO_2$, $C_{1-8}$ alkyl, $C_{1-8}$ haloalkyl, $CH_2OH$, $CH(OH)CH_3$, $CH_2CH_2OH$, $C_{2-4}$ alkenyl, $C_{2-4}$ alkynyl, $C(O)CH_3$, $C(O)C_{6-10}$ aryl, $C(O)NR_{11}R_{12}$, $C(O)OH$, $C(O)OC_{1-8}$ alkyl, $NR_{11}R_{12}$, OH, $OC_{1-8}$ alkyl, $OC(O)C_{1-8}$ alkyl, $S(O)_2C_{1-8}$ alkyl, $S(O)_2C_{6-10}$ aryl, $C_{3-6}$ cycloalkyl, $C_{3-6}$ cycloalkoxy, saturated monocyclic 3- to 6-membered ring, $C_{6-10}$ aryl, or 5- or 6-membered heteroaryl, wherein each saturated monocyclic 3- to 6-membered ring, $C_{6-10}$ aryl, and 5- or 6-membered heteroaryl is optionally and independently substituted with one, two, or three substituents independently selected from the group consisting of halogen, CN, $C_{1-3}$ alkyl, $C(O)CH_3$, $NR_{11}R_{12}$, OH, $OC_{1-3}$ alkyl, and $C_{3-6}$ cycloalkyl;

n is 0, 1, 2, 3, or 4;
$Y_1$ is $CR_1$ or N;
$R_1$ is H, halogen, CN, $C_{1-8}$ alkyl, $CH_2CN$, $CH_2OH$, $C(O)C_{1-8}$ alkyl, $C(O)NR_{11}R_{12}$, $NR_{11}R_{12}$, NHC(O) $C_{1-8}$ alkyl, $NHC(O)NR_{11}R_{12}$, $NHS(O)_2C_{1-8}$ alkyl, $NHS(O)_2NR_{11}R_{12}$, $NHS(O)_2C_{3-6}$ cycloalkyl, OH, or $OC_{1-8}$ alkyl;
$Y_2$ is a bond, —C(O)—, —$NR_2$—, or —$S(O)_2$—;
$R_2$ is H, $C_{1-8}$ alkyl, $C(O)C_{1-8}$ alkyl, $C(O)NR_{11}R_{12}$, or $S(O)_2C_{1-8}$ alkyl;
$Y_3$ is $CR_3$ or N;
$R_3$ is H, halogen, CN, $C_{1-8}$ alkyl, $CH_2CN$, $CH_2OH$, $C(O)C_{1-8}$ alkyl, $C(O)NR_{11}R_{12}$, $NR_{11}R_{12}$, NHC(O) $C_{1-8}$ alkyl, $NHC(O)NR_{11}R_{12}$, $NHS(O)_2C_{1-8}$ alkyl, $NHS(O)_2NR_{11}R_{12}$, $NHS(O)_2C_{3-6}$ cycloalkyl, OH, or $OC_{1-8}$ alkyl;
$Y_4$ is $CR_4$ or N;
$R_4$ is H, halogen, CN, $C_{1-8}$ alkyl, $CH_2CN$, $CH_2OH$, $C(O)C_{1-8}$ alkyl, $C(O)NR_{11}R_{12}$, $NR_{11}R_{12}$, NHC(O) $C_{1-8}$ alkyl, $NHC(O)NR_{11}R_{12}$, $NHS(O)_2C_{1-8}$ alkyl, $NHS(O)_2NR_{11}R_{12}$, $NHS(O)_2C_{3-6}$ cycloalkyl, OH, or $OC_{1-8}$ alkyl;
W is —$CR_{w1}R_{w2}$—, —C(O)—, —$NR_{w3}$—, or —O—;
$R_{w1}$ is H, halogen, $C_{1-8}$ alkyl, $C_{1-8}$ haloalkyl, or $OC_{1-8}$ haloalkyl;
$R_{w2}$ is H, halogen, $C_{1-8}$ alkyl, $C_{1-8}$ haloalkyl, or $OC_{1-8}$ haloalkyl; or
$R_{w1}$ and $R_{w2}$, together with the carbon atom to which they are attached, form a saturated monocyclic 3- to 6-membered ring, wherein the saturated monocyclic 3- to 6-membered ring is optionally substituted with one, two, or three substituents independently selected from the group consisting of halogen, CN, $C_{1-8}$ alkyl, $CH_2CN$, $CH_2OH$, $C(O)C_{1-8}$ alkyl, C(O) $NR_{11}R_{12}$, $NR_{11}R_{12}$, $NHC(O)C_{1-8}$ alkyl, NHC(O) $NR_{11}R_{12}$, $NHS(O)_2C_{1-8}$ alkyl, $NHS(O)_2NR_{11}R_{12}$, $NHS(O)_2C_{3-6}$ cycloalkyl, OH, and $OC_{1-3}$ alkyl;
$R_{w3}$ is H, $C_{1-8}$ alkyl, or $C(O)C_{1-8}$ alkyl;
(i) $R_a$ is H, halogen, $C_{1-8}$ alkyl, $C_{1-8}$ haloalkyl, or $OC_{1-8}$ haloalkyl;
$R_b$ is H, halogen, $C_{1-8}$ alkyl, $C_{1-8}$ haloalkyl, or $OC_{1-8}$ haloalkyl; or
$R_a$ and $R_b$, together with the carbon atom to which they are attached, form a saturated monocyclic 3- to 6-membered ring, wherein the saturated monocyclic 3- to 6-membered ring is optionally substituted with one, two, or three substituents independently selected from the group consisting of halogen, CN, $C_{1-8}$ alkyl, $CH_2CN$, $CH_2OH$, $C(O)C_{1-8}$ alkyl, C(O) $NR_{11}R_{12}$, $NR_{11}R_{12}$, $NHC(O)C_{1-8}$ alkyl, NHC(O) $NR_{11}R_{12}$, $NHS(O)_2C_{1-8}$ alkyl, $NHS(O)_2NR_{11}R_{12}$, $NHS(O)_2C_{3-6}$ cycloalkyl, OH, and $OC_{1-8}$ alkyl;
$R_c$ is H, halogen, $C_{1-8}$ alkyl, $C_{1-8}$ haloalkyl, $C_{2-10}$ alkenyl, $C_{2-10}$ alkynyl, $C(O)C_{1-8}$ alkyl, C(O) $NR_{11}R_{12}$, $NR_{11}R_{12}$, $NHC(O)C_{1-8}$ alkyl, NHC(O) $NR_{11}R_{12}$, $NHS(O)_2C_{1-8}$ alkyl, $NHS(O)_2NR_{11}R_{12}$, $NHS(O)_2C_{3-6}$ cycloalkyl, $OC_{1-8}$ alkyl, $OC_{1-8}$ haloalkyl, $S(O)_2C_{1-8}$ alkyl, $S(O)_2NR_{11}R_{12}$, a saturated monocyclic 4- to 6-membered heterocyclyl, $C_{6-10}$ aryl, or a 5- or 6-membered heteroaryl, wherein the saturated monocyclic 4- to 6-membered heterocyclyl, $C_{6-10}$ aryl, or 5- or 6-membered heteroaryl is optionally substituted with one, two, or three substituents independently selected from the group consisting of halogen, CN, $C_{1-8}$ alkyl, $CH_2CN$, $CH_2OH$, $C(O)C_{1-8}$ alkyl, $C(O)NR_{11}R_{12}$, $NR_{11}R_{12}$, NHC(O)

$C_{1-8}$ alkyl, $NHC(O)NR_{11}R_{12}$, $NHS(O)_2C_{1-8}$ alkyl, $NHS(O)_2NR_{11}R_{12}$, $NHS(O)_2C_{3-6}$ cycloalkyl, OH, and $OC_{1-8}$ alkyl; and $R_d$ is H or $C_{1-8}$ alkyl; or (ii) $R_a$ is H, halogen, $C_{1-8}$ alkyl, $C_{1-8}$ haloalkyl, or $OC_{1-8}$ haloalkyl;

$R_b$ is H, halogen, $C_{1-8}$ alkyl, $C_{1-8}$ haloalkyl, or $OC_{1-8}$ haloalkyl; and $R_c$ and $R_d$, together with the carbon atoms to which they are attached, form a saturated monocyclic 3- to 6-membered ring;

each $R_{11}$ is independently H, $C_{1-8}$ alkyl, $C_{1-8}$ haloalkyl, $C_{3-6}$ cycloalkyl, or a saturated monocyclic 4- to 6-membered heterocyclyl;

each $R_{12}$ is independently H, $C_{1-8}$ alkyl, $C_{1-8}$ haloalkyl, $C_{3-6}$ cycloalkyl, or a saturated monocyclic 4- to 6-membered heterocyclyl; or any $R_{11}$ and $R_{12}$, together with the nitrogen atom to which they are attached, independently forms a saturated monocyclic 4- to 6-membered heterocyclyl, wherein the saturated monocyclic 4- to 6-membered heterocyclyl is optionally substituted with one, two, or three independently selected $C_{1-4}$ alkyl substituents; and m is 0 or 1.

2. The compound according to claim 1 or a pharmaceutically acceptable salt or stereoisomer thereof, wherein

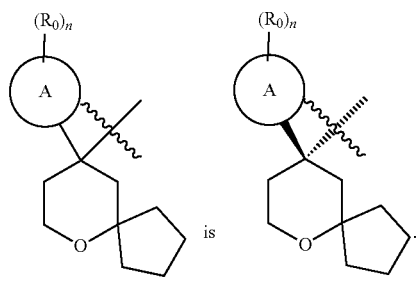

is

3. The compound according to claim 1, or a pharmaceutically acceptable salt or stereoisomer thereof, wherein ring A is phenyl or pyridinyl.

4. The compound according to claim 1, or a pharmaceutically acceptable salt or stereoisomer thereof, wherein n is 0.

5. The compound according to claim 1, or a pharmaceutically acceptable salt or stereoisomer thereof, wherein W is $-CR_{w1}R_{w2}$.

6. The compound according to claim 1, or a stereoisomer thereof, wherein the stereoisomer of the compound is of Formula (II):

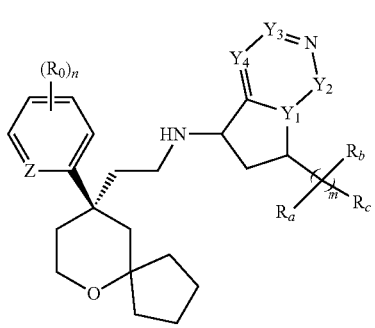

or a pharmaceutically acceptable salt thereof, wherein:

Z is $CR_{01}$ or N;

$R_{01}$ is H, halogen, CN, $C_{1-8}$ alkyl, $C_{1-8}$ haloalkyl, $CH_2OH$, $CH(OH)CH_3$, $CH_2CH_2OH$, $C(O)CH_3$, $C(O)OH$, $NR_{11}R_{12}$, OH, $OC_{1-8}$ alkyl, or $C_{3-6}$ cycloalkyl; and n is 0, 1, 2, or 3.

7. The compound according to claim 6, or a pharmaceutically acceptable salt or stereoisomer thereof, wherein Z is N.

8. The compound according to claim 6, or a stereoisomer thereof, wherein the stereoisomer of the compound is of Formula (III):

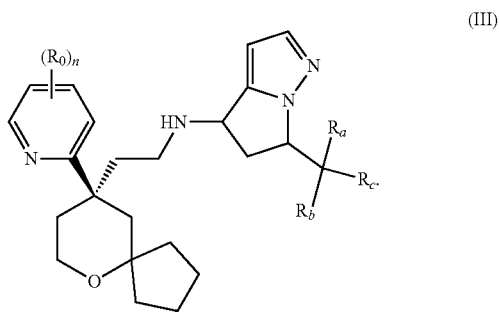

or a pharmaceutically acceptable salt thereof.

9. The compound according to claim 1, or a pharmaceutically acceptable salt or stereoisomer thereof, wherein:

$Y_1$ is N;

$Y_2$ is a bond;

$Y_3$ is $CR_3$;

$R_3$ is H;

$Y_4$ is $CR_4$; and $R_4$ is H.

10. The compound according to claim 1, or a pharmaceutically acceptable salt or stereoisomer thereof, wherein m is 1.

11. The compound according to claim 1, or a pharmaceutically acceptable salt or stereoisomer thereof, wherein:

(i) $R_a$ is H or $C_{1-3}$ alkyl; and $R_b$ is H or $C_{1-3}$ alkyl; or $R_a$ and $R_b$, together with the carbon atom to which they are attached, form a saturated monocyclic 3- to 6-membered ring; or (ii) $R_c$ is H, halogen, $C_{1-3}$ alkyl, $C_{1-3}$ haloalkyl, or $OC_{1-3}$ alkyl; or (iii) $R_a$ is H or $C_{1-3}$ alkyl;

$R_b$ is H or $C_{1-3}$ alkyl; or $R_a$ and $R_b$, together with the carbon atom to which they are attached, form a saturated monocyclic 3- to 6-membered ring; and $R_c$ is H, halogen, $C_{1-3}$ alkyl, $C_{1-3}$ haloalkyl, or $OC_{1-3}$ alkyl.

12. The compound according to claim 1, or a stereoisomer thereof, wherein the compound, or stereoisomer thereof, is selected from the group consisting of:
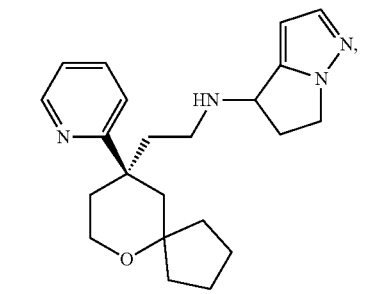
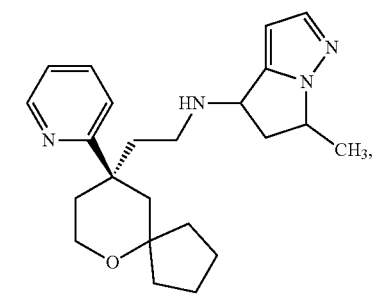
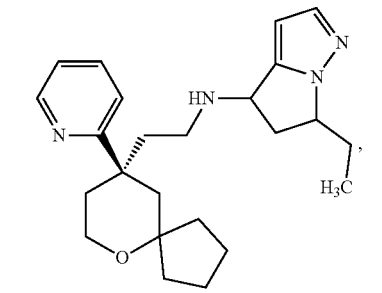
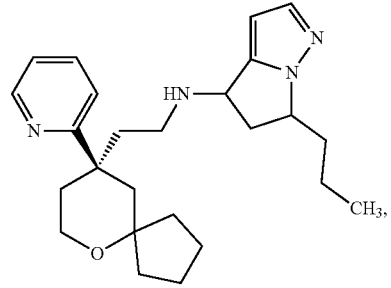
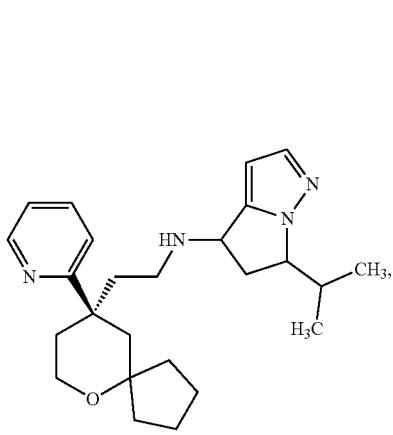
-continued
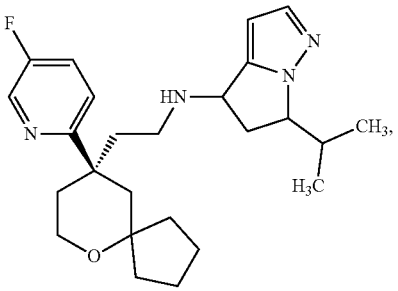
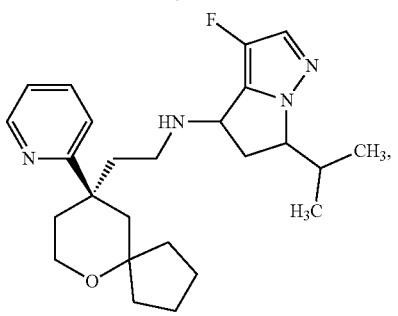
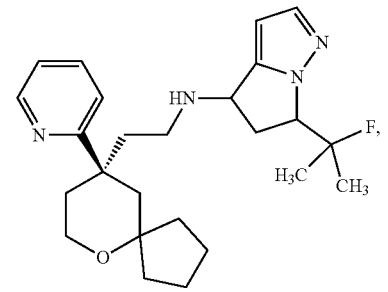
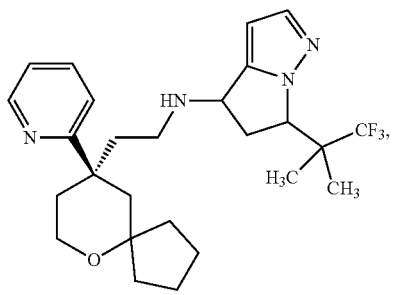
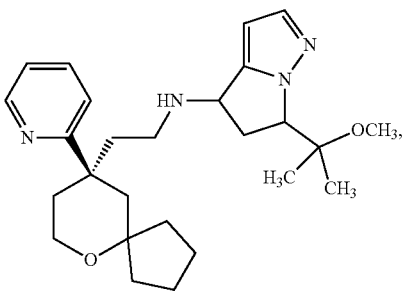

-continued
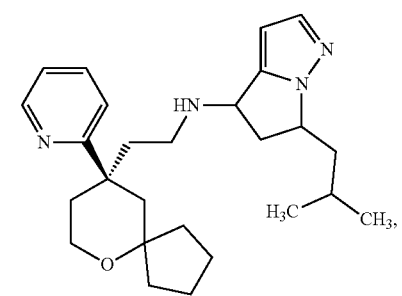
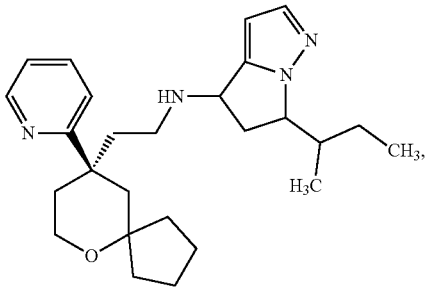
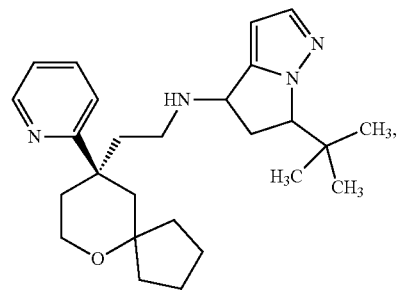
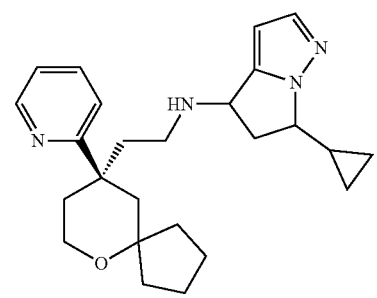
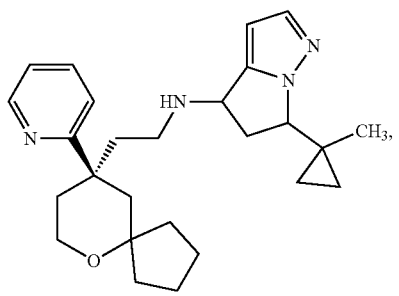
-continued
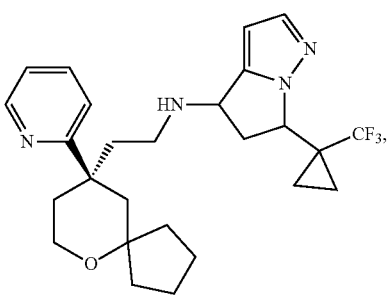
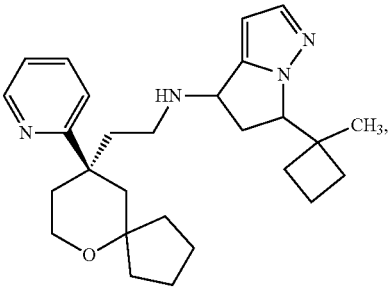
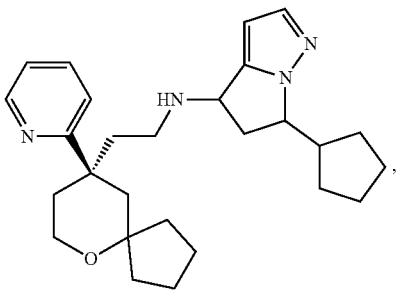
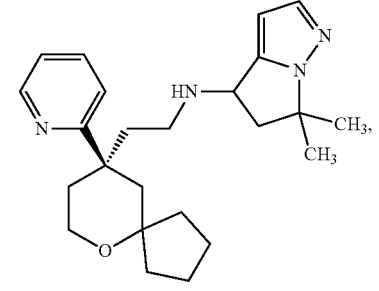
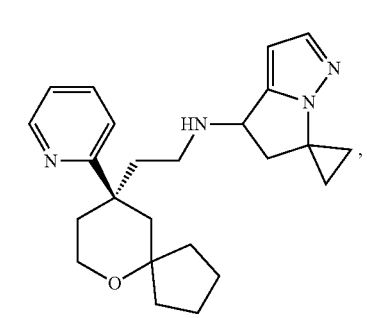

-continued

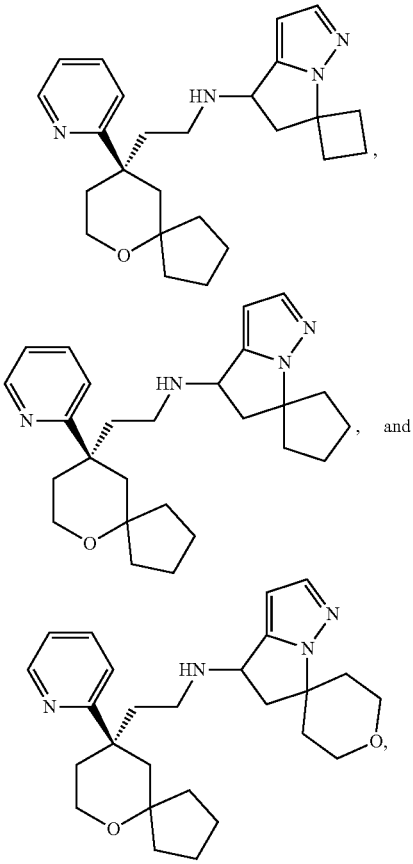

or a pharmaceutically acceptable salt thereof.

13. A pharmaceutical composition comprising a pharmaceutically acceptable carrier and the compound according to claim 1, or a pharmaceutically acceptable salt or stereoisomer thereof.

14. A method for activating or antagonizing a opioid receptor (MOR) receptor in a patient, wherein the method comprises administrating to the patient in need thereof a therapeutically effective amount of a compound according to claim 1, or a pharmaceutically acceptable salt or stereoisomer thereof.

15. The method according to claim 14, wherein the patient suffers from pain.

16. A process for preparing a compound of Formula (I) according to claim 1:

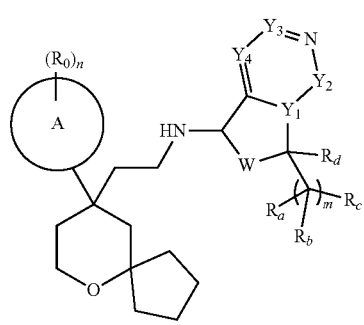

(I)

wherein:
ring A is a $C_{6-10}$ aryl or a 5- or 6-membered heteroaryl;
each $R_0$ is independently halogen, CN, $NO_2$, $C_{1-8}$ alkyl, $C_{1-8}$ haloalkyl, $CH_2OH$, $CH(OH)CH_3$, $CH_2CH_2OH$, $C_{2-4}$ alkenyl, $C_{2-4}$ alkynyl, $C(O)CH_3$, $C(O)C_{6-10}$ aryl, $C(O)NR_{11}R_{12}$, $C(O)OH$, $C(O)OC_{1-8}$ alkyl, $NR_{11}R_{12}$, OH, $OC_{1-8}$ alkyl, $OC(O)C_{1-8}$ alkyl, $S(O)_2C_{1-8}$ alkyl, $S(O)_2C_{6-10}$ aryl, $C_{3-6}$ cycloalkyl, $C_{3-6}$ cycloalkoxy, saturated monocyclic 3- to 6-membered ring, $C_{6-10}$ aryl, or 5- or 6-membered heteroaryl, wherein each saturated monocyclic 3- to 6-membered ring, $C_{6-10}$ aryl, and 5- or 6-membered heteroaryl is optionally and independently substituted with one, two, or three substituents independently selected from the group consisting of halogen, CN, $C_{1-3}$ alkyl, $C(O)CH_3$, $NR_{11}R_{12}$, OH, $OC_{1-3}$ alkyl, and $C_{3-6}$ cycloalkyl;
n is 0, 1, 2, 3, or 4;
$Y_1$ is $CR_1$ or N;
$R_1$ is H, halogen, CN, $C_{1-8}$ alkyl, $CH_2CN$, $CH_2OH$, $C(O)C_{1-8}$ alkyl, $C(O)NR_{11}R_{12}$, $NR_{11}R_{12}$, NHC(O) $C_{1-8}$ alkyl, $NHC(O)NR_{11}R_{12}$, $NHS(O)_2C_{1-8}$ alkyl, $NHS(O)_2NR_{11}R_{12}$, $NHS(O)_2C_{3-6}$ cycloalkyl, OH, or $OC_{1-8}$ alkyl;
$Y_2$ is a bond, —C(O)—, —$NR_2$—, or —S(O)$_2$—;
$R_2$ is H, $C_{1-8}$ alkyl, $C(O)C_{1-8}$ alkyl, $C(O)NR_{11}R_{12}$, or $S(O)_2C_{1-8}$ alkyl;
$Y_3$ is $CR_3$ or N;
$R_3$ is H, halogen, CN, $C_{1-8}$ alkyl, $CH_2CN$, $CH_2OH$, $C(O)C_{1-8}$ alkyl, $C(O)NR_{11}R_{12}$, $NR_{11}R_{12}$, NHC(O) $C_{1-8}$ alkyl, $NHC(O)NR_{11}R_{12}$, $NHS(O)_2C_{1-8}$ alkyl, $NHS(O)_2NR_{11}R_{12}$, $NHS(O)_2C_{3-6}$ cycloalkyl, OH, or $OC_{1-8}$ alkyl;
$Y_4$ is $CR_4$ or N;
$R_4$ is H, halogen, CN, $C_{1-8}$ alkyl, $CH_2CN$, $CH_2OH$, $C(O)C_{1-8}$ alkyl, $C(O)NR_{11}R_{12}$, $NR_{11}R_{12}$, NHC(O) $C_{1-8}$ alkyl, $NHC(O)NR_{11}R_{12}$, $NHS(O)_2C_{1-8}$ alkyl, $NHS(O)_2NR_{11}R_{12}$, $NHS(O)_2C_{3-6}$ cycloalkyl, OH, or $OC_{1-8}$ alkyl;
W is —$CR_{w1}R_{w2}$—, —C(O)—, —$NR_{w3}$—, or —O—;
$R_{w1}$ is H, halogen, $C_{1-8}$ alkyl, $C_{1-8}$ haloalkyl, or $OC_{1-8}$ haloalkyl;
$R_{w2}$ is H, halogen, $C_{1-8}$ alkyl, $C_{1-8}$ haloalkyl, or $OC_{1-8}$ haloalkyl; or
$R_{w1}$ and $R_{w2}$, together with the carbon atom to which they are attached, form a saturated monocyclic 3- to 6-membered ring, wherein the saturated monocyclic 3- to 6-membered ring is optionally substituted with one, two, or three substituents independently selected from the group consisting of halogen, CN, $C_{1-8}$ alkyl, $CH_2CN$, $CH_2OH$, $C(O)C_{1-8}$ alkyl, $C(O)NR_{11}R_{12}$, $NR_{11}R_{12}$, $NHC(O)C_{1-8}$ alkyl, NHC(O) $NR_{11}R_{12}$, $NHS(O)_2C_{1-8}$ alkyl, $NHS(O)_2NR_{11}R_{12}$, $NHS(O)_2C_{3-6}$ cycloalkyl, OH, and $OC_{1-3}$ alkyl;
$R_{w3}$ is H, $C_{1-8}$ alkyl, or $C(O)C_{1-8}$ alkyl;
(i) $R_a$ is H, halogen, $C_{1-8}$ alkyl, $C_{1-8}$ haloalkyl, or $OC_{1-8}$ haloalkyl;
$R_b$ is H, halogen, $C_{1-8}$ alkyl, $C_{1-8}$ haloalkyl, or $OC_{1-8}$ haloalkyl; or
$R_a$ and $R_b$, together with the carbon atom to which they are attached, form a saturated monocyclic 3- to 6-membered ring, wherein the saturated monocyclic 3- to 6-membered ring is optionally substituted with one, two, or three substituents independently selected from the group consisting of halogen, CN, $C_{1-8}$ alkyl, $CH_2CN$, $CH_2OH$, $C(O)C_{1-8}$ alkyl, $C(O)NR_{11}R_{12}$, $NR_{11}R_{12}$, $NHC(O)C_{1-8}$ alkyl, NHC(O)

NR$_{11}$R$_{12}$, NHS(O)$_2$C$_{1-8}$ alkyl, NHS(O)$_2$NR$_{11}$R$_{12}$, NHS(O)$_2$C$_{3-6}$ cycloalkyl, OH, and OC$_{1-8}$ alkyl;

R$_c$ is H, halogen, C$_{1-8}$ alkyl, C$_{1-8}$ haloalkyl, C$_{2-10}$ alkenyl, C$_{2-10}$ alkynyl, C(O)C$_{1-8}$ alkyl, C(O)NR$_{11}$R$_{12}$, NR$_{11}$R$_{12}$, NHC(O)C$_{1-8}$ alkyl, NHC(O)NR$_{11}$R$_{12}$, NHS(O)$_2$C$_{1-8}$ alkyl, NHS(O)$_2$NR$_{11}$R$_{12}$, NHS(O)$_2$C$_{3-6}$ cycloalkyl, OC$_{1-8}$ alkyl, OC$_{1-8}$ haloalkyl, S(O)$_2$C$_{1-8}$ alkyl, S(O)$_2$NR$_{11}$R$_{12}$, a saturated monocyclic 4- to 6-membered heterocyclyl, C$_{6-10}$ aryl, or a 5- or 6-membered heteroaryl, wherein the saturated monocyclic 4- to 6-membered heterocyclyl, C$_{6-10}$ aryl, or 5- or 6-membered heteroaryl is optionally substituted with one, two, or three substituents independently selected from the group consisting of halogen, CN, C$_{1-8}$ alkyl, CH$_2$CN, CH$_2$OH, C(O)C$_{1-8}$ alkyl, C(O)NR$_{11}$R$_{12}$, NR$_{11}$R$_{12}$, NHC(O)C$_{1-8}$ alkyl, NHC(O)NR$_{11}$R$_{12}$, NHS(O)$_2$C$_{1-8}$ alkyl, NHS(O)$_2$NR$_{11}$R$_{12}$, NHS(O)$_2$C$_{3-6}$ cycloalkyl, OH, and OC$_{1-8}$ alkyl; and R$_d$ is H or C$_{1-8}$ alkyl; or (ii) R$_a$ is H, halogen, C$_{1-8}$ alkyl, C$_{1-8}$ haloalkyl, or OC$_{1-8}$ haloalkyl;

R$_b$ is H, halogen, C$_{1-8}$ alkyl, C$_{1-8}$ haloalkyl, or OC$_{1-8}$ haloalkyl; and R$_c$ and R$_d$, together with the carbon atoms to which they are attached, form a saturated monocyclic 3- to 6-membered ring;

each R$_{11}$ is independently H, C$_{1-8}$ alkyl, C$_{1-8}$ haloalkyl, C$_{3-6}$ cycloalkyl, or a saturated monocyclic 4- to 6-membered heterocyclyl;

each R$_{12}$ is independently H, C$_{1-8}$ alkyl, C$_{1-8}$ haloalkyl, C$_{3-6}$ cycloalkyl, or a saturated monocyclic 4- to 6-membered heterocyclyl; or any R$_{11}$ and R$_{12}$, together with the nitrogen atom to which they are attached, independently forms a saturated monocyclic 4- to 6-membered heterocyclyl, wherein the saturated monocyclic 4- to 6-membered heterocyclyl is optionally substituted with one, two, or three independently selected C$_{1-4}$ alkyl substituents; and m is 0 or 1;

wherein the process comprises:
reductively aminating a compound of Formula (I-2):

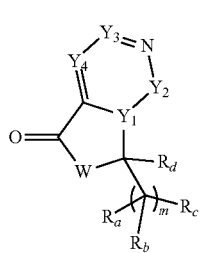

(I-2)

wherein:
Y$_1$ is CR$_1$ or N;
R$_1$ is H, halogen, CN, C$_{1-8}$ alkyl, CH$_2$CN, CH$_2$OH, C(O)C$_{1-8}$ alkyl, C(O)NR$_{11}$R$_{12}$, NR$_{11}$R$_{12}$, NHC(O)C$_{1-8}$ alkyl, NHC(O)NR$_{11}$R$_{12}$, NHS(O)$_2$C$_{1-8}$ alkyl, NHS(O)$_2$NR$_{11}$R$_{12}$, NHS(O)$_2$C$_{3-6}$ cycloalkyl, OH, or OC$_{1-8}$ alkyl;

Y$_2$ is a bond, —C(O)—, —NR$_2$—, or —S(O)$_2$—;
R$_2$ is H, C$_{1-8}$ alkyl, C(O)C$_{1-8}$ alkyl, C(O)NR$_{11}$R$_{12}$, or S(O)$_2$C$_{1-8}$ alkyl;

Y$_3$ is CR$_3$ or N;
R$_3$ is H, halogen, CN, C$_{1-8}$ alkyl, CH$_2$CN, CH$_2$OH, C(O)C$_{1-8}$ alkyl, C(O)NR$_{11}$R$_{12}$, NR$_{11}$R$_{12}$, NHC(O)C$_{1-8}$ alkyl, NHC(O)NR$_{11}$R$_{12}$, NHS(O)$_2$C$_{1-8}$ alkyl, NHS(O)$_2$NR$_{11}$R$_{12}$, NHS(O)$_2$C$_{3-6}$ cycloalkyl, OH, or OC$_{1-8}$ alkyl;

Y$_4$ is CR$_4$ or N;
R$_4$ is H, halogen, CN, C$_{1-8}$ alkyl, CH$_2$CN, CH$_2$OH, C(O)C$_{1-8}$ alkyl, C(O)NR$_{11}$R$_{12}$, NR$_{11}$R$_{12}$, NHC(O)C$_{1-8}$ alkyl, NHC(O)NR$_{11}$R$_{12}$, NHS(O)$_2$C$_{1-8}$ alkyl, NHS(O)$_2$NR$_{11}$R$_{12}$, NHS(O)$_2$C$_{3-6}$ cycloalkyl, OH, or OC$_{1-8}$ alkyl;

W is —CR$_{w1}$R$_{w2}$—, —C(O)—, —NR$_{w3}$—, or —O—;
R$_{w1}$ is H, halogen, C$_{1-8}$ alkyl, C$_{1-8}$ haloalkyl, or OC$_{1-8}$ haloalkyl;
R$_{w2}$ is H, halogen, C$_{1-8}$ alkyl, C$_{1-8}$ haloalkyl, or OC$_{1-8}$ haloalkyl; or
R$_{w1}$ and R$_{w2}$, together with the carbon atom to which they are attached, form a saturated monocyclic 3- to 6-membered ring, wherein the saturated monocyclic 3- to 6-membered ring is optionally substituted with one, two, or three substituents independently selected from the group consisting of halogen, CN, C$_{1-8}$ alkyl, CH$_2$CN, CH$_2$OH, C(O)C$_{1-8}$ alkyl, C(O)NR$_{11}$R$_{12}$, NR$_{11}$R$_{12}$, NHC(O)C$_{1-8}$ alkyl, NHC(O)NR$_{11}$R$_{12}$, NHS(O)$_2$C$_{1-8}$ alkyl, NHS(O)$_2$NR$_{11}$R$_{12}$, NHS(O)$_2$C$_{3-6}$ cycloalkyl, OH, and OC$_{1-3}$ alkyl;

R$_{w3}$ is H, C$_{1-8}$ alkyl, or C(O)C$_{1-8}$ alkyl;

(i) R$_a$ is H, halogen, C$_{1-8}$ alkyl, C$_{1-8}$ haloalkyl, or OC$_{1-8}$ haloalkyl;

R$_b$ is H, halogen, C$_{1-8}$ alkyl, C$_{1-8}$ haloalkyl, or OC$_{1-8}$ haloalkyl; or R$_a$ and R$_b$, together with the carbon atom to which they are attached, form a saturated monocyclic 3- to 6-membered ring, wherein the saturated monocyclic 3- to 6-membered ring is optionally substituted with one, two, or three substituents independently selected from the group consisting of halogen, CN, C$_{1-8}$ alkyl, CH$_2$CN, CH$_2$OH, C(O)C$_{1-8}$ alkyl, C(O)NR$_{11}$R$_{12}$, NR$_{11}$R$_{12}$, NHC(O)C$_{1-8}$ alkyl, NHC(O)NR$_{11}$R$_{12}$, NHS(O)$_2$C$_{1-8}$ alkyl, NHS(O)$_2$NR$_{11}$R$_{12}$, NHS(O)$_2$C$_{3-6}$ cycloalkyl, OH, and OC$_{1-8}$ alkyl;

R$_c$ is H, halogen, C$_{1-8}$ alkyl, C$_{1-8}$ haloalkyl, C$_{2-10}$ alkenyl, C$_{2-10}$ alkynyl, C(O)C$_{1-8}$ alkyl, C(O)NR$_{11}$R$_{12}$, NR$_{11}$R$_{12}$, NHC(O)C$_{1-8}$ alkyl, NHC(O)NR$_{11}$R$_{12}$, NHS(O)$_2$C$_{1-8}$ alkyl, NHS(O)$_2$NR$_{11}$R$_{12}$, NHS(O)$_2$C$_{3-6}$ cycloalkyl, OC$_{1-8}$ alkyl, OC$_{1-8}$ haloalkyl, S(O)$_2$C$_{1-8}$ alkyl, S(O)$_2$NR$_{11}$R$_{12}$, a saturated monocyclic 4- to 6-membered heterocyclyl, C$_6$- to aryl, or a 5- or 6-membered heteroaryl, wherein the saturated monocyclic 4- to 6-membered heterocyclyl, C$_{6-10}$ aryl, or 5- or 6-membered heteroaryl is optionally substituted with one, two, or three substituents independently selected from the group consisting of halogen, CN, C$_{1-8}$ alkyl, CH$_2$CN, CH$_2$OH, C(O)C$_{1-8}$ alkyl, C(O)NR$_{11}$R$_{12}$, NR$_{11}$R$_{12}$, NHC(O)C$_{1-8}$ alkyl, NHC(O)NR$_{11}$R$_{12}$, NHS(O)$_2$C$_{1-8}$ alkyl, NHS(O)$_2$NR$_{11}$R$_{12}$, NHS(O)$_2$C$_{3-6}$ cycloalkyl, OH, and OC$_{1-8}$ alkyl; and R$_d$ is H or C$_{1-8}$ alkyl; or (ii) R$_a$ is H, halogen, C$_{1-8}$ alkyl, C$_{1-8}$ haloalkyl, or OC$_{1-8}$ haloalkyl;

R$_b$ is H, halogen, C$_{1-8}$ alkyl, C$_{1-8}$ haloalkyl, or OC$_{1-8}$ haloalkyl; and R$_c$ and R$_d$, together with the carbon atoms to which they are attached, form a saturated monocyclic 3- to 6-membered ring; and m is 0 or 1;

with a compound of Formula (I-1):

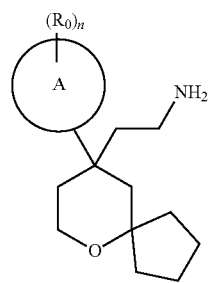

(I-1)

wherein:
  ring A is a $C_{6-10}$ aryl or a 5- or 6-membered heteroaryl;
  each $R_0$ is independently halogen, CN, $NO_2$, $C_{1-8}$ alkyl, $C_{1-8}$ haloalkyl, $CH_2OH$, $CH(OH)CH_3$, $CH_2CH_2OH$, $C_{2-4}$ alkenyl, $C_{2-4}$ alkynyl, $C(O)CH_3$, $C(O)C_{6-10}$ aryl, $C(O)NR_{11}R_{12}$, $C(O)OH$, $C(O)OC_{1-8}$ alkyl, $NR_{11}R_{12}$, OH, $OC_{1-8}$ alkyl, $OC(O)C_{1-8}$ alkyl, $S(O)_2C_{1-8}$ alkyl, $S(O)_2C_6$- to aryl, $C_{3-6}$ cycloalkyl, $C_{3-6}$ cycloalkoxy, saturated monocyclic 3- to 6-membered ring, $C_{6-10}$ aryl, or 5- or 6-membered heteroaryl, wherein each saturated monocyclic 3- to 6-membered ring, $C_{6-10}$ aryl, and 5- or 6-membered heteroaryl is optionally and independently substituted with one, two, or three substituents independently selected from the group consisting of halogen, CN, Ct-3 alkyl, $C(O)CH_3$, $NR_{11}R_{12}$, OH, $OC_{1-3}$ alkyl, and $C_{3-6}$ cycloalkyl;
  n is 0, 1, 2, 3, or 4;
  each $R_{11}$ is independently H, $C_{1-8}$ alkyl, $C_{1-8}$ haloalkyl, $C_{3-6}$ cycloalkyl, or a saturated monocyclic 4- to 6-membered heterocyclyl; and
  each $R_{12}$ is independently H, $C_{1-8}$ alkyl, $C_{1-8}$ haloalkyl, $C_{3-6}$ cycloalkyl, or a saturated monocyclic 4- to 6-membered heterocyclyl; or
  any $R_{11}$ and $R_{12}$, together with the nitrogen atom to which they are attached, independently forms a saturated monocyclic 4- to 6-membered heterocyclyl, wherein the saturated monocyclic 4- to 6-membered heterocyclyl is optionally substituted with one, two, or three independently selected $C_{1-4}$ alkyl substituents;
in the presence of:
  (a) the Lewis acid, titanium isopropoxide;
  (b) a reducing agent selected from the group consisting of tetrabutylammonium borohydride, sodium malonyloxyborohydride, sodium triacetoxyborohydride, sodium cyanoborohydride, sodium borohydride, lithium borohydride, potassium borohydride, and borane; and
  (c) an inert solvent selected from the group consisting of a $C_{1-4}$ alkyl alcohol, toluene, xylene, methyl tert-butyl ether, tetrahydrofuran, 1,4-dioxane, diethyl ether, dichloromethane, chloroform, 1,2-dichloroethane, ethyl acetate, acetonitrile, dimethyl sulfoxide, and N,N-dimethylformamide, or a combination thereof;
to obtain the compound of Formula (I) above.

17. A process for preparing a compound of Formula (I) according to claim 1:

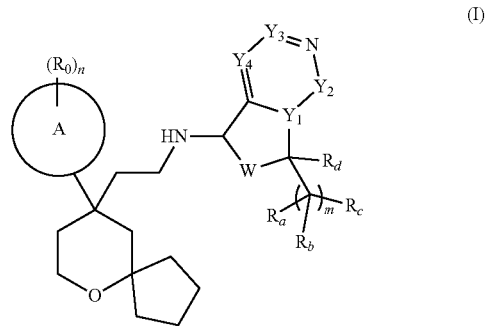

(I)

wherein:
  ring A is a $C_{6-10}$ aryl or a 5- or 6-membered heteroaryl;
  each $R_0$ is independently halogen, CN, $NO_2$, $C_{1-8}$ alkyl, $C_{1-8}$ haloalkyl, $CH_2OH$, $CH(OH)CH_3$, $CH_2CH_2OH$, $C_{2-4}$ alkenyl, $C_{2-4}$ alkynyl, $C(O)CH_3$, $C(O)C_{6-10}$ aryl, $C(O)NR_{11}R_{12}$, $C(O)OH$, $C(O)OC_{1-8}$ alkyl, $NR_{11}R_{12}$, OH, $OC_{1-8}$ alkyl, $OC(O)C_{1-8}$ alkyl, $S(O)_2C_{1-8}$ alkyl, $S(O)_2C_{6-10}$ aryl, $C_{3-6}$ cycloalkyl, $C_{3-6}$ cycloalkoxy, saturated monocyclic 3- to 6-membered ring, $C_{6-10}$ aryl, or 5- or 6-membered heteroaryl, wherein each saturated monocyclic 3- to 6-membered ring, $C_{6-10}$ aryl, and 5- or 6-membered heteroaryl is optionally and independently substituted with one, two, or three substituents independently selected from the group consisting of halogen, CN, $C_{1-3}$ alkyl, $C(O)CH_3$, $NR_{11}R_{12}$, OH, $OC_{1-3}$ alkyl, and $C_{3-6}$ cycloalkyl;
  n is 0, 1, 2, 3, or 4;
  $Y_1$ is $CR_1$ or N;
  $R_1$ is H, halogen, CN, $C_{1-8}$ alkyl, $CH_2CN$, $CH_2OH$, $C(O)C_{1-8}$ alkyl, $C(O)NR_{11}R_{12}$, $NR_{11}R_{12}$, $NHC(O)C_{1-8}$ alkyl, $NHC(O)NR_{11}R_{12}$, $NHS(O)_2C_{1-8}$ alkyl, $NHS(O)_2NR_{11}R_{12}$, $NHS(O)_2C_{3-6}$ cycloalkyl, OH, or $OC_{1-8}$ alkyl;
  $Y_2$ is a bond, —C(O)—, —$NR_2$—, or —$S(O)_2$—;
  $R_2$ is H, $C_{1-8}$ alkyl, $C(O)C_{1-8}$ alkyl, $C(O)NR_{11}R_{12}$, or $S(O)_2C_{1-8}$ alkyl;
  $Y_3$ is $CR_3$ or N;
  $R_3$ is H, halogen, CN, $C_{1-8}$ alkyl, $CH_2CN$, $CH_2OH$, $C(O)C_{1-8}$ alkyl, $C(O)NR_{11}R_{12}$, $NR_{11}R_{12}$, $NHC(O)C_{1-8}$ alkyl, $NHC(O)NR_{11}R_{12}$, $NHS(O)_2C_{1-8}$ alkyl, $NHS(O)_2NR_{11}R_{12}$, $NHS(O)_2C_{3-6}$ cycloalkyl, OH, or $OC_{1-8}$ alkyl;
  $Y_4$ is $CR_4$ or N;
  $R_4$ is H, halogen, CN, $C_{1-8}$ alkyl, $CH_2CN$, $CH_2OH$, $C(O)C_{1-8}$ alkyl, $C(O)NR_{11}R_{12}$, $NR_{11}R_{12}$, $NHC(O)C_{1-8}$ alkyl, $NHC(O)NR_{11}R_{12}$, $NHS(O)_2C_{1-8}$ alkyl, $NHS(O)_2NR_{11}R_{12}$, $NHS(O)_2C_{3-6}$ cycloalkyl, OH, or $OC_{1-8}$ alkyl;
  W is —$CR_{w1}R_{w2}$—, —C(O)—, —$NR_{w3}$—, or —O—;
  $R_{w1}$ is H, halogen, $C_{1-8}$ alkyl, $C_{1-8}$ haloalkyl, or $OC_{1-8}$ haloalkyl;
  $R_{w2}$ is H, halogen, $C_{1-8}$ alkyl, $C_{1-8}$ haloalkyl, or $OC_{1-8}$ haloalkyl; or
  $R_{w1}$ and $R_{w2}$, together with the carbon atom to which they are attached, form a saturated monocyclic 3- to 6-membered ring, wherein the saturated monocyclic 3- to 6-membered ring is optionally substituted with one, two, or three substituents independently selected from the group consisting of halogen, CN, $C_{1-8}$ alkyl, $CH_2CN$, $CH_2OH$, $C(O)C_{1-8}$ alkyl, $C(O)NR_{11}R_{12}$, $NR_{11}R_{12}$, $NHC(O)C_{1-8}$ alkyl, NHC(O)

$NR_{11}R_{12}$, $NHS(O)_2C_{1-8}$ alkyl, $NHS(O)_2NR_{11}R_{12}$, $NHS(O)_2C_{3-6}$ cycloalkyl, OH, and $OC_{1-3}$ alkyl;

$R_{w3}$ is H, $C_{1-8}$ alkyl, or $C(O)C_{1-8}$ alkyl;

(i) $R_a$ is H, halogen, $C_{1-8}$ alkyl, $C_{1-8}$ haloalkyl, or $OC_{1-8}$ haloalkyl;

$R_b$ is H, halogen, $C_{1-8}$ alkyl, $C_{1-8}$ haloalkyl, or $OC_{1-8}$ haloalkyl; or $R_a$ and $R_b$, together with the carbon atom to which they are attached, form a saturated monocyclic 3- to 6-membered ring, wherein the saturated monocyclic 3- to 6-membered ring is optionally substituted with one, two, or three substituents independently selected from the group consisting of halogen, CN, $C_{1-8}$ alkyl, $CH_2CN$, $CH_2OH$, $C(O)C_{1-8}$ alkyl, $C(O)NR_{11}R_{12}$, $NR_{11}R_{12}$, $NHC(O)C_{1-8}$ alkyl, $NHC(O)NR_{11}R_{12}$, $NHS(O)_2C_{1-8}$ alkyl, $NHS(O)_2NR_{11}R_{12}$, $NHS(O)_2C_{3-6}$ cycloalkyl, OH, and $OC_{1-8}$ alkyl;

$R_c$ is H, halogen, $C_{1-8}$ alkyl, $C_{1-8}$ haloalkyl, $C_{2-10}$ alkenyl, $C_{2-10}$ alkynyl, $C(O)C_{1-8}$ alkyl, $C(O)NR_{11}R_{12}$, $NR_{11}R_{12}$, $NHC(O)C_{1-8}$ alkyl, $NHC(O)NR_{11}R_{12}$, $NHS(O)_2C_{1-8}$ alkyl, $NHS(O)_2NR_{11}R_{12}$, $NHS(O)_2C_{3-6}$ cycloalkyl, $OC_{1-8}$ alkyl, $OC_{1-8}$ haloalkyl, $S(O)_2C_{1-8}$ alkyl, $S(O)_2NR_{11}R_{12}$, a saturated monocyclic 4- to 6-membered heterocyclyl, $C_{6-10}$ aryl, or a 5- or 6-membered heteroaryl, wherein the saturated monocyclic 4- to 6-membered heterocyclyl, $C_{6-10}$ aryl, or 5- or 6-membered heteroaryl is optionally substituted with one, two, or three substituents independently selected from the group consisting of halogen, CN, $C_{1-8}$ alkyl, $CH_2CN$, $CH_2OH$, $C(O)C_{1-8}$ alkyl, $C(O)NR_{11}R_{12}$, $NR_{11}R_{12}$, $NHC(O)C_{1-8}$ alkyl, $NHC(O)NR_{11}R_{12}$, $NHS(O)_2C_{1-8}$ alkyl, $NHS(O)_2NR_{11}R_{12}$, $NHS(O)_2C_{3-6}$ cycloalkyl, OH, and $OC_{1-8}$ alkyl; and $R_d$ is H or $C_{1-8}$ alkyl; or (ii) $R_a$ is H, halogen, $C_{1-8}$ alkyl, $C_{1-8}$ haloalkyl, or $OC_{1-8}$ haloalkyl;

$R_b$ is H, halogen, $C_{1-8}$ alkyl, $C_{1-8}$ haloalkyl, or $OC_{1-8}$ haloalkyl; and $R_c$ and $R_d$, together with the carbon atoms to which they are attached, form a saturated monocyclic 3- to 6-membered ring;

each $R_{11}$ is independently H, $C_{1-8}$ alkyl, $C_{1-8}$ haloalkyl, $C_{3-6}$ cycloalkyl, or a saturated monocyclic 4- to 6-membered heterocyclyl;

each $R_{12}$ is independently H, $C_{1-8}$ alkyl, $C_{1-8}$ haloalkyl, $C_{3-6}$ cycloalkyl, or a saturated monocyclic 4- to 6-membered heterocyclyl; or any $R_{11}$ and $R_{12}$, together with the nitrogen atom to which they are attached, independently forms a saturated monocyclic 4- to 6-membered heterocyclyl, wherein the saturated monocyclic 4- to 6-membered heterocyclyl is optionally substituted with one, two, or three independently selected $C_{1-4}$ alkyl substituents; and m is 0 or 1;

wherein the process comprises:

reductively aminating a compound of Formula (I-3):

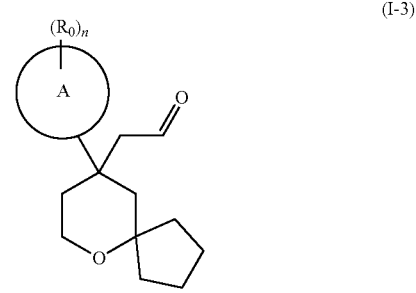

(I-3)

wherein:

ring A is a $C_{6-10}$ aryl or a 5- or 6-membered heteroaryl;

each $R_0$ is independently halogen, CN, $NO_2$, $C_{1-8}$ alkyl, $C_{1-8}$ haloalkyl, $CH_2OH$, $CH(OH)CH_3$, $CH_2CH_2OH$, $C_{2-4}$ alkenyl, $C_{2-4}$ alkynyl, $C(O)CH_3$, $C(O)C_{6-10}$ aryl, $C(O)NR_{11}R_{12}$, $C(O)OH$, $C(O)OC_{1-8}$ alkyl, $NR_{11}R_{12}$, OH, $OC_{1-8}$ alkyl, $OC(O)C_{1-8}$ alkyl, $S(O)_2C_{1-8}$ alkyl, $S(O)_2C_{6-10}$ aryl, $C_{3-6}$ cycloalkyl, $C_{3-6}$ cycloalkoxy, saturated monocyclic 3- to 6-membered ring, $C_{6-10}$ aryl, or 5- or 6-membered heteroaryl, wherein each saturated monocyclic 3- to 6-membered ring, $C_{6-10}$ aryl, and 5- or 6-membered heteroaryl is optionally and independently substituted with one, two, or three substituents independently selected from the group consisting of halogen, CN, $C_{1-3}$ alkyl, $C(O)CH_3$, $NR_{11}R_{12}$, OH, $OC_{1-3}$ alkyl, and $C_{3-6}$ cycloalkyl;

n is 0, 1, 2, 3, or 4;

each $R_{11}$ is independently H, $C_{1-8}$ alkyl, $C_{1-8}$ haloalkyl, $C_{3-6}$ cycloalkyl, or a saturated monocyclic 4- to 6-membered heterocyclyl; and each $R_{12}$ is independently H, $C_{1-8}$ alkyl, $C_{1-8}$ haloalkyl, $C_{3-6}$ cycloalkyl, or a saturated monocyclic 4- to 6-membered heterocyclyl; or any $R_{11}$ and $R_{12}$, together with the nitrogen atom to which they are attached, independently forms a saturated monocyclic 4- to 6-membered heterocyclyl, wherein the saturated monocyclic 4- to 6-membered heterocyclyl is optionally substituted with one, two, or three independently selected $C_{1-4}$ alkyl substituents;

with a compound of Formula (I-4):

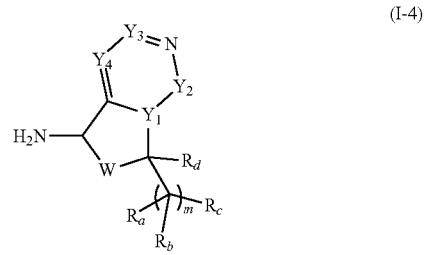

(I-4)

wherein:

$Y_1$ is $CR_1$ or N;

$R_1$ is H, halogen, CN, $C_{1-8}$ alkyl, $CH_2CN$, $CH_2OH$, $C(O)C_{1-8}$ alkyl, $C(O)NR_{11}R_{12}$, $NR_{11}R_{12}$, NHC(O)

$C_{1-8}$ alkyl, NHC(O)NR$_{11}$R$_{12}$, NHS(O)$_2$C$_{1-8}$ alkyl, NHS(O)$_2$NR$_{11}$R$_{12}$, NHS(O)$_2$C$_{3-6}$ cycloalkyl, OH, or OC$_{1-8}$ alkyl;

$Y_2$ is a bond, —C(O)—, —NR$_2$—, or —S(O)$_2$—;

$R_2$ is H, C$_{1-8}$ alkyl, C(O)C$_{1-8}$ alkyl, C(O)NR$_{11}$R$_{12}$, or S(O)$_2$C$_{1-8}$ alkyl;

$Y_3$ is CR$_3$ or N;

$R_3$ is H, halogen, CN, C$_{1-8}$ alkyl, CH$_2$CN, CH$_2$OH, C(O)C$_{1-8}$ alkyl, C(O)NR$_{11}$R$_{12}$, NR$_{11}$R$_{12}$, NHC(O)C$_{1-8}$ alkyl, NHC(O)NR$_{11}$R$_{12}$, NHS(O)$_2$C$_{1-8}$ alkyl, NHS(O)$_2$NR$_{11}$R$_{12}$, NHS(O)$_2$C$_{3-6}$ cycloalkyl, OH, or OC$_{1-8}$ alkyl;

$Y_4$ is CR$_4$ or N;

$R_4$ is H, halogen, CN, C$_{1-8}$ alkyl, CH$_2$CN, CH$_2$OH, C(O)C$_{1-8}$ alkyl, C(O)NR$_{11}$R$_{12}$, NR$_{11}$R$_{12}$, NHC(O)C$_{1-8}$ alkyl, NHC(O)NR$_{11}$R$_{12}$, NHS(O)$_2$C$_{1-8}$ alkyl, NHS(O)$_2$NR$_{11}$R$_{12}$, NHS(O)$_2$C$_{3-6}$ cycloalkyl, OH, or OC$_{1-8}$ alkyl;

W is —CR$_{w1}$R$_{w2}$—, —C(O)—, —NR$_{w3}$—, or —O—;

$R_{w1}$ is H, halogen, C$_{1-8}$ alkyl, C$_{1-8}$ haloalkyl, or OC$_{1-8}$ haloalkyl;

$R_{w2}$ is H, halogen, C$_{1-8}$ alkyl, C$_{1-8}$ haloalkyl, or OC$_{1-8}$ haloalkyl; or $R_{w1}$ and $R_{w2}$, together with the carbon atom to which they are attached, form a saturated monocyclic 3- to 6-membered ring, wherein the saturated monocyclic 3- to 6-membered ring is optionally substituted with one, two, or three substituents independently selected from the group consisting of halogen, CN, C$_{1-8}$ alkyl, CH$_2$CN, CH$_2$OH, C(O)C$_{1-8}$ alkyl, C(O)NR$_{11}$R$_{12}$, NR$_{11}$R$_{12}$, NHC(O)C$_{1-8}$ alkyl, NHC(O)NR$_{11}$R$_{12}$, NHS(O)$_2$C$_{1-8}$ alkyl, NHS(O)$_2$NR$_{11}$R$_{12}$, NHS(O)$_2$C$_{3-6}$ cycloalkyl, OH, and OC$_{1-3}$ alkyl;

$R_{w3}$ is H, C$_{1-8}$ alkyl, or C(O)C$_{1-8}$ alkyl;

(i) $R_a$ is H, halogen, C$_{1-8}$ alkyl, C$_{1-8}$ haloalkyl, or OC$_{1-8}$ haloalkyl;

$R_b$ is H, halogen, C$_{1-8}$ alkyl, C$_{1-8}$ haloalkyl, or OC$_{1-8}$ haloalkyl; or $R_a$ and $R_b$, together with the carbon atom to which they are attached, form a saturated monocyclic 3- to 6-membered ring, wherein the saturated monocyclic 3- to 6-membered ring is optionally substituted with one, two, or three substituents independently selected from the group consisting of halogen, CN, C$_{1-8}$ alkyl, CH$_2$CN, CH$_2$OH, C(O)C$_{1-8}$ alkyl, C(O)NR$_{11}$R$_{12}$, NR$_{11}$R$_{12}$, NHC(O)C$_{1-8}$ alkyl, NHC(O)NR$_{11}$R$_{12}$, NHS(O)$_2$C$_{1-8}$ alkyl, NHS(O)$_2$NR$_{11}$R$_{12}$, NHS(O)$_2$C$_{3-6}$ cycloalkyl, OH, and OC$_{1-8}$ alkyl;

$R_c$ is H, halogen, C$_{1-8}$ alkyl, C$_{1-8}$ haloalkyl, C$_{2-10}$ alkenyl, C$_{2-10}$ alkynyl, C(O)C$_{1-8}$ alkyl, C(O)NR$_{11}$R$_{12}$, NR$_{11}$R$_{12}$, NHC(O)C$_{1-8}$ alkyl, NHC(O)NR$_{11}$R$_{12}$, NHS(O)$_2$C$_{1-8}$ alkyl, NHS(O)$_2$NR$_{11}$R$_{12}$, NHS(O)$_2$C$_{3-6}$ cycloalkyl, OC$_{1-8}$ alkyl, OC$_{1-8}$ haloalkyl, S(O)$_2$C$_{1-8}$ alkyl, S(O)$_2$NR$_{11}$R$_{12}$, a saturated monocyclic 4- to 6-membered heterocyclyl, C$_{6-10}$ aryl, or a 5- or 6-membered heteroaryl, wherein the saturated monocyclic 4- to 6-membered heterocyclyl, C$_{6-10}$ aryl, or 5- or 6-membered heteroaryl is optionally substituted with one, two, or three substituents independently selected from the group consisting of halogen, CN, C$_{1-8}$ alkyl, CH$_2$CN, CH$_2$OH, C(O)C$_{1-8}$ alkyl, C(O)NR$_{11}$R$_{12}$, NR$_{11}$R$_{12}$, NHC(O)C$_{1-8}$ alkyl, NHC(O)NR$_{11}$R$_{12}$, NHS(O)$_2$C$_{1-8}$ alkyl, NHS(O)$_2$NR$_{11}$R$_{12}$, NHS(O)$_2$C$_{3-6}$ cycloalkyl, OH, and OC$_{1-8}$ alkyl; and $R_d$ is H or C$_{1-8}$ alkyl; or (ii) $R_a$ is H, halogen, C$_{1-8}$ alkyl, C$_{1-8}$ haloalkyl, or OC$_{1-8}$ haloalkyl;

$R_b$ is H, halogen, C$_{1-8}$ alkyl, C$_{1-8}$ haloalkyl, or OC$_{1-8}$ haloalkyl; and $R_c$ and $R_d$, together with the carbon atoms to which they are attached, form a saturated monocyclic 3- to 6-membered ring; and m is 0 or 1;

in the presence of:
(a) the Lewis acid, titanium isopropoxide;
(b) a reducing agent selected from the group consisting of tetrabutylammonium borohydride, sodium malonyloxyborohydride, sodium triacetoxyborohydride, sodium cyanoborohydride, sodium borohydride, lithium borohydride, potassium borohydride, and borane; and
(c) an inert solvent selected from the group consisting of a C$_{1-4}$ alkyl alcohol, toluene, xylene, methyl tert-butyl ether, tetrahydrofuran, 1,4-dioxane, diethyl ether, dichloromethane, chloroform, 1,2-dichloroethane, ethyl acetate, acetonitrile, dimethyl sulfoxide, and N,N-dimethylformamide, or a combination thereof;

to obtain the compound of Formula (I) above.

* * * * *